US012198627B2

(12) United States Patent
Kim et al.

(10) Patent No.: US 12,198,627 B2
(45) Date of Patent: Jan. 14, 2025

(54) DISPLAY APPARATUS

(71) Applicant: Samsung Display Co., Ltd., Yongin-Si (KR)

(72) Inventors: Minjoo Kim, Yongin-si (KR); Jihyun Ka, Yongin-si (KR); Chulkyu Kang, Yongin-si (KR); Soongi Kwon, Yongin-si (KR); Sujin Kim, Yongin-si (KR); Minwoo Byun, Yongin-si (KR); Seoni Jeong, Yongin-si (KR); Chaehan Hyun, Yongin-si (KR); Sungchan Hwang, Yongin-si (KR)

(73) Assignee: Samsung Display Co., Ltd., Gyeonggi-Do Yongin-Si (KR)

( * ) Notice: Subject to any disclaimer, the term of this patent is extended or adjusted under 35 U.S.C. 154(b) by 0 days.

(21) Appl. No.: 18/226,770

(22) Filed: Jul. 27, 2023

(65) Prior Publication Data

US 2024/0071305 A1 Feb. 29, 2024

(30) Foreign Application Priority Data

Aug. 23, 2022 (KR) ........................ 10-2022-0105778
Dec. 23, 2022 (KR) ........................ 10-2022-0183075

(51) Int. Cl.
*G09G 3/30* (2006.01)
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2320/0233* (2013.01)

(58) Field of Classification Search
None
See application file for complete search history.

(56) References Cited

U.S. PATENT DOCUMENTS 8,698,711 B2 4/2014 Yamashita et al.
10,936,132 B2 3/2021 Jang
11,322,085 B1 5/2022 Zheng
11,551,588 B2 1/2023 Kim et al.
2014/0176399 A1* 6/2014 Lee .......................... G09G 3/20 345/55
2015/0243721 A1 8/2015 Jeon
2019/0005882 A1* 1/2019 Zhang .................. G09G 3/3258
2020/0234641 A1 7/2020 Jeong
2021/0174743 A1 6/2021 Chang
2022/0208088 A1 6/2022 Kim et al.
2022/0223112 A1 7/2022 Kim et al.
(Continued)

FOREIGN PATENT DOCUMENTS

CN 114586091 A 6/2022
KR 10-1084169 B1 11/2011
KR 10-2019-0103540 A 9/2019
(Continued)

OTHER PUBLICATIONS

WO Searh Report, PCT Application No. PCT/KR2023/010984 dated Oct. 30, 2023, 8 pages.

*Primary Examiner* — Joseph R Haley
(74) *Attorney, Agent, or Firm* — Innovation Counsel LLP

(57) ABSTRACT

Provided is a display apparatus in which initialization and compensation of a pixel is implemented through a pixel including a thin film transistor connected to a node between a driving transistor and a light emitting diode.

34 Claims, 49 Drawing Sheets

(56) References Cited

U.S. PATENT DOCUMENTS

| | | | | |
|---|---|---|---|---|
| 2022/0319417 | A1 | 10/2022 | Liu et al. | |
| 2023/0206858 | A1* | 6/2023 | Kim | G09G 3/3275<br>345/204 |

FOREIGN PATENT DOCUMENTS

| | | | |
|---|---|---|---|
| KR | 10-2020-0071603 | A | 6/2020 |
| KR | 10-2020-0089780 | A | 7/2020 |
| KR | 10-2021-0073188 | A | 6/2021 |
| KR | 10-2021-0108345 | A | 9/2021 |
| KR | 10-2022-0097824 | A | 7/2022 |
| KR | 10-2022-0100755 | A | 7/2022 |

* cited by examiner

DISPLAY APPARATUS

CROSS-REFERENCE TO RELATED APPLICATION

This application is based on and claims priority under 35 U.S.C. § 119 to Korean Patent Application No. 10-2022-0105778, filed on Aug. 23, 2022, and Korean Patent Application No. 10-2022-0183075, filed on Dec. 23, 2022, in the Korean Intellectual Property Office, the disclosures of which are incorporated by reference herein in their entirety.

BACKGROUND

1. Field

One or more embodiments relate to a pixel and a display apparatus including the same.

2. Description of the Related Art

Recently, display apparatuses have been used for various purposes. Also, as display apparatuses have become thinner and lighter, their range of use has been widened.

As display apparatuses are used in various ways, various methods may be used to design the display apparatuses, and further, more and more functions may be combined or associated with display apparatuses.

SUMMARY

One or more embodiments include a display apparatus with an improved display quality. However, these problems are merely examples and the scope of the disclosure is not limited thereto.

Additional aspects will be set forth in part in the description which follows and, in part, will be apparent from the description, or may be learned by practice of the presented embodiments of the disclosure.

According to one or more embodiments, a display apparatus includes a plurality of pixels, wherein each of the plurality of pixels includes a first transistor including a first gate and a second gate, a second transistor connected between the first gate of the first transistor and a data line, a third transistor connected between the first gate of the first transistor and a first voltage line, a fourth transistor connected between the first transistor and a second voltage line, a fifth transistor connected between the first transistor and a third voltage line, a sixth transistor connected between the first transistor and a fourth voltage line, a light emitting diode connected to the first transistor, a first capacitor connected between the first gate of the first transistor and the light emitting diode, and a second capacitor connected between the third voltage line and the light emitting diode.

In an embodiment, the second gate of the first transistor may be connected to a node to which the first transistor and the light emitting diode are connected.

In an embodiment, the pixel may operate in a non-emission period and an emission period during one frame period, and the non-emission period may a first period in which the third transistor and the fourth transistor are turned on, a write period in which the second transistor is turned on, the write period following the first period, and a second period in which the sixth transistor is turned on, the second period following the write period.

In an embodiment, the non-emission period may further include a third period in which the third transistor and the fifth transistor are turned on and a first voltage is supplied from the first voltage line to the first gate of the first transistor through the turned-on third transistor, the third period being disposed between the first period and the write period.

In an embodiment, the pixel may further include a seventh transistor connected between the first transistor and the light emitting diode.

In an embodiment, the seventh transistor may be turned on in the first period and the second period and turned off in the third period and the write period.

In an embodiment, the second transistor may be turned on in the write period and a data signal may be supplied to the first gate of the first transistor through the turned-on second transistor.

In an embodiment, the fourth voltage line may include a $(4\text{-}1)^{th}$ voltage line and a $(4\text{-}2)^{th}$ voltage line, the sixth transistor of a first pixel emitting light in a first color among the plurality of pixels may be connected to the $(4\text{-}1)^{th}$ voltage line, the sixth transistor of a second pixel emitting light in a second color among the plurality of pixels may be connected to the $(4\text{-}2)^{th}$ voltage line, and a voltage supplied to the $(4\text{-}1)^{th}$ voltage line and a voltage supplied to the $(4\text{-}2)^{th}$ voltage line may be different from each other.

In an embodiment, each of the first to fourth voltage lines may extend in a first direction, and the display apparatus may further include first to fourth vertical voltage lines extending in a second direction perpendicular to the first direction and respectively connected to the first to fourth voltage lines.

In an embodiment, each of the first to fourth voltage lines may be arranged in each row, and each of the first to fourth vertical voltage lines may be arranged between two columns at certain intervals.

According to one or more embodiments, a display apparatus including a plurality of pixels, wherein each of the plurality of pixels includes a light emitting diode, a first transistor including a first gate and a second gate, a second transistor connected to the first gate of the first transistor and a data line, a third transistor connected to the first gate of the first transistor and a first voltage line, a fourth transistor connected to the first transistor and a second voltage line, a fifth transistor connected to the first transistor and the light emitting diode, a sixth transistor connected to the fifth transistor and a third voltage line, a first capacitor connected to the first gate of the first transistor and the fifth transistor, and a second capacitor connected to the second voltage line and the fifth transistor.

In an embodiment, the second gate of the first transistor may be connected to a node to which the first transistor and the fifth transistor are connected.

In an embodiment, the sixth transistor may be connected between the third voltage line and a node to which the first transistor and the fifth transistor are connected.

In an embodiment, the pixel may further include a seventh transistor connected between the first transistor and a fourth voltage line.

In an embodiment, the pixel may operate in a non-emission period and an emission period during one frame period, the non-emission period may include a first period in which the third transistor, the fifth transistor, and the sixth transistor are turned on, a write period in which the second transistor is turned on and the fifth transistor is turned off, the write period following the first period, a second period in which the fifth transistor and the seventh transistor are turned on, the second period following the write period, and a third period in which the third transistor and the fourth transistor are turned on and the fifth transistor is turned off, the third period being disposed between the first period and the writing period.

In an embodiment, the fourth voltage line may include a $(4\text{-}1)^{th}$ voltage line and a $(4\text{-}2)^{th}$ voltage line, the seventh transistor of a first pixel emitting light in a first color among the plurality of pixels may be connected to the $(4\text{-}1)^{th}$ voltage line, the seventh transistor of a second pixel emitting light in a second color among the plurality of pixels may be connected to the $(4\text{-}2)^{th}$ voltage line, and a voltage supplied to the $(4\text{-}1)^{th}$ voltage line and a voltage supplied to the $(4\text{-}2)^{th}$ voltage line may be different from each other.

In an embodiment, the pixel may further include a seventh transistor connected between a fourth voltage line and a node to which the fifth transistor and the light emitting diode are connected.

In an embodiment, the pixel may operate in a non-emission period and an emission period during one frame period, the non-emission period may include a first period in which the third transistor and the sixth transistor are turned on, a writing period in which the second transistor is turned on, the writing period following the first period, a second period in which the seventh transistor is turned on, the second period following the write period, and a third period in which the third transistor and the fourth transistor are turned on, the third period being disposed between the first period and the write period, and the fifth transistor may be turned off in the non-emission period and turned on in the emission period.

In an embodiment, the fourth voltage line may include a $(4\text{-}1)^{th}$ voltage line and a $(4\text{-}2)^{th}$ voltage line, the seventh transistor of a first pixel emitting light in a first color among the plurality of pixels may be connected to the $(4\text{-}1)^{th}$ voltage line, the seventh transistor of a second pixel emitting light in a second color among the plurality of pixels may be connected to the $(4\text{-}2)^{th}$ voltage line, and a voltage supplied to the $(4\text{-}1)^{th}$ voltage line and a voltage supplied to the $(4\text{-}2)^{th}$ voltage line may be different from each other.

In an embodiment, the sixth transistor may be connected between the third voltage line and a node to which the fifth transistor and the light emitting diode are connected.

In an embodiment, the pixel may operate in a non-emission period and an emission period during one frame period, and the non-emission period may include a first period in which the third transistor, the fifth transistor, and the sixth transistor are turned on, a write period in which the second transistor is turned on, the writing period following the first period, and a second period in which the fifth transistor and the sixth transistor are turned on and the third transistor is turned off, the second period following the write period.

In an embodiment, the non-emission period may further include a third period in which the third transistor and the fourth transistor are turned on and the fifth transistor and the sixth transistor are turned off, the third period being disposed between the first period and the write period.

In an embodiment, the second transistor may be turned on and the data signal may be supplied to the first gate of the first transistor through the turned-on second transistor in the write period.

In an embodiment, the third voltage line may include a $(3\text{-}1)^{th}$ voltage line and a $(3\text{-}2)^{th}$ voltage line, the sixth transistor of a first pixel emitting light in a first color among the plurality of pixels may be connected to the $(3\text{-}1)^{th}$ voltage line, the sixth transistor of a second pixel emitting light in a second color among the plurality of pixels may be connected to the $(3\text{-}2)^{th}$ voltage line, and a voltage supplied to the $(3\text{-}1)^{th}$ voltage line and a voltage supplied to the $(3\text{-}2)^{th}$ voltage line may be different from each other.

In an embodiment, each of the first to third voltage lines may extend in a first direction, and the display apparatus may further include first to third vertical voltage lines extending in a second direction perpendicular to the first direction and respectively connected to the first to third voltage lines.

In an embodiment, each of the first to third voltage lines may be arranged in each row, and each of the first to third vertical voltage lines may be arranged between two columns at certain intervals.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
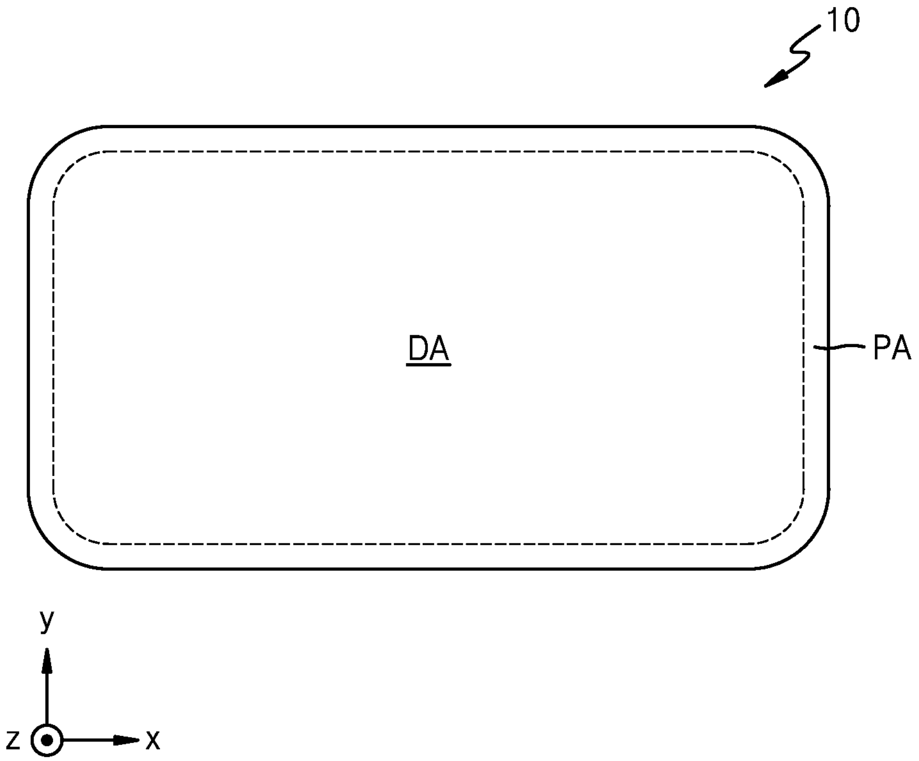
FIGS. 1A, 1B, and 2 are diagrams schematically illustrating a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

The disclosure may include various embodiments and modifications, and certain embodiments thereof are illustrated in the drawings and will be described herein in detail. The effects and features of the disclosure and the accomplishing methods thereof will become apparent from the embodiments described below in detail with reference to the accompanying drawings. However, the disclosure is not limited to the embodiments described below and may be embodied in various modes.

It will be understood that although terms such as "first" and "second" may be used herein to describe various elements, these elements should not be limited by these terms and these terms are only used to distinguish one element from another element.

As used herein, the singular forms "a," "an," and "the" are intended to include the plural forms as well, unless the context clearly indicates otherwise.

Also, it will be understood that the terms "comprise," "include," and "have" used herein specify the presence of stated features or elements, but do not preclude the presence or addition of one or more other features or elements.

It will be understood that when a layer, region, area, component, or element is referred to as being "on" another layer, region, area, component, or element, it may be "directly on" the other layer, region, area, component, or element or may be "indirectly on" the other layer, region, area, component, or element with one or more intervening layers, regions, areas, components, or elements therebetween.

Sizes of elements in the drawings may be exaggerated for convenience of description. In other words, because the sizes and thicknesses of elements in the drawings are arbitrarily illustrated for convenience of description, the disclosure is not limited thereto.

As used herein, "A and/or B" represents the case of A, B, or A and B. Also, "at least one of A and B" represents the case of A, B, or A and B.

In the following embodiments, when X and Y are connected to each other, X and Y may be electrically connected to each other, X and Y may be functionally connected to each other, or X and Y may be directly connected to each other. Here, X and Y may be target objects (e.g., apparatuses, devices, circuits, lines, electrodes, terminals, conductive layers, or layers). Thus, the disclosure is not limited to a certain connection relationship, for example, a connection relationship indicated in the drawings or the detailed description, and may also include anything other than the connection relationship indicated in the drawings or the detailed description.

For example, when X and Y are electrically connected to each other, one or more devices (e.g., switches, transistors, capacitors, inductors, resistors, or diodes) enabling the electrical connection between X and Y may be connected between X and Y.

In the following embodiments, "ON" used in connection with a device state may refer to an activated state of the device, and "OFF" may refer to a deactivated state of the device. "ON" used in connection with a signal received by a device may refer to a signal activating the device, and "OFF" may refer to a signal deactivating the device. The device may be activated by a high-level voltage or a low-level voltage. For example, a P-channel transistor (P-type transistor) may be activated by a low-level voltage, and an N-channel transistor (N-type transistor) may be activated by a high-level voltage. Thus, it should be understood that "ON" voltages for the P-type transistor and the N-type transistor are opposite (low versus high) voltage levels.

In the following embodiments, the meaning of a line "extending in a first direction or a second direction" may include not only extending in a linear shape but also extending in a zigzag or curved shape in the first direction or the second direction.

In the following embodiments, when referred to as "in a plan view," it may mean that a target portion is viewed from above, and when referred to as "in a cross-sectional view," it may mean that a cross-section of a target portion vertically cut is viewed from the side. In the following embodiments, when referred to as "overlapping," it may include overlapping "in a plan view" and overlapping "in a cross-sectional view."

Also, herein, the x direction, the y direction, and the z direction are not limited to the directions along three axes of the rectangular coordinate system and may be interpreted in a broader sense. For example, the x direction, the y direction, and the z direction may be perpendicular to one another or may represent different directions that are not perpendicular to one another.

When a certain embodiment may be implemented differently, a particular process order may be performed differently from the described order. For example, two consecutively described processes may be performed substantially at the same time or may be performed in an order opposite to the described order.

In the detailed description of the disclosure and the appended claims, the term "corresponding" may be used to specify an element arranged in the same area among a plurality of elements, depending on the context. For example, when a first element "corresponds" to a second element, it may mean that the second element is arranged in the same area as the first element.

A display apparatus according to embodiments may be implemented as an electronic apparatus such as a smart phone, a mobile phone, a smart watch, a navigation apparatus, a game machine, a television (TV), a vehicle head unit, a notebook computer, a laptop computer, a tablet computer, a personal media player (PMP), or a personal digital assistant (PDA). Also, the electronic apparatus may be a flexible apparatus.

Figure 1B:
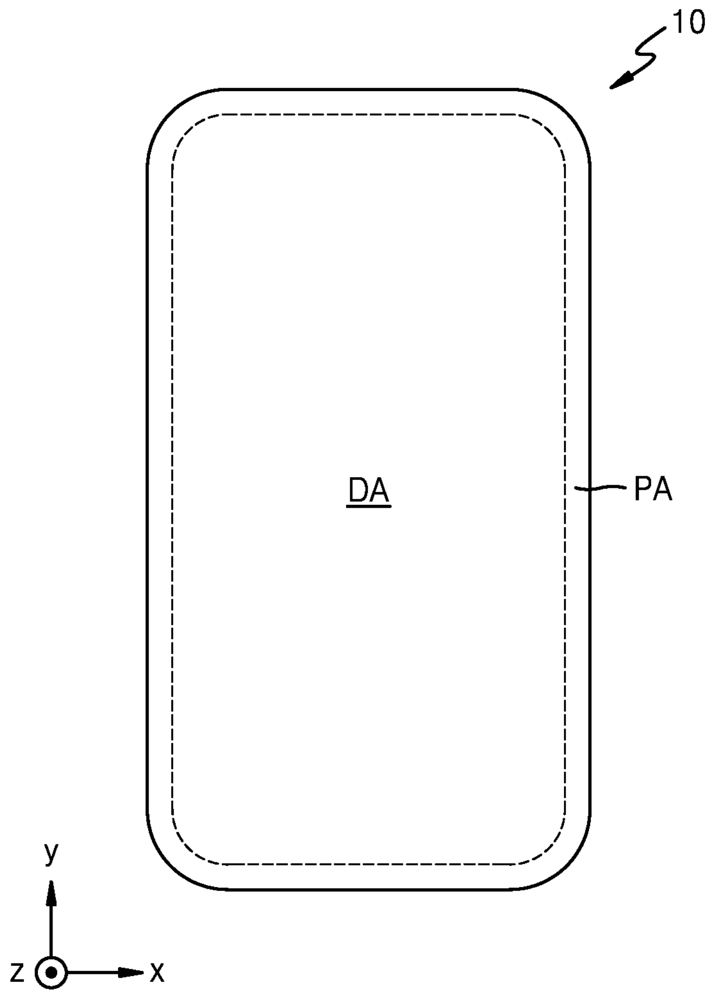
Figure 2:
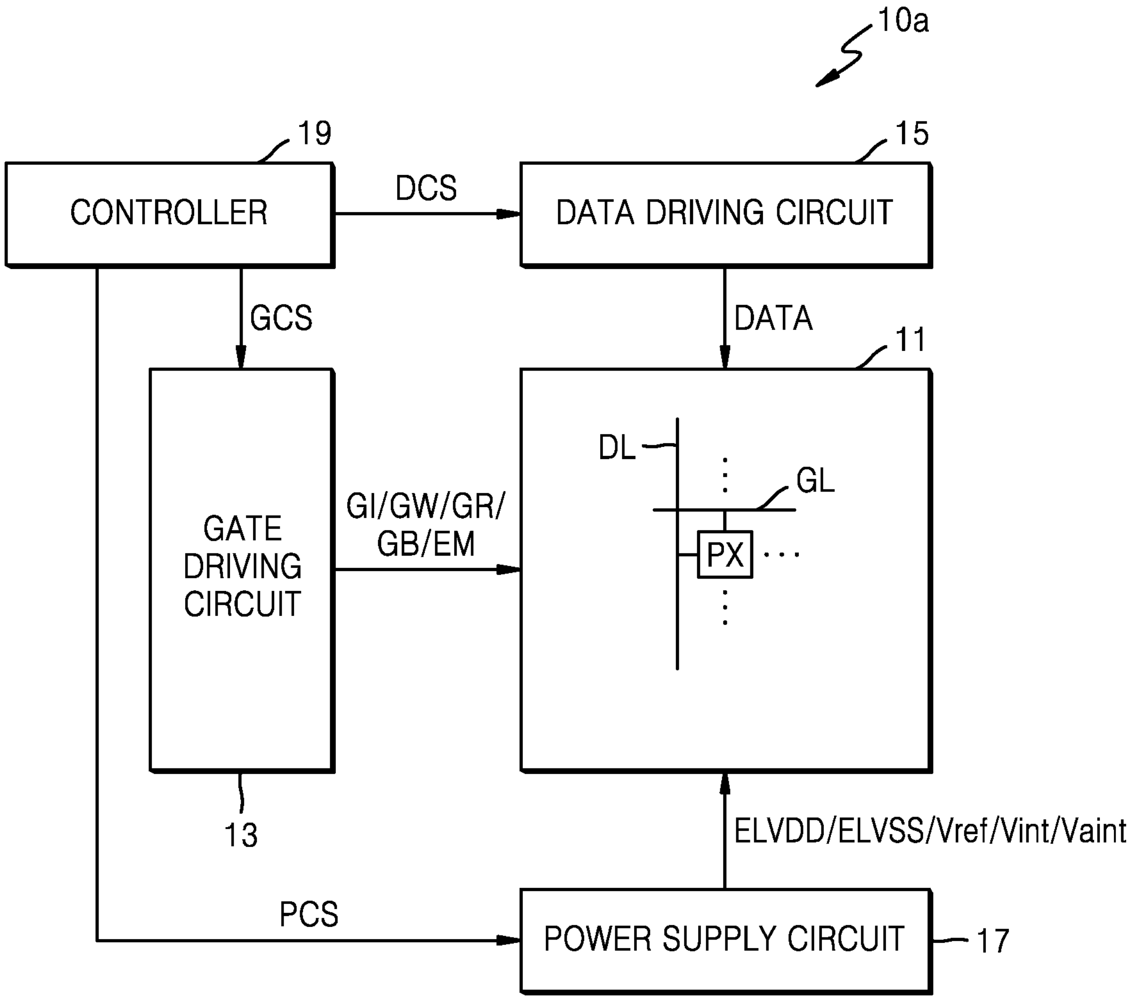

FIGS. 1A, 1B, and 2 are diagrams schematically illustrating a display apparatus according to an embodiment.

Referring to FIG. 1A, a display apparatus 10 may include a display area DA displaying an image and a peripheral area PA outside the display area DA. The display area DA may be entirely surrounded by the peripheral area PA.

In the plan view, the display area DA may have a rectangular shape. In other embodiments, the display area DA may have a polygonal shape such as a triangular, pentagonal, or hexagonal shape, a circular shape, an elliptical shape, an atypical shape, or the like. A corner of the edge of the display area DA may have a round shape. In an embodiment, as illustrated in FIG. 1A, the display apparatus 10 may include a display area DA having a shape in which the length in the x direction is greater than the length in the y direction. In another embodiment, as illustrated in FIG. 1B, the display apparatus 10 may include a display area DA having a shape in which the length in the y direction is greater than the length in the x direction.

Referring to FIG. 2, a display apparatus 10*a* according to an embodiment may include a pixel unit 11, a gate driving circuit 13, a data driving circuit 15, a power supply circuit 17, and a controller 19.

The pixel unit 11 may be provided in the display area DA. Various conductive lines for transmitting electrical signals to the display area DA, peripheral circuits electrically connected to pixel circuits, and/or pads to which a printed circuit board or a driver IC chip is configured to be connected may be located in the peripheral area PA. For example, the gate driving circuit 13, the data driving circuit 15, the power supply circuit 17, and the controller 19 may be provided in the peripheral area PA.

As illustrated in FIG. 2, a plurality of gate lines GL, a plurality of data lines DL, and a plurality of pixels PX connected to the plurality of gate lines GL and the plurality of data lines DL may be arranged in the display area DA. The plurality of pixels PX may be arranged in various forms such as stripe arrangement, pentile arrangement (diamond arrangement), and mosaic arrangement to implement an image. Each pixel PX may include an organic light emitting diode OLED as a display element (light emitting element), and the organic light emitting diode OLED may be connected to a pixel circuit. The pixel circuit may include a plurality of transistors and at least one capacitor. The pixel PX may emit, for example, red, green, blue, or white light from the organic light emitting diode OLED. Each pixel PX may be connected to at least one corresponding gate line among the plurality of gate lines GL and a corresponding data line among the plurality of data lines DL.

Each of the gate lines GL may extend in the x direction (row direction) to be connected to the pixels PX located in the same row. Each of the gate lines GL may be configured to transmit a gate signal to the pixels PX in the same row. Each of the data lines DL may extend in the y direction (column direction) to be connected to the pixels PX located in the same column. Each of the data lines DL may be configured to transmit a data signal to each of the pixels PX in the same column in synchronization with a gate signal.

In an embodiment, the peripheral area PA may be a non-display area in which pixels PX are not arranged. In another embodiment, a plurality of pixels PX may be arranged to overlap the gate driving circuit 13. Accordingly, a dead area may be reduced and the display area DA may be extended.

The gate driving circuit 13 may be connected to a plurality of gate lines GL, may generate a gate signal in response to a gate control signal GCS from the controller 19, and may sequentially supply the gate signal to the gate lines GL. The gate line GL may be connected to the gate of the transistor included in the pixel PX. The gate signal may be a gate control signal for controlling turn-on and turn-off of the transistor whose gate is connected to the gate line GL. The gate signal may be a square wave signal including an on voltage at which the transistor may be turned on and an off voltage at which the transistor may be turned off. In an embodiment, the on voltage may be a high-level voltage (first-level voltage) or a low-level voltage (second-level voltage).

FIG. 2 illustrates that the pixel PX is connected to one gate line GL; however, this is merely an example and the pixel PX may be connected to two or more gate lines and the gate driving circuit 13 may supply, to the two or more gate lines, two or more gate signals with different timings when an on voltage is applied. For example, the pixel PX may be connected to first to fourth gate lines and an emission control line, and the gate driving circuit 13 may apply a first gate signal GW, a second gate signal GI, a third gate signal GR, a fourth gate signal GB, and an emission control signal EM to first gate lines, second gate lines, third gate lines, fourth gate lines, and emission control lines respectively. The emission control signal EM may be a gate control signal for controlling turn-on and turn-off of the transistor whose gate is connected to the emission control line.

The data driving circuit 15 may be connected to a plurality of data lines DL and may supply a data signal to the data lines DL in response to a data control signal DCS from the controller 19. The data signal supplied from the data line DL may be supplied to the pixel PX to which the gate signal is supplied. The data driving circuit 15 may convert input image data with gradation input from the controller 19 into a data signal in the form of a voltage or current.

The power supply circuit 17 may generate voltages necessary for driving the pixel PX in response to a power control signal PCS from the controller 19. The power supply circuit 170 may generate a first driving voltage ELVDD and a second driving voltage ELVSS and supply the same to the pixels PX. The first driving voltage ELVDD may be a high-level voltage provided to a first electrode (pixel electrode or anode) of the display element included in the pixel PX. The second driving voltage ELVSS may be a low-level voltage provided to a second electrode (opposite electrode or cathode) of the display element included in the pixel PX. The power supply circuit 17 may generate a reference voltage Vref, a first initialization voltage Vint, and a second initialization voltage Vaint and supply the same to the pixels PX.

The voltage level of the first driving voltage ELVDD may be higher than the voltage level of the second driving voltage ELVSS. The voltage level of the reference voltage Vref may be lower than the voltage level of the first driving voltage ELVDD. The voltage level of the first initialization voltage Vint may be lower than the voltage level of the second driving voltage ELVSS. The voltage level of the second initialization voltage Vaint may be higher than the voltage level of the first initialization voltage Vint. The voltage level of the second initialization voltage Vaint may be equal to or higher than the voltage level of the second driving voltage ELVSS.

The controller 19 may generate control signals GCS, DCS, and PCS based on signals input from outside and supply the same to the gate driving circuit 13, the data driving circuit 15, and the power supply circuit 17, respectively. The gate control signal GCS output to the gate driving circuit 13 may include a plurality of clock signals and a gate start signal. The data control signal DCS output to the data driving circuit 15 may include a source start signal and clock signals.

The display apparatus 10*a* may include a display panel, and the display panel may include a substrate. Pixels PX may be arranged in the display area DA on the substrate. Some or all of the gate driving circuit 13 may be directly formed in the peripheral area PA on the substrate during a process of forming transistors constituting a pixel circuit in the display area DA on the substrate. Each of the data driving circuit 15, the power supply circuit 17, and the controller 19 may be formed in the form of a separate integrated circuit chip or a single integrated circuit chip and disposed over a flexible printed circuit board (FPCB) electrically connected to a pad arranged on one side of the substrate. In other embodiments, the data driving circuit 15, the power supply circuit 17, and the controller 19 may be directly disposed over the substrate by using a chip-on-glass (COG) or chip-on-plastic (COP) method.

In an embodiment, the plurality of transistors included in the pixel circuit may be N-type oxide thin film transistors. In another embodiment, the plurality of transistors included in the pixel circuit may be P-type silicon thin film transistors. In another embodiment, some of the plurality of transistors included in the pixel circuit may be N-type oxide thin film transistors, and others may be P-type silicon thin film transistors.

The oxide thin film transistor may be a low-temperature polycrystalline oxide (LTPO) thin film transistor in which an active pattern (semiconductor layer) includes an oxide. However, this is merely an example and the N-type transistors are not limited thereto. For example, the active pattern (semiconductor layer) included in the N-type transistor may include an inorganic semiconductor (e.g., amorphous silicon or polysilicon) or an organic semiconductor. The silicon thin film transistor may be a low-temperature polysilicon (LTPS) thin film transistor in which an active pattern (semiconductor layer) includes amorphous silicon, polysilicon, or the like.

The display apparatus 10*a* may support a variable refresh rate (VRR). The refresh rate may be a frequency at which a data signal is actually written into a driving transistor of the pixel PX, may also be referred to as a screen scan rate or a screen refresh rate, and may represent the number of image frames played per second. In an embodiment, the refresh rate may be the output frequency of the gate driving circuit 13 and/or the data driving circuit 15. A frequency corresponding to the refresh rate may be a driving frequency. The display apparatus 10*a* may adjust the output frequency of the gate driving circuit 13 and the output frequency of the data driving circuit 15 corresponding thereto according to the driving frequency. The display apparatus 10*a* supporting a variable refresh rate (VRR) may operate by changing the driving frequency within the range of a maximum driving frequency and a minimum driving frequency. For example, when the refresh rate is about 60 Hz, a gate signal for writing a data signal may be supplied to each horizontal line (row) from the gate driving circuit 13 sixty times per second. The display apparatus 10*a* may display an image while changing the driving frequency according to the refresh rate.

When the maximum driving frequency of the display apparatus 10*a* is referred to as a first driving frequency and the driving frequency lower than the maximum driving frequency is referred to as a second driving frequency, the display apparatus 10*a* may operate at the second driving frequency to reduce power consumption. For example, the display apparatus 10*a* may be driven at low speed by operating at the second driving frequency when an operation control signal (e.g., a signal input from a keyboard) is not input for a certain time, when a still image is displayed, when it is driven in a standby mode, or the like.

Figure 3:
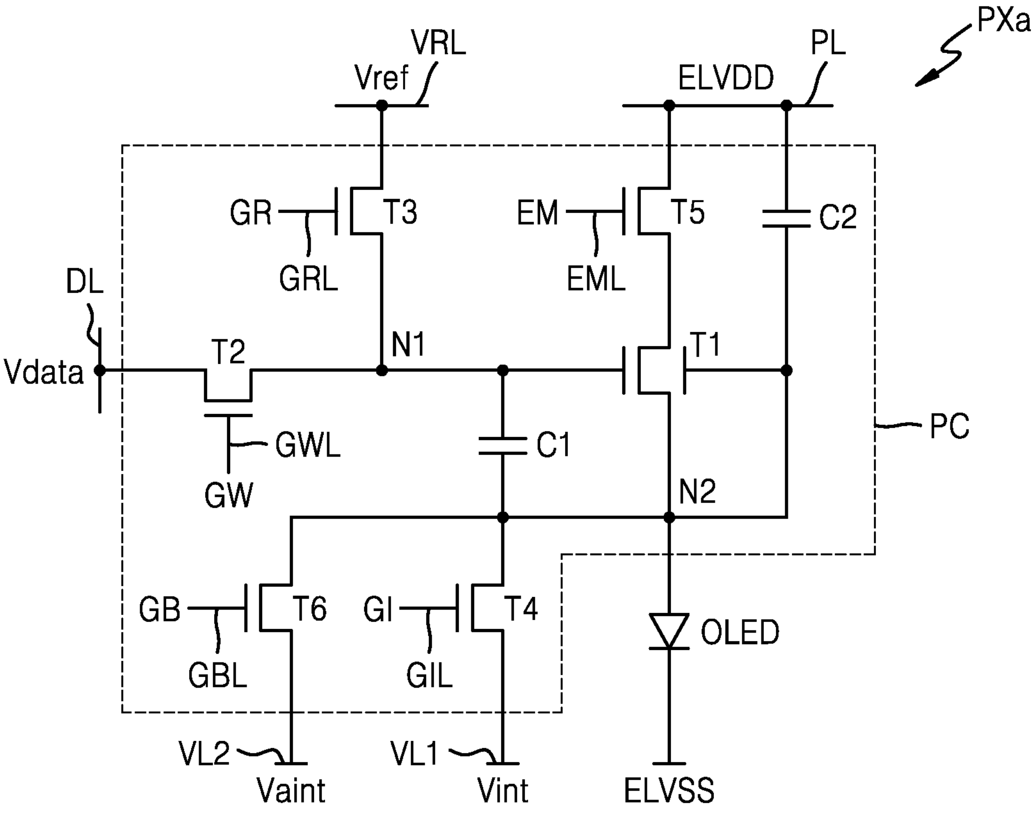
FIG. 3 is an equivalent circuit diagram of a pixel according to an embodiment.
Figure 4:
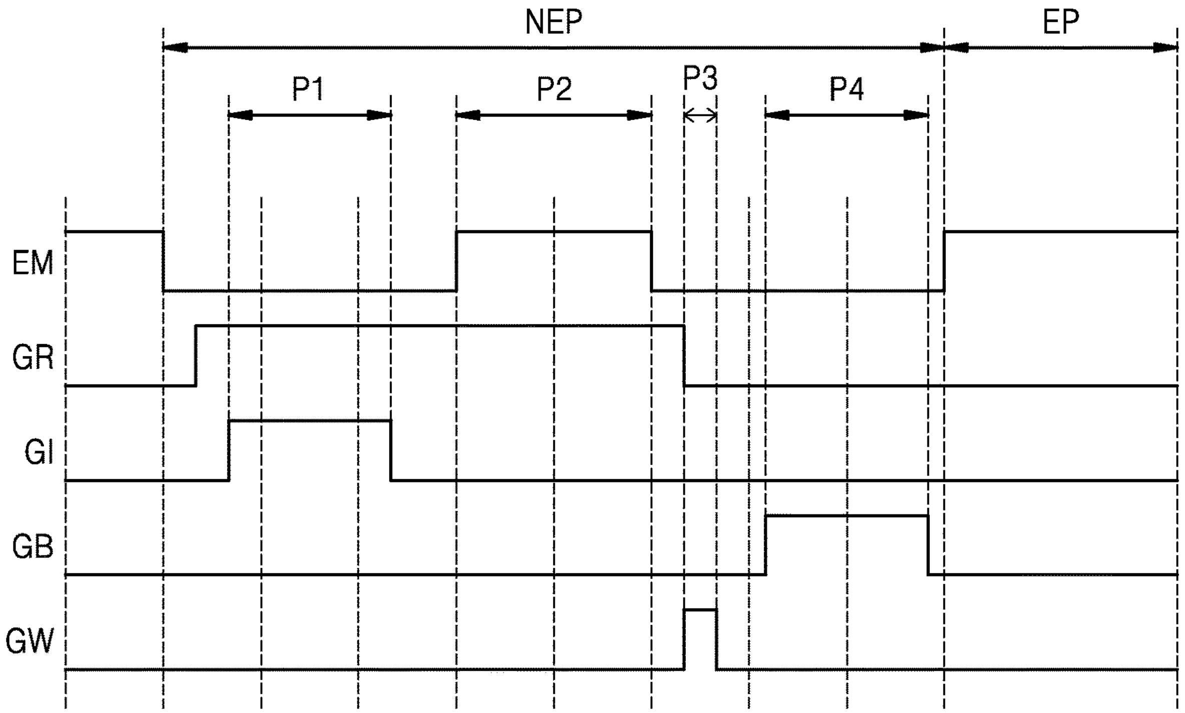
FIG. 4 is a waveform diagram illustrating signals for describing an operation of the pixel illustrated in FIG. 3.

FIG. 3 is an equivalent circuit diagram of a pixel according to an embodiment. FIG. 4 is a waveform diagram illustrating signals for describing an operation of the pixel illustrated in FIG. 3. A pixel PXa illustrated in FIG. 3 may be an embodiment of the pixel PX illustrated in FIG. 2.

Referring to FIG. 3, the pixel PXa may include an organic light emitting diode OLED as a display element and a pixel circuit PC connected to the organic light emitting diode OLED. The pixel circuit PC may include first to sixth transistors T1 to T6 and first and second capacitors C1 and C2. The first transistor T1 may be a driving transistor outputting a driving current corresponding to a data signal, and the second to sixth transistors T2 to T6 may be switching transistors configured to transmit signals. A first terminal (first electrode) of each of the first to sixth transistors T1 to T6 may be a source or a drain, and a second terminal (second electrode) may be a terminal different from the first terminal. For example, when the first terminal is a drain, the second terminal may be a source. A node to which a first gate of the first transistor T1 is connected may be defined as a first node N1, and a node to which a second terminal of the first transistor T1 is connected may be defined as a second node N2.

The pixel PXa may be connected to a first gate line GWL configured to transmit a first gate signal GW, a second gate line GIL configured to transmit a second gate signal GI, a third gate line GRL configured to transmit a third gate signal GR, a fourth gate line GBL configured to transmit a fourth gate signal GB, an emission control line EML configured to transmit an emission control signal EM, and a data line DL configured to transmit a data signal Vdata. Also, the pixel PXa may be connected to a driving voltage line PL configured to transmit a first driving voltage ELVDD, a first initialization voltage line VL1 configured to transmit a first initialization voltage Vint, a second initialization voltage line VL2 configured to transmit a second initialization voltage Vaint, and a reference voltage line VRL configured to transmit a reference voltage Vref.

The first transistor T1 may be connected between the driving voltage line PL and the second node N2. The first transistor T1 may include a gate, a first terminal, and a second terminal connected to the second node N2. The gate of the first transistor T1 may include a first gate connected to the first node N1 and a second gate connected to the second node N2. The first gate and the second gate may be arranged on different layers to face each other. For example, the first gate and the second gate of the first transistor T1 may be located to face each other with a semiconductor layer disposed therebetween. The first terminal of the first transistor T1 may be connected to the driving voltage line PL via the fifth transistor T5, and the second terminal thereof may be connected to the pixel electrode of the organic light emitting diode OLED. The first transistor T1 may receive the data signal Vdata according to a switching operation of the second transistor T2 to control the amount of a driving current flowing through the organic light emitting diode OLED.

The second transistor T2 may be connected between the first gate of the first transistor T1 and the data line DL. The second transistor T2 may include a gate connected to the first gate line GWL, a first terminal connected to the data line DL, and a second terminal connected to the first node N1. The second transistor T2 may be turned on by the first gate signal GW received through the first gate line GWL to electrically connect the data line DL with the first node N1 and transmit the data signal Vdata received through the data line DL to the first node N1.

The third transistor T3 may be connected between the first gate of the first transistor T1 and the reference voltage line VRL. The third transistor T3 may include a gate connected to the third gate line GRL, a first terminal connected to the first node N1, and a second terminal connected to the reference voltage line VRL. The third transistor T3 may be turned on by the third gate signal GR received through the third gate line GRL to transmit the reference voltage Vref received through the reference voltage line VRL to the first node N1.

The fourth transistor T4 may be connected between the first transistor T1 and the first initialization voltage line VL1. The fourth transistor T4 may include a gate connected to the second gate line GIL, a first terminal connected to the second node N2, and a second terminal connected to the first initialization voltage line VL1. The fourth transistor T4 may be turned on by the second gate signal GI received through the second gate line GIL to transmit the first initialization voltage Vint received through the first initialization voltage line VL1 to the second node N2.

The fifth transistor T5 may be connected between the driving voltage line PL and the first transistor T1. The fifth transistor T5 may include a gate connected to the emission control line EML, a first terminal connected to the driving voltage line PL, and a second terminal connected to the first terminal of the first transistor T1. The fifth transistor T5 may be turned on or off according to the emission control signal EM received through the emission control line EML.

The sixth transistor T6 may be connected between the first transistor T1 and the second initialization voltage line VL2. The sixth transistor T6 may include a gate connected to the fourth gate line GBL, a first terminal connected to the second node N2, and a second terminal connected to the second initialization voltage line VL2. The sixth transistor T6 may be turned on by the fourth gate signal GB received through the fourth gate line GBL to transmit the second initialization voltage Vaint received through the second initialization voltage line VL2 to the second node N2.

The first capacitor C1 may be connected between the first gate of the first transistor T1 and the organic light emitting diode OLED. A first electrode of the first capacitor C1 may be connected to the first node N1 and a second electrode thereof may be connected to the second node N2. The first capacitor C1 may be a storage capacitor and may store a voltage corresponding to a threshold voltage of the first transistor T1 and the data signal.

The second capacitor C2 may be connected between the driving voltage line PL and the organic light emitting diode OLED. A first electrode of the second capacitor C2 may be connected to the driving voltage line PL and a second electrode thereof may be connected to the second node N2. The capacitance of the first capacitor C1 may be greater than the capacitance of the second capacitor C2.

The organic light emitting diode OLED may be connected to the first transistor T1. The organic light emitting diode OLED may include a pixel electrode (anode) connected to the second node N2 and an opposite electrode (cathode) facing the pixel electrode. The opposite electrode may receive a second driving voltage ELVSS. The opposite electrode may be a common electrode commonly connected to a plurality of pixels PX.

The pixel PXa may display an image in each frame period. Referring to FIG. 4, one frame period may include a non-emission period NEP in which the pixel PXa does not emit light and an emission period EP in which the pixel PXa emits light. The non-emission period NEP may include a first initialization period P1, a compensation period P2, a write period P3, and a second initialization period P4.

Each of the first gate signal GW, the second gate signal GI, the third gate signal GR, the fourth gate signal GB, and the emission control signal EM may have a high-level voltage during some period and may have a low-level voltage during some period. Here, the high-level voltage may be an on voltage for turning on the transistor, and the low-level voltage may be an off voltage for turning off the transistor.

In the first initialization period P1, the second gate signal GI of the on voltage may be supplied to the second gate line GIL, and the third gate signal GR of the on voltage may be supplied to the third gate line GRL. The first gate signal GW, the fourth gate signal GB, and the emission control signal EM may be supplied with an off voltage. The fourth transistor T4 may be turned on by the second gate signal GI, and the third transistor T3 may be turned on by the third gate signal GR. The first node N1, that is, the first gate of the first transistor T1, may be initialized to the reference voltage Vref by the turned-on third transistor T3. The second node N2, that is, the pixel electrode of the organic light emitting diode OLED, may be initialized to the first initialization voltage Vint by the turned-on fourth transistor T4.

In the compensation period P2, the third gate signal GR of the on voltage may be supplied to the third gate line GRL, and the emission control signal EM of the on voltage may be supplied to the emission control line EML. The first gate signal GW, the second gate signal GI, and the fourth gate signal GB may be supplied with an off voltage. The second transistor T2, the fourth transistor T4, and the sixth transistor T6 may be turned off by the first gate signal GW, the second gate signal GI, and the fourth gate signal GB. The third transistor T3 may be turned on by the third gate signal GR, and the fifth transistor T5 may be turned on by the emission control signal EM. Accordingly, the reference voltage Vref may be supplied to the first node N1 and the first driving voltage ELVDD may be supplied to the first terminal of the first transistor T1, and thus the first transistor T1 may be turned on. When the voltage of the second terminal of the first transistor T1 changes to the difference (Vref−Vth) between the reference voltage Vref and the threshold voltage (Vth) of the first transistor T1, the first transistor T1 may be turned off. Also, a voltage corresponding to the threshold voltage (Vth) of the first transistor T1 may be stored in the first capacitor C1 to compensate for the threshold voltage (Vth) of the first transistor T1.

In the write period P3, the first gate signal GW of the on voltage may be supplied to the first gate line GWL to turn on the second transistor T2. In this case, the third to sixth transistors T3, T4, T5, and T6 may be turned off by the second gate signal GI, the third gate signal GR, the fourth gate signal GB, and the emission control signal EM of the off voltage. The second transistor T2 may be configured to transmit the data signal Vdata from the data line DL to the first node N1, that is, the first gate of the first transistor T1. Accordingly, the voltage of the first node N1 may be changed from the reference voltage Vref to a voltage corresponding to the data signal Vdata. In this case, the voltage of the second node N2 may also be changed corresponding to the amount of change in the voltage of the first node N1. The voltage of the second node N2 may be the voltage ($Vref-Vth+\alpha\times(Vdata-Vref)$) changed according to the capacitance ratio ($\alpha=C1/(C1+C2)$) of the first capacitor C1 and the second capacitor C2. Accordingly, the gate-source voltage (Vgs) of the first transistor T1 (i.e., the voltage between the first node N1 and the second node N2) may be expressed as Equation (1) below.

$$Vgs=(1-\alpha)\times(Vdata-Vref)+Vth=\{(C2/(C1+C2)\}(Vdata-Vref)+Vth \quad (1)$$

In the second initialization period P4, the fourth gate signal GB of the on voltage may be supplied to the fourth gate line GBL. The first gate signal GW, the second gate signal GI, the third gate signal GR, and the emission control signal EM may be supplied with an off voltage. The sixth transistor T6 may be turned on by the fourth gate signal GB and thus the second node N2, that is, the pixel electrode of the organic light emitting diode OLED, may be initialized to the second initialization voltage Vaint. In this case, the gate-source voltage (Vgs) of the first transistor T1 may be expressed as Equation (2) below.

$$Vgs=(1-\alpha)\times(Vdata-Vref)+Vth=\{(C2/(C1+C2)\}(Vdata-Vref)+Vth-Vaint \quad (2)$$

A luminance change may occur due to a voltage remaining in the organic light emitting diode OLED, and such a luminance change may be highly visible in the case of a high-temperature low-gradation display. For example, the organic light emitting diode OLED displaying black in black gradation may emit light with luminance higher than black luminance. An embodiment may effectively prevent a micro-luminescence phenomenon of the pixel PXa by initializing the organic light emitting diode OLED through the sixth transistor T6 before the emission period EP by using the second initialization voltage Vaint. Accordingly, it may be possible to further improve the image quality by minimizing a luminance change of the organic light emitting diode OLED at high temperature and low gradation.

Moreover, an afterimage (color drag) phenomenon of the previous image, which occurs when an image is displayed, may be due to the hysteresis characteristics of the driving transistor and the threshold voltage of the driving transistor may be shifted due to the hysteresis characteristics. An embodiment may prevent the shift of the threshold voltage of the first transistor T1 by controlling the gate-source voltage (Vgs) of the first transistor T1 by supplying the second initialization voltage Vaint higher than the first initialization voltage Vint to the source (second terminal) of the first transistor T1 in the second initialization period P4 before the emission period EP. Accordingly, a luminance deviation due to the shift in the threshold voltage of the first transistor T1 and a luminance deviation due to the degradation of the organic light emitting diode OLED may be minimized.

In the emission period EP, the emission control signal EM may transition to an on voltage, and the first gate signal GW, the second gate signal GI, the third gate signal GR, and the fourth gate signal GB) may be an off voltage. The second to fourth transistors T2, T3, and T4 and the sixth transistor T6 may be turned off by the first gate signal GW, the second gate signal GI, the third gate signal GR, and the fourth gate signal GB and the fifth transistor T5 may be turned on by the emission control signal EM, and thus the first driving voltage ELVDD may be supplied to the first terminal of the first transistor T1.

The first transistor T1 may output a driving current ($Id\propto(Vgs-Vth)^2$) having a magnitude corresponding to the voltage stored in the first capacitor C1, that is, the voltage (Vgs−Vth) obtained by subtracting the threshold voltage (Vth) of the first transistor T1 from the gate-source voltage (Vgs) of the first transistor T1, and the organic light emitting diode OLED may emit light with luminance corresponding to the magnitude of the driving current irrelevant to the threshold voltage (Vth) of the first transistor T1.

As a comparative example, in a display apparatus to which a pixel in which the sixth transistor T6 is omitted in the pixel circuit of FIG. 3 is applied, the second initialization period P4 may be omitted, and one frame period may include the first initialization period P1, the compensation period P2, the write period P3, and the emission period EP. Moreover, the luminance deviation between high-speed driving (e.g., 120 Hz driving) and low-speed driving (e.g., 1 Hz driving) may be decreased by increasing the first initialization voltage Vint. However, the increase in the first initialization voltage Vint may reduce the gate-source voltage (Vgs) of the first transistor T1 in the compensation period P2 which obstructs threshold voltage compensation. As a result, stains in an image may increase due to the insufficient threshold voltage compensation.

An embodiment may separate the initialization before the compensation period P2 and the initialization after the compensation period P2 by using the fourth transistor T4 connected between the second node N2 and the first initialization voltage line VL1 and the sixth transistor T6 connected between the second node N2 and the second initialization voltage line VL2. The gate initialization and threshold voltage compensation of the transistor T1 may be secured by applying the first initialization voltage Vint to the second node N2 and applying the reference voltage Vref to the first node N1 in the first initialization period P1 before the compensation period P2. Also, the initialization of the organic light emitting diode OLED and the luminance deviation between high-speed driving and low-speed driving may be minimized by initializing the second node N2 to the second initialization voltage Vaint higher than the first initialization voltage Vint in the second initialization period P4 after the compensation period P2.

An embodiment may reduce the luminance deviation due to the temperature luminance shift, the threshold voltage shift of the transistor, and the degradation of the organic light emitting diode by separately using the first initialization voltage Vint used in the first initialization period P1 and the second initialization voltage Vaint used in the second initialization period P4.

FIGS. 5 to 8 are diagrams schematically illustrating a connection between a pixel and a second initialization voltage line according to an embodiment.

A plurality of pixels PX may include a first pixel PX1 emitting light in a first color, a second pixel PX2 emitting light in a second color, and a third pixel PX3 emitting light in a third color. For example, the first pixel PX1 may be a red pixel, the second pixel PX2 may be a green pixel, and the third pixel PX3 may be a blue pixel. In an embodiment, by considering the light emitting characteristics of the first pixel PX1, the second pixel PX2, and the third pixel PX3, different second initialization voltages Vaint may be supplied to the first pixel PX1, the second pixel PX2, and the third pixel PX1.

Figure 5:
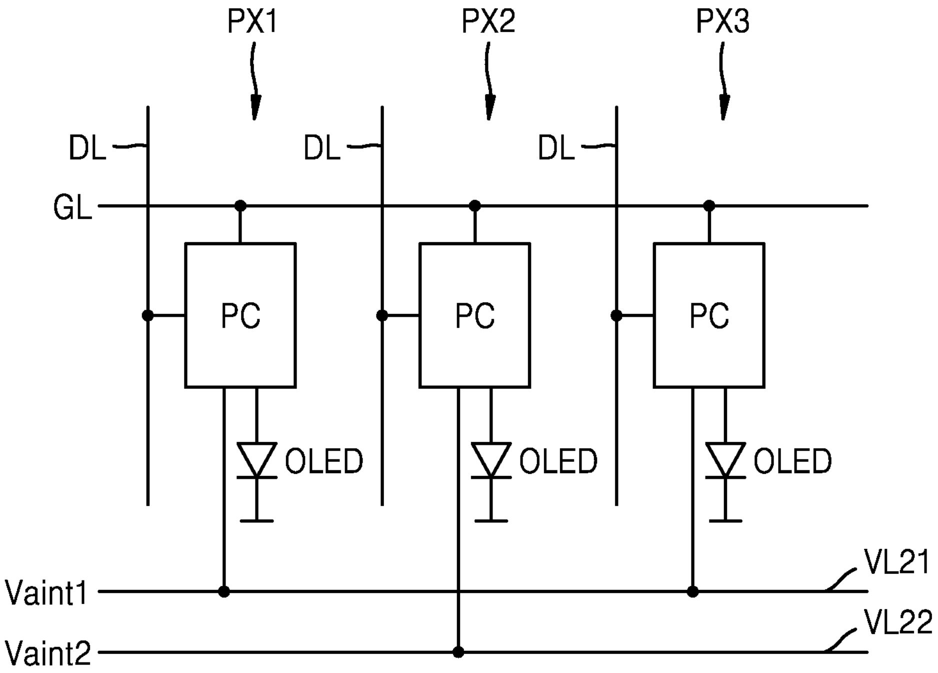
FIGS. 5, 6, 7 and 8 are diagrams schematically illustrating a connection relationship between a pixel and a second initialization voltage line according to an embodiment.
Figure 6:
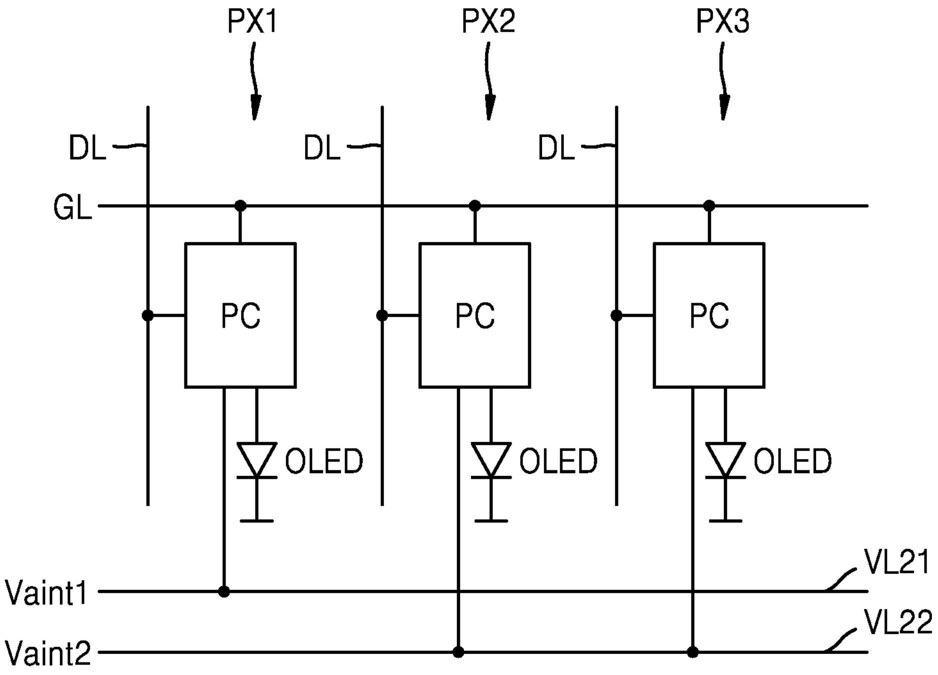
Figure 7:
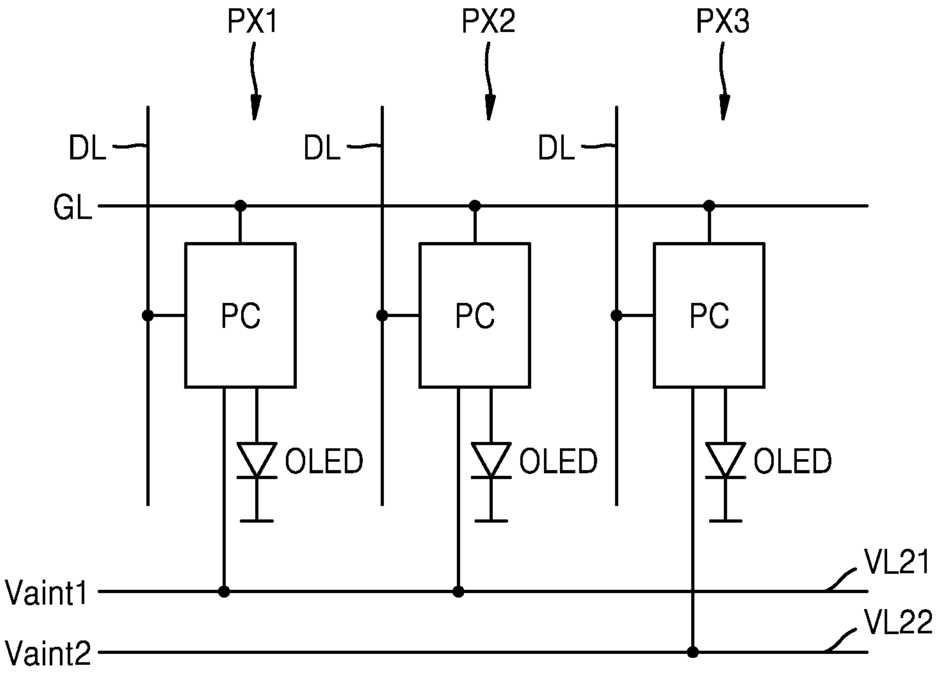
Figure 8:
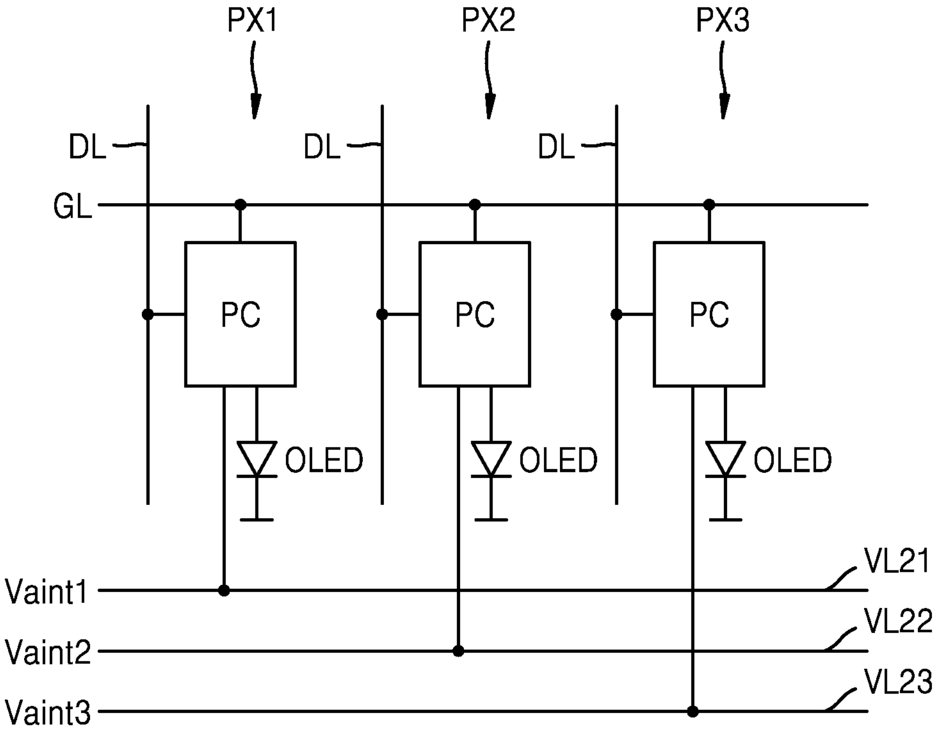

For example, as illustrated in FIG. 5, the first pixel PX1 and the third pixel PX3 may be connected to a $(2\text{-}1)^{th}$ initialization voltage line VL21 for supplying a $(2\text{-}1)^{th}$ initialization voltage Vaint1, and the second pixel PX2 may be connected to a $(2\text{-}2)^{th}$ initialization voltage line VL22 for supplying a $(2\text{-}2)^{th}$ initialization voltage Vaint2. Alternatively, as illustrated in FIG. 6, the first pixel PX1 may be connected to a $(2\text{-}1)^{th}$ initialization voltage line VL21 for supplying a $(2\text{-}1)^{th}$ initialization voltage Vaint1, and the second pixel PX2 and the third pixel PX3 may be connected to a $(2\text{-}2)^{th}$ initialization voltage line VL22 for supplying a $(2\text{-}2)^{th}$ initialization voltage Vaint2. Alternatively, as illustrated in FIG. 7, the first pixel PX1 and the second pixel PX2 may be connected to a $(2\text{-}1)^{th}$ initialization voltage line VL21 for supplying a $(2\text{-}1)^{th}$ initialization voltage Vaint1, and the third pixel PX3 may be connected to a $(2\text{-}2)^{th}$ initialization voltage line VL22 for supplying a $(2\text{-}2)^{th}$ initialization voltage Vaint2. Alternatively, as illustrated in FIG. 8, the first pixel PX1 may be connected to a $(2\text{-}1)^{th}$ initialization voltage line VL21 for supplying a $(2\text{-}1)^{th}$ initialization voltage Vaint1, the second pixel PX2 may be connected to a $(2\text{-}2)^{th}$ initialization voltage line VL22 for supplying a $(2\text{-}2)^{th}$ initialization voltage Vaint2, and the third pixel PX3 may be connected to a $(2\text{-}3)^{th}$ initialization voltage line VL23 for supplying a $(2\text{-}3)^{th}$ initialization voltage Vaint3.

An embodiment may improve the low-gradation luminance change and color change issue due to the difference in the characteristics of the organic light emitting diodes OLED by separately providing the second initialization voltage line VL2 connected to at least one of the first pixel PX1, the second pixel PX2, or the third pixel PX3 and supplying different second initialization voltages Vaint to each second initialization voltage line VL2.

Although not illustrated, like in FIGS. 5 to 8, by considering the light emitting characteristics of the first pixel PX1, the second pixel PX2, and the third pixel PX3, an embodiment may separately provide the first initialization voltage line VL1 connected to at least one of the first pixel PX1, the second pixel PX2, and the third pixel PX3 and supply different initialization voltages Vint to each first initialization voltage line VL1.

Hereinafter, descriptions will be given based on an embodiment in which the first pixel PX1 and the third pixel PX3 are connected to the $(2\text{-}1)^{th}$ initialization voltage line VL21 and the second pixel PX2 is connected to the $(2\text{-}2)^{th}$ initialization voltage line VL22 as illustrated in FIG. 5.

Figure 9:
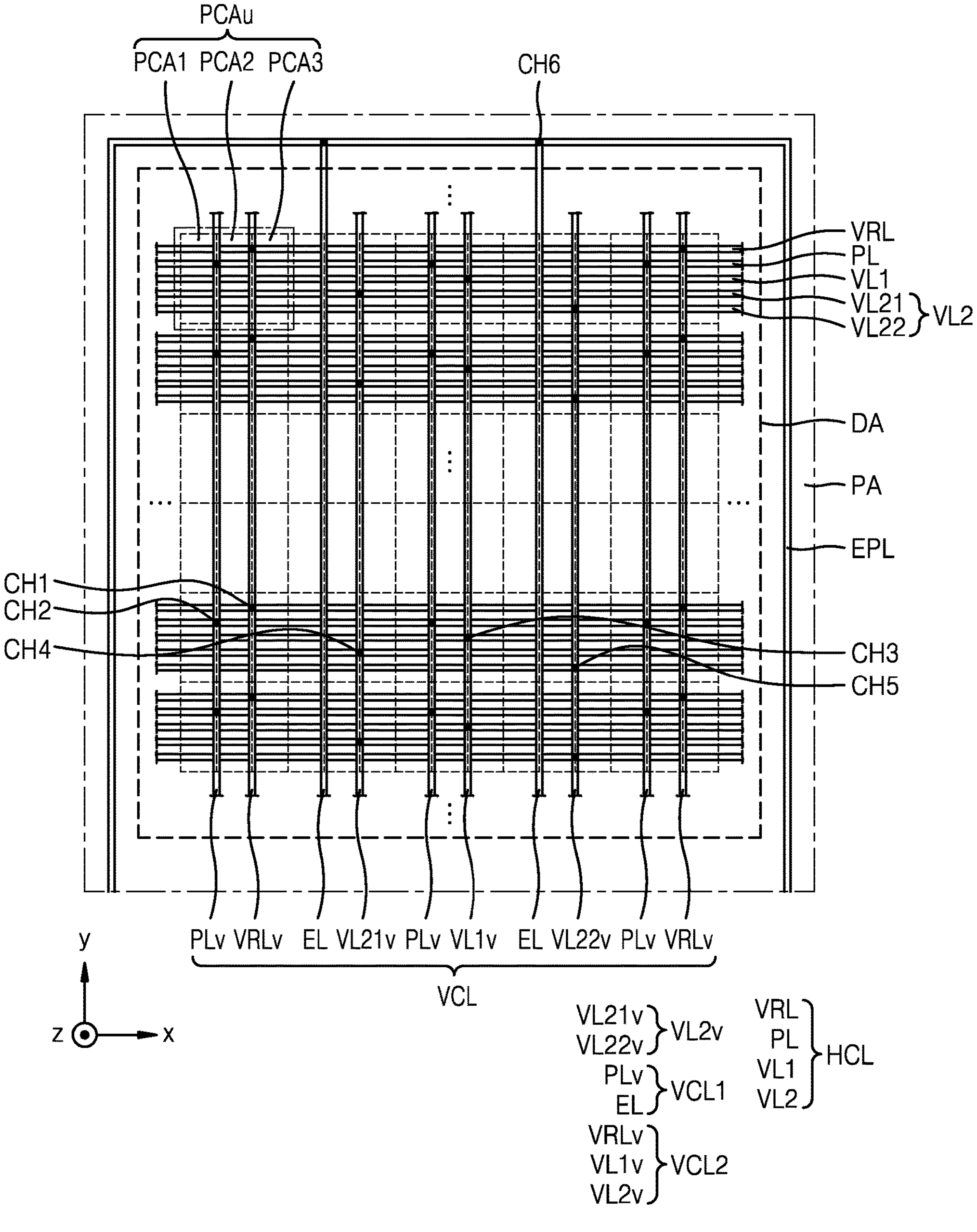
FIG. 9 is a diagram schematically illustrating a connection relationship between signal lines arranged in a display area according to an embodiment.

FIG. 9 is a diagram schematically illustrating a connection between signal lines arranged in the display area DA according to an embodiment.

As illustrated in FIG. 9, a plurality of unit pixel areas PCAu may be defined in the display area DA. The unit pixel area PCAu may include two or more pixel areas, and each pixel area may be an area in which a row (R) and a column (M) intersect each other and may be an area in which a pixel circuit is arranged. In an embodiment, the unit pixel area PCAu may include three pixel areas. The unit pixel area PCAu may include a first pixel area PCA1, a second pixel area PCA2, and a third pixel area PCA3 that are disposed adjacent to each other in the x direction. For example, the first pixel area PCA1 may be an area in which a pixel circuit of a first pixel PX1 is arranged. The second pixel area PCA2 may be an area in which a pixel circuit of a second pixel PX2 is arranged. The third pixel area PCA3 may be an area in which a pixel circuit of a third pixel PX3 is arranged.

Horizontal conductive lines HCL extending in the x direction and vertical conductive lines VCL extending in the y direction may be arranged in the display area DA.

The horizontal conductive lines HCL may include a reference voltage line VRL, a driving voltage line PL, a first initialization voltage line VL1, and a second initialization voltage line VL2. The second initialization voltage line VL2 may include a $(2\text{-}1)^{th}$ initialization voltage line VL21 and a $(2\text{-}2)^{th}$ initialization voltage line VL22. A reference voltage line VRL, a driving voltage line PL, a first initialization voltage line VL1, a $(2\text{-}1)^{th}$ initialization voltage line VL21, and a $(2\text{-}2)^{th}$ initialization voltage line VL22 may be arranged in each row.

The vertical conductive lines VCL may include a vertical reference voltage line VRLv, a vertical driving voltage line PLv, a first vertical initialization voltage line VL1*v*, and a second vertical initialization voltage line VL2*v*. The second vertical initialization voltage line VL2*v* may include a $(2\text{-}1)^{th}$ vertical initialization voltage line VL21*v* and a $(2\text{-}2)^{th}$ vertical initialization voltage line VL22*v*.

The reference voltage lines VRL may be electrically connected to the vertical reference voltage lines VRLv through contact holes CH1 to form a mesh structure in the display area DA. The driving voltage lines PL may be electrically connected to the vertical driving voltage lines PLv through contact holes CH2 to form a mesh structure in the display area DA. The first initialization voltage lines VL1 may be electrically connected to the first vertical initialization voltage lines VL1*v* through contact holes CH3 to form a mesh structure in the display area DA. The $(2\text{-}1)^{th}$ initialization voltage lines VL21 may be electrically connected to the $(2\text{-}1)^{th}$ vertical initialization voltage lines VL21*v* through contact holes CH4 to form a mesh structure in the display area DA. The $(2\text{-}2)^{1}$ initialization voltage lines VL22 may be electrically connected to the $(2\text{-}2)^{th}$ vertical initialization voltage lines VL22*v* through contact holes CH5 to form a mesh structure in the display area DA.

In the display area DA, a common voltage line EL may be further arranged as one of the vertical conductive lines VCL. The common voltage lines EL may be electrically connected through contact holes CH6 to a common voltage supply line EPL arranged in the peripheral area PA. In an embodiment, an opposite electrode may be electrically connected to the common voltage lines EL at certain intervals in the display area DA.

Although not illustrated, voltage supply lines electrically connected to the horizontal conductive lines HCL and/or the vertical conductive lines VCL may be further arranged in the peripheral area PA. The voltage supply lines may be arranged on at least one of the upper side, the lower side, the left side, or the right side of the display area PA.

Each of the vertical conductive lines VCL may be arranged at certain intervals between a pair of adjacent pixel areas in the x direction. The vertical conductive lines VCL may include first vertical conductive lines VCL1 and second vertical conductive lines VCL2. The first vertical conductive lines VCL1 may include a vertical driving voltage line PLv and a common voltage line EL. The second vertical conductive lines VCL2 may include a vertical reference voltage line VRLv, a first vertical initialization voltage line VL1*v*, a $(2\text{-}1)^{th}$ vertical initialization voltage line VL21*v*, and a $(2\text{-}2)^{th}$ vertical initialization voltage line VL22*v*.

One of the first vertical conductive lines VCL1 and one of the second vertical conductive lines VCL2 may be arranged in the unit pixel area PCAu.

The vertical driving voltage line PLv and the common voltage line EL may be alternately arranged at intervals of the unit pixel area PCAu, that is, at intervals of three pixel areas or three columns, in the x direction. The vertical driving voltage line PLv may be arranged at intervals of two unit pixel areas PCAu, that is, at intervals of six pixel areas or six columns, in the x direction. The common voltage line EL may be arranged at intervals of two unit pixel area PCAu, that is, at intervals of six pixel areas or six columns, in the x direction.

The vertical reference voltage line VRLv, the first vertical initialization voltage line VL1*v*, the $(2\text{-}1)^{th}$ vertical initialization voltage line VL21$v$, and the (2-2)$^{th}$ vertical initialization voltage line VL22$v$ may be alternately arranged at intervals of the unit pixel areas PCAu, that is, at intervals of three pixel areas or three columns, in the x direction. The vertical reference voltage line VRLv may be arranged at intervals of four unit pixel areas PCAu, that is, at intervals of 12 pixel areas or 12 columns, in the x direction. The (2-1)$^{th}$ vertical initialization voltage line VL21$v$ may be arranged at intervals of four unit pixel areas PCAu, that is, at intervals of 12 pixel areas or 12 columns, in the x direction. The first vertical initialization voltage line VL1$v$ may be arranged at intervals of four unit pixel areas PCAu, that is, at intervals of 12 pixel areas or 12 columns, in the x direction. The (2-2)$^{th}$ vertical initialization voltage line VL22$v$ may be arranged at intervals of four unit pixel areas PCAu, that is, at intervals of 12 pixel areas or 12 columns, in the x direction.

In an embodiment, the vertical conductive lines VCL may be arranged on a different layer than the horizontal conductive lines HCL. Some of the horizontal conductive lines HCL may be arranged on the same layer and some others may be arranged on different layers. The vertical conductive lines VCL may be arranged on the same layer.

Figure 12:
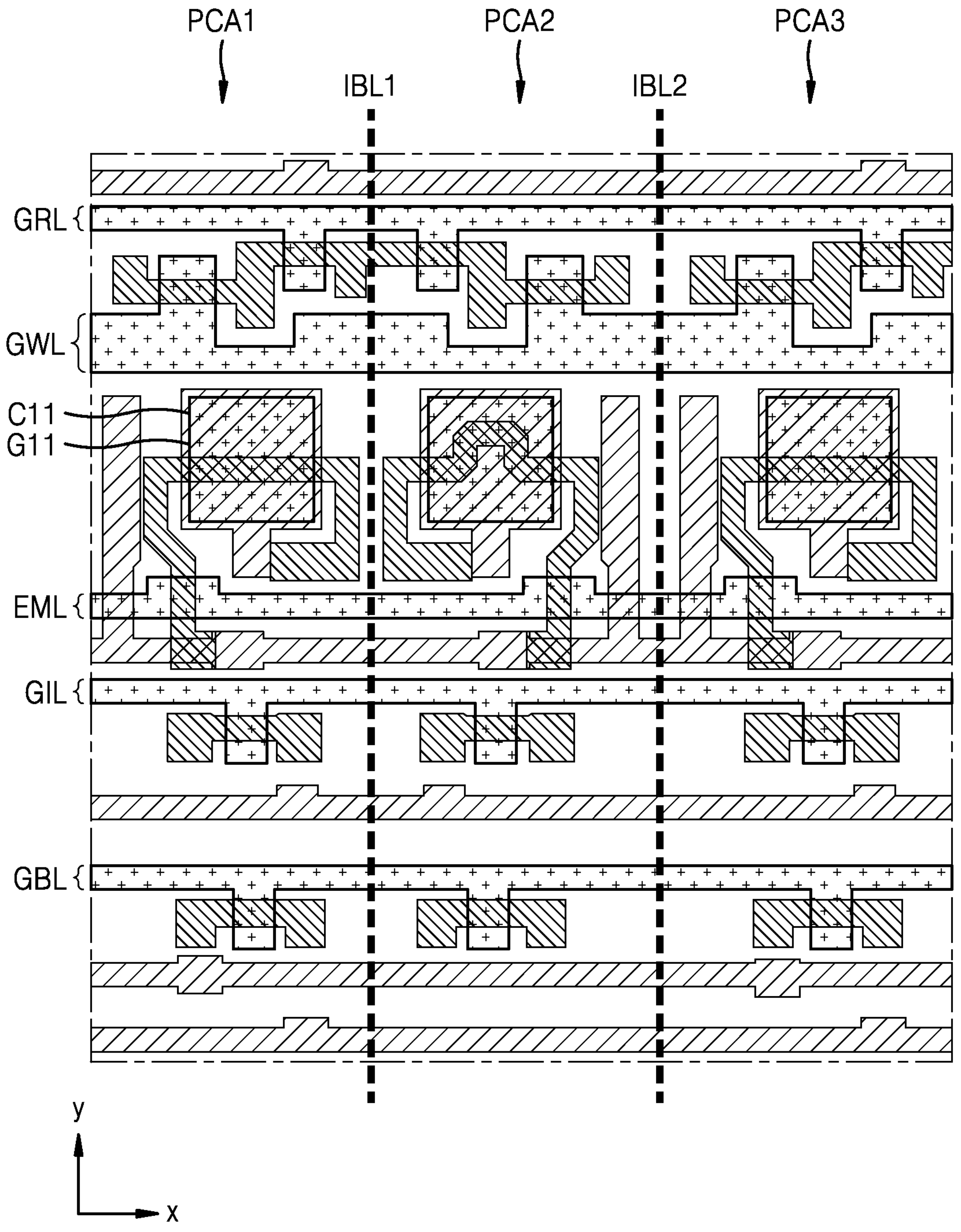
Figure 13:
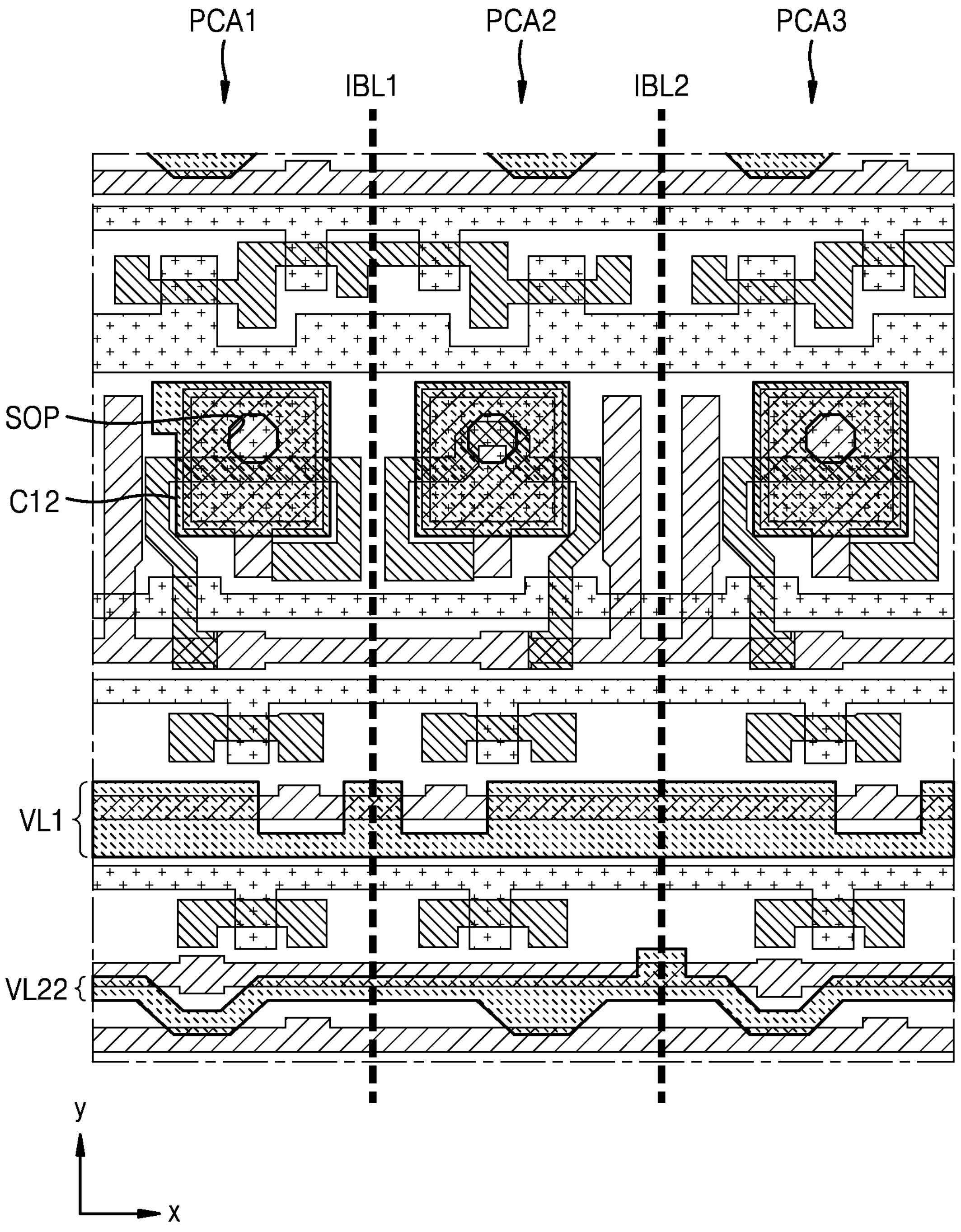
Figure 14:
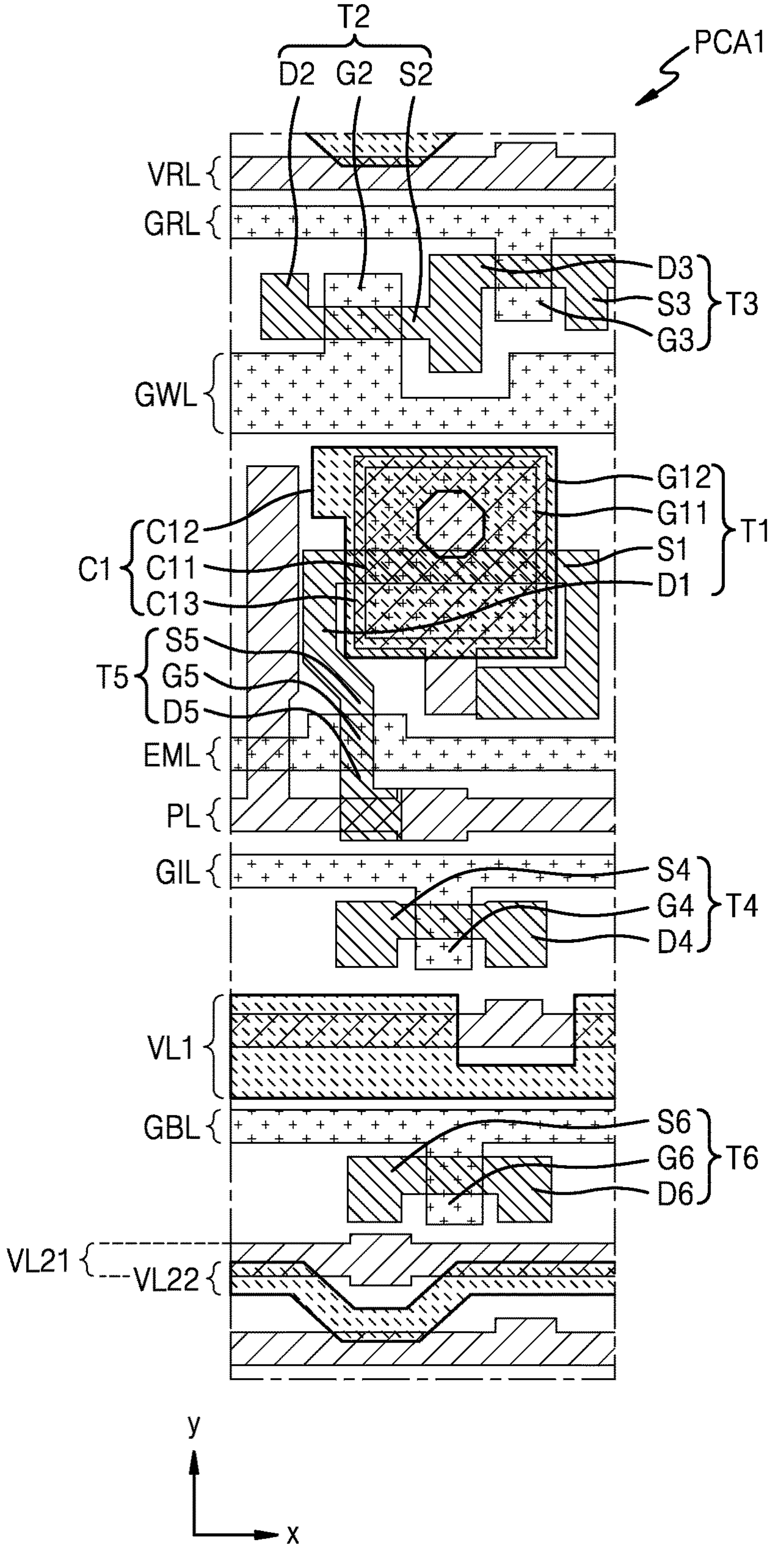
Figure 18:
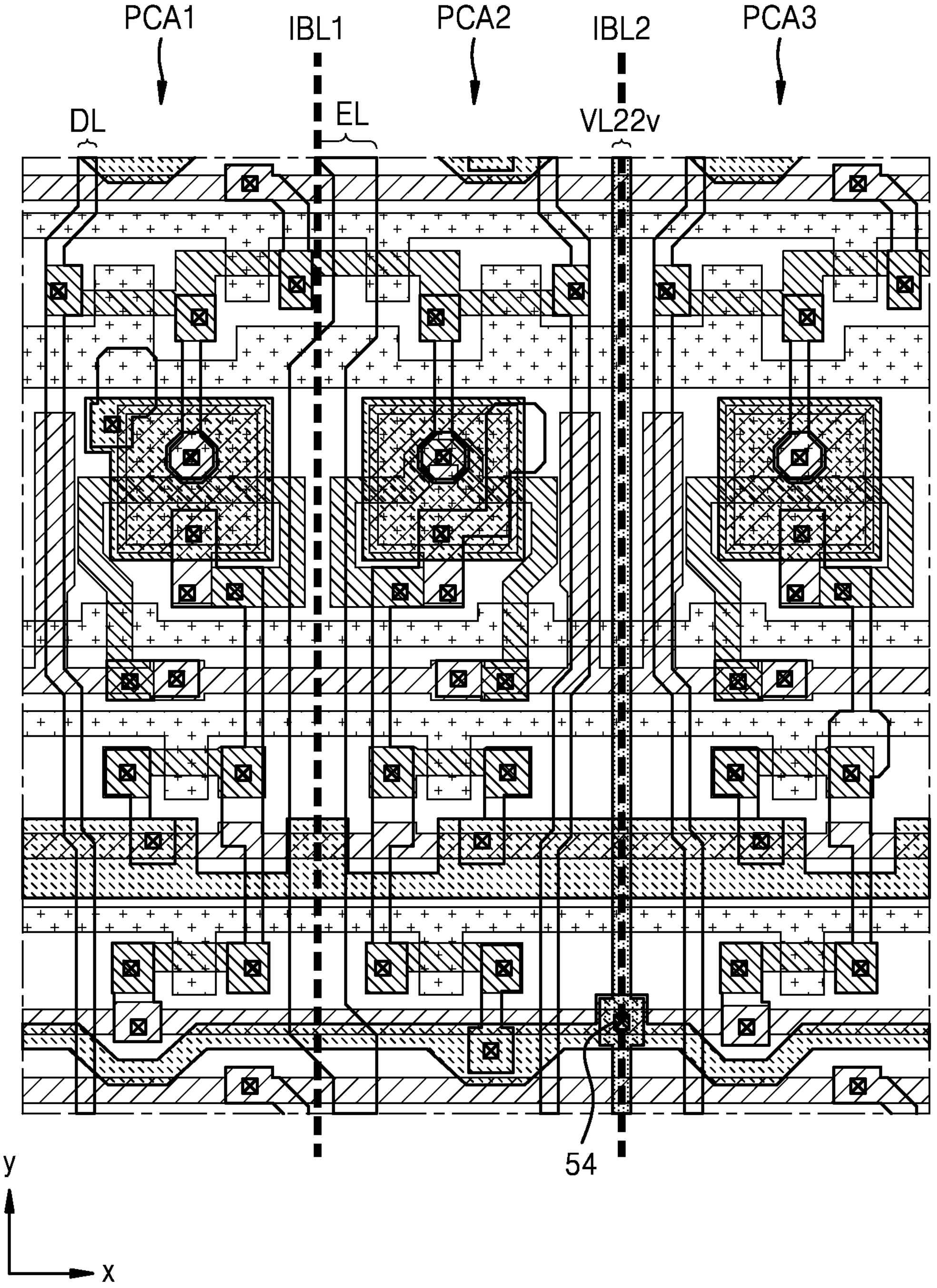
Figure 19:
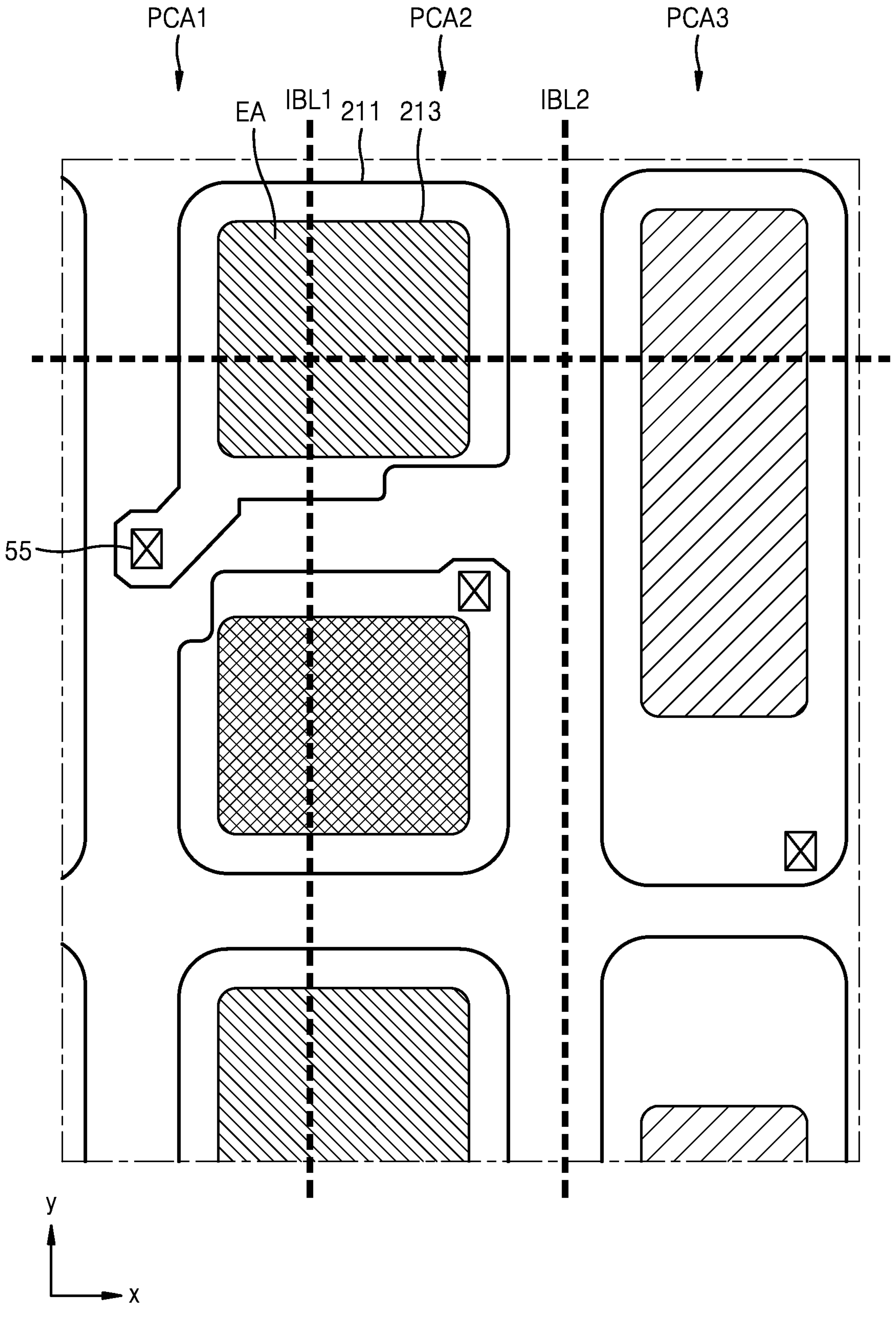
Figure 20:
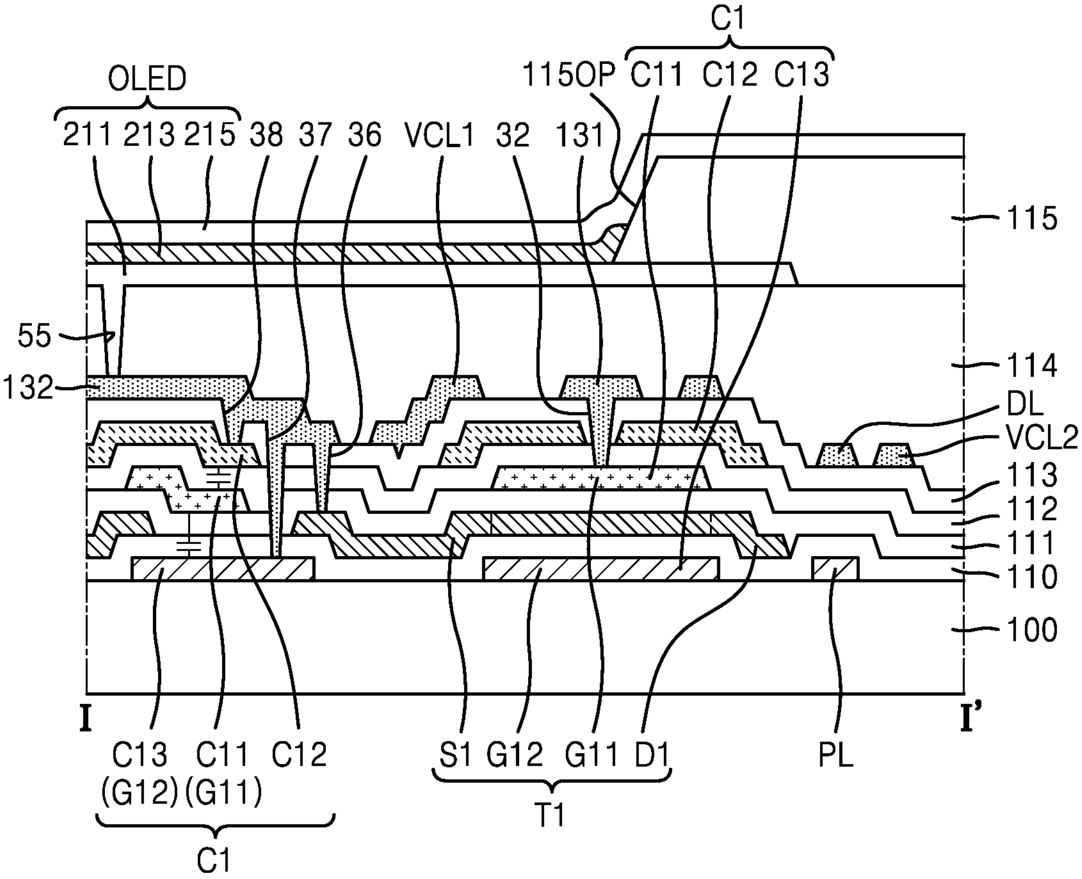
FIG. 20 is a cross-sectional view of the pixel taken along a line I-I' of FIG. 15.
Figure 21:
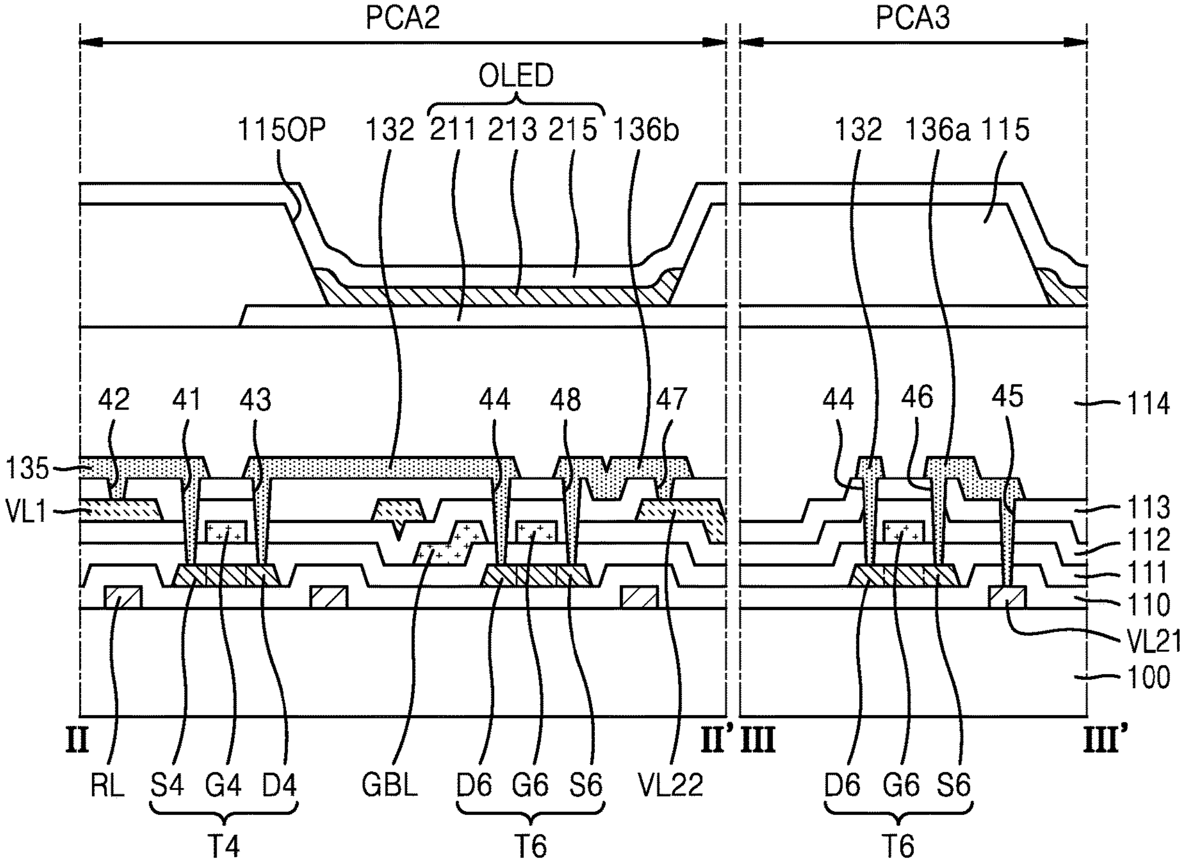
FIG. 21 is a cross-sectional view of the pixel taken along lines II-II' and III-III' of FIG. 15.

FIGS. 10 to 19 are arrangement diagrams schematically illustrating elements of the pixel of FIG. 3 layer by layer. FIG. 14 is a plan view illustrating elements of the first pixel area PCA1 as a portion of FIG. 13. FIG. 20 is a cross-sectional view of the pixel taken along a line I-I' of FIG. 15, in which a display element is disposed. FIG. 21 is a cross-sectional view of the pixel taken along lines II-II' and III-III' of FIG. 15, in which a display element is disposed. FIGS. 20 and 21 may be similarly applied to the corresponding areas of FIGS. 16 to 18.

A display area DA defined at a substrate 100 may include a plurality of pixel areas. Each of pixel areas may be an area in which a row and a column intersect each other and the pixel circuit is arranged. The same elements may be arranged on each layer of a first pixel area PCA1, a second pixel area PCA2, and a pixel area PCA3 that are three areas adjacent to each other in the x direction. The same elements may be arranged on each layer of a first pixel area PCA1, a second pixel area PCA2, and a pixel area PCA3 except an intermediate layer in the organic light emitting diode OLED. For convenience of illustration, identification numbers are assigned to elements of the pixel circuit arranged in the first pixel area PCA1. The cross-sectional views of FIGS. 20 and 21 are cross-sectional views of the second pixel area PCA2. Hereinafter, descriptions will be given with reference to FIGS. 10 to 21 together.

The pixel circuit arranged in the first pixel area PCA1 and the pixel circuit arranged in the second pixel area PCA2 may be symmetrical each other with respect to a boundary line IBL1 disposed between the first pixel area PCA1 and the second pixel area PCA2. The pixel circuit arranged in the second pixel area PCA2 and the pixel circuit arranged in the third pixel area PCA3 may be symmetrical with respect to a boundary line IBL2 disposed between the second pixel area PCA2 and the third pixel area PCA3.

The substrate 100 may include a glass material, a ceramic material, a metal material, or a flexible or bendable material. The substrate 100 may include a single-layer structure of an organic layer or a multilayer structure of an organic layer and an inorganic layer. For example, the substrate 100 may include a stack structure of a first base layer/a barrier layer/a second base layer. Each of the first base layer and the second base layer may include an organic layer including a polymer resin. The first base layer and the second base layer may include a transparent polymer resin. The barrier layer may prevent penetration of external foreign substances and may include a single layer or multiple layers including an inorganic material such as silicon nitride ($SiN_x$) or silicon oxide ($SiO_x$).

Figure 10:
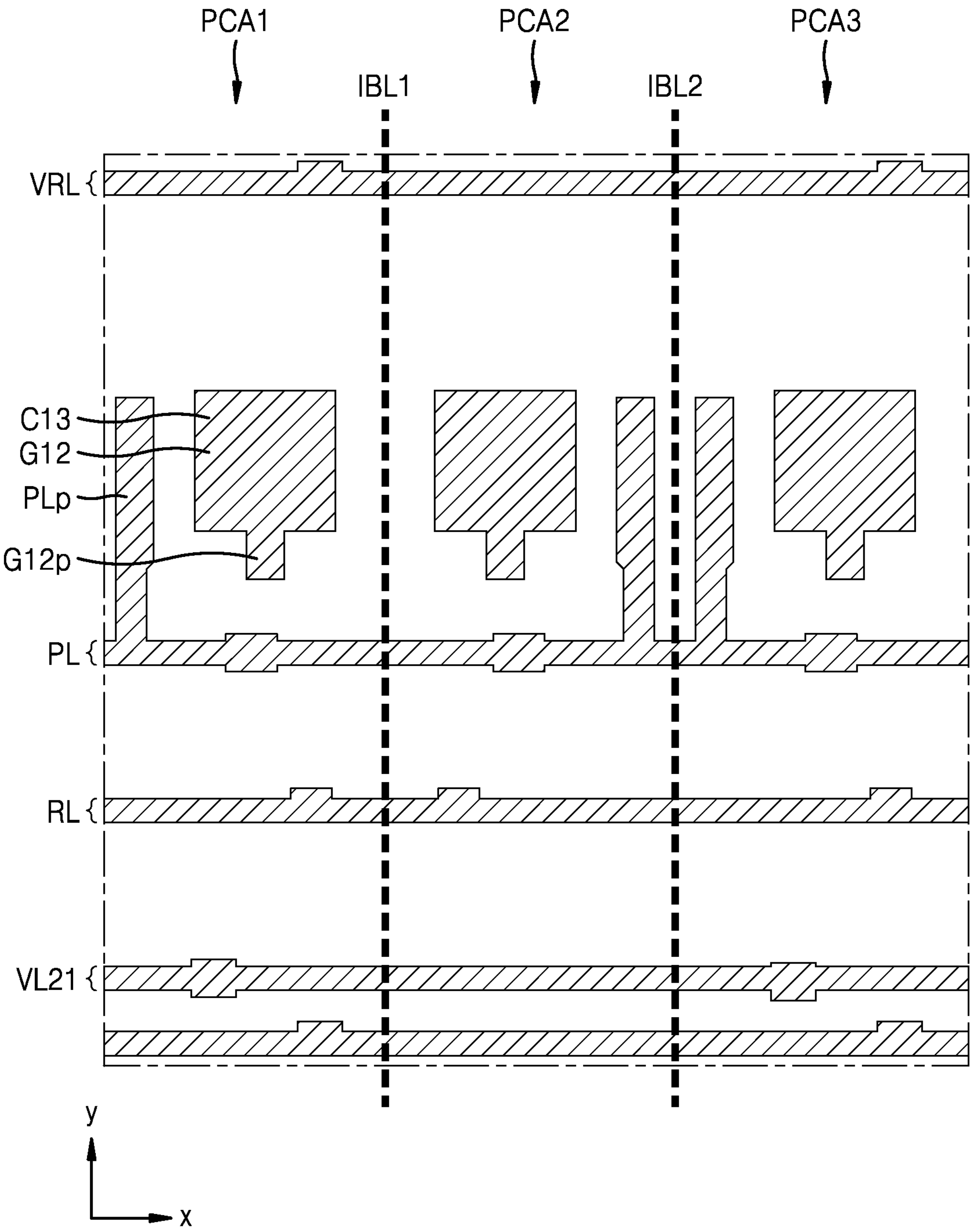
FIGS. 10,11, 12, 13, 14, 15, 16, 17, 18 and 19 are arrangement diagrams schematically illustrating elements of the pixel of FIG. 3 layer by layer.

Referring to FIG. 10, a first conductive layer may be disposed over the substrate 100. The first conductive layer may include a reference voltage line VRL, a second gate electrode G12 of the first transistor T1, a driving voltage line PL, and a (2-1)$^{th}$ initialization voltage line VL21. In another embodiment, a barrier layer may be further arranged between the substrate 100 and the first conductive layer. In another embodiment, the barrier layer may include a lower barrier layer and an upper barrier layer, and the first conductive layer may be arranged between the lower barrier layer and the upper barrier layer.

The reference voltage line VRL, the driving voltage line PL, and the (2-1)$^{th}$ initialization voltage line VL21 may extend in the x direction and may be arranged in the first pixel area PCA1, the second pixel area PCA2, and the third pixel area PCA3. The driving voltage line PL may include a protrusion portion PLp protruding and extending in the y direction from a main line extending in the x direction in each pixel area.

The second gate electrode G12 that is a lower gate electrode (bottom gate electrode) of the first transistor T1 may be provided in an island (isolated) type. The second gate electrode G12 of the first transistor T1 may include a protrusion portion G12$p$. The second gate electrode G12 of the first transistor T1 may be a lower electrode C13 of the second electrode of the first capacitor C1 (see FIG. 20).

In an embodiment, the first conductive layer may further include a repair line RL. The repair line RL may extend in the x direction and may be arranged in the first pixel area PCA1, the second pixel area PCA2, and the third pixel area PCA3.

Figure 11:
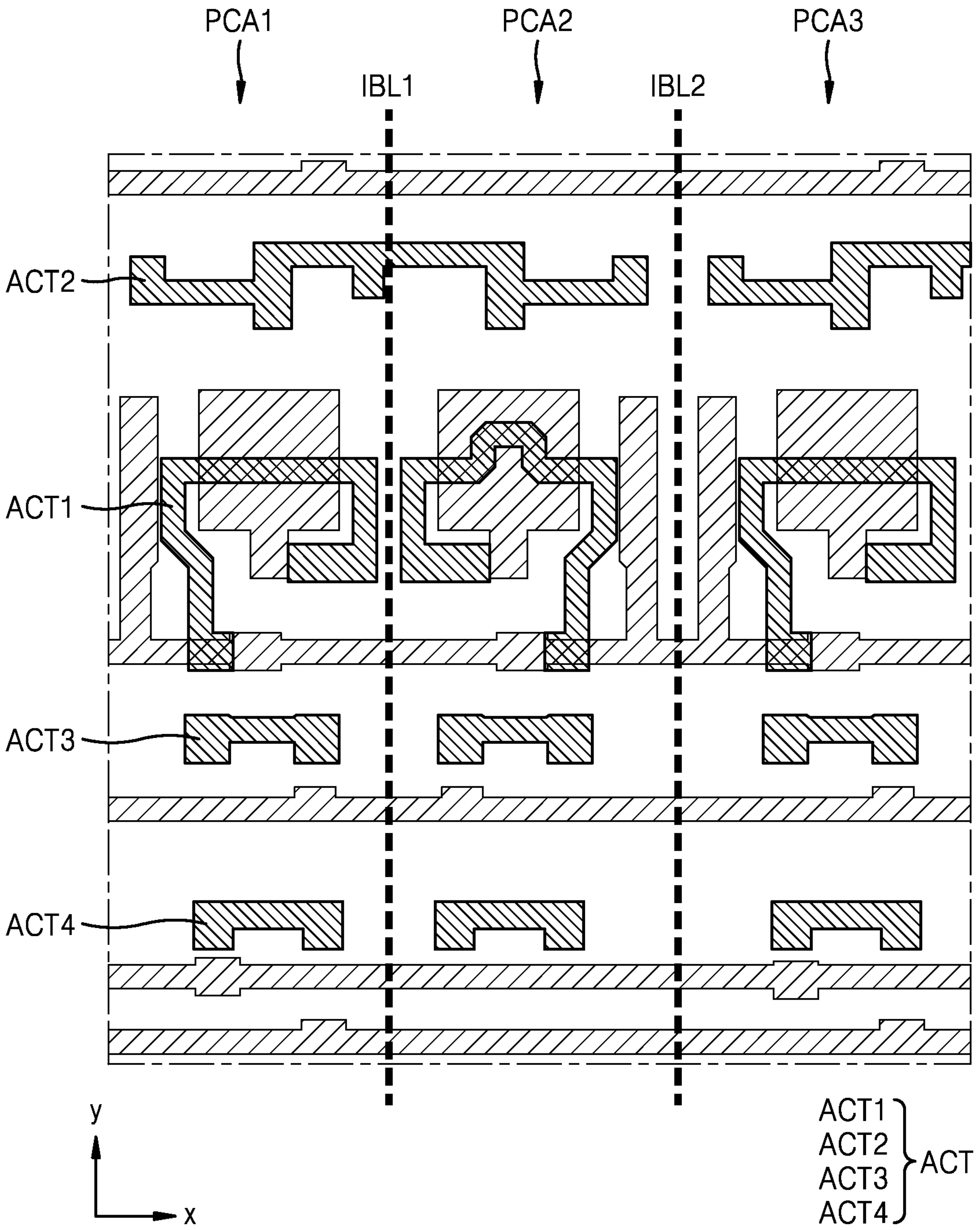

A buffer layer 110 may be disposed over the first conductive layer, and a semiconductor layer ACT may be disposed over the buffer layer 110. The semiconductor layer ACT may include amorphous silicon, polysilicon, or organic semiconductor material such as oxide semiconductor. As illustrated in FIG. 11, the semiconductor layer ACT may include a first semiconductor layer ACT1, a second semiconductor layer ACT2, a third semiconductor layer ACT3, and a fourth semiconductor layer ACT4. The semiconductor layer ACT may include a channel area of each of the first to sixth transistors T1 to T6 and a source area and a drain area disposed on both sides of the channel area. The source area or the drain area may be interpreted as a source electrode or a drain electrode of a transistor in some cases.

Referring to FIG. 14, the first semiconductor layer ACT1 may include a source area S1 and a drain area D1 of the first transistor T1, and a source area S5 and a drain area D5 of the fifth transistor T5. The second semiconductor layer ACT2 may include a source area S2 and a drain area D2 of the second transistor T2, and a source area S3 and a drain area D3 of the third transistor T3. The third semiconductor layer ACT3 may include a source area S4 and a drain area D4 of the fourth transistor T4. The fourth semiconductor layer ACT4 may include a source area S6 and a drain area D6 of the sixth transistor T6.

The channel area of the first transistor T1 in the first pixel area PCA1 and the third pixel area PCA3 may have a linear shape, and the channel area of the first transistor T1 in the second pixel area PCA2 may have a curved shape including vent portions.

The second semiconductor layers ACT2 of two pixel areas may be connected to each other. For example, the second semiconductor layers ACT2 of the first pixel area PCA1 and the second pixel area PCA2 may be connected to each other.

A first insulating layer 111 may be disposed over the semiconductor layer ACT, and a second conductive layer may be disposed over the first insulating layer 111. As illustrated in FIG. 12, the second conductive layer may include gate electrodes G1 to G6 of the first to sixth transistors T1 to T6. Also, the second conductive layer may include a first gate line GWL, a second gate line GIL, a third gate line GRL, a fourth gate line GBL, and an emission control line EML.

The first gate line GWL, the second gate line GIL, the third gate line GRL, the fourth gate line GBL, and the emission control line EML may extend in the x direction and may be arranged in the first pixel area PCA1, the second pixel area PCA2, and the third pixel area PCA3.

The gate electrodes G1 to G6 of the first to sixth transistors T1 to T6 may overlap the channel areas of the semiconductor layer ACT.

Referring to FIG. 14, a first gate electrode G11 that is an upper gate electrode (top gate electrode) of the first transistor T1 may be provided in an island type. The first gate electrode G11 of the first transistor T1 may overlap the first semiconductor layer ACT1. The first gate electrode G11 of the first transistor T1 may overlap the second gate electrode G12. The first gate electrode G11 of the first transistor T1 may be a first electrode C11 of the first capacitor C1. A gate electrode G2 of the second transistor T2 may be a portion of the first gate line GWL that intersects (overlaps) the second semiconductor layer ACT2. A gate electrode G3 of the third transistor T3 may be a portion of the third gate line GRL that intersects (overlaps) the second semiconductor layer ACT2. A gate electrode G4 of the fourth transistor T4 may be a portion of the second gate line GIL that intersects (overlaps) the third semiconductor layer ACT3. A gate electrode G5 of the fifth transistor T5 may be a portion of the emission control line EML that intersects (overlaps) the first semiconductor layer ACT1. A gate electrode G6 of the sixth transistor T6 may be a portion of the fourth gate line GBL that intersects (overlaps) the fourth semiconductor layer ACT4.

A second insulating layer 112 may be disposed over the first insulating layer 111 to cover the second conductive layer, and a third conductive layer may be disposed over the second insulating layer 112. As illustrated in FIG. 13, the third conductive layer may include an upper electrode C12 of the second electrode of the first capacitor C1, a first initialization voltage line VL1, and a $(2\text{-}2)^{th}$ initialization voltage line VL22.

The upper electrode C12 of the second electrode of the first capacitor C1 may be provided in an island type. The upper electrode C12 of the second electrode of the first capacitor C1 may overlap and cover the lower electrode C13 of the second electrode and the first electrode C11 of the first capacitor C1. An opening SOP may be formed in the upper electrode C12 of the second electrode of the first capacitor C1. The first capacitor C1 may include a lower electrode C13 of the second electrode, a first electrode C11, and an upper electrode C12 of the second electrode and may overlap the first transistor T1.

The first initialization voltage line VL1 and the $(2\text{-}2)^{th}$ initialization voltage line VL22 may extend in the x direction and may be arranged in the first pixel area PCA1, the second pixel area PCA2, and the third pixel area PCA3.

A third insulating layer 113 may be disposed over the second insulating layer 112 to cover the third conductive layer, and a fourth conductive layer may be disposed over the third insulating layer 113. As illustrated in FIGS. 15 to 18, the fourth conductive layer may include a data line DL, a first node electrode 131, a second node electrode 132, conductive patterns 133, 134, 135, 136*a*, 136*b*, and 137, and vertical conductive lines VCL.

The conductive pattern 136*a* may be provided in at least one of the pixel areas in the unit pixel area PCAu, for example, the first pixel area PCA1 and the third pixel area PCA3. The conductive pattern 136*b* may be provided in at least one of the pixel areas in the unit pixel area PCAu, for example, the second pixel area PCA2. The conductive pattern 137 may be provided in at least one of the pixel areas in the unit pixel area PCAu, for example, the first pixel area PCA1.

The data line DL may be arranged in each pixel area to extend in the y direction. The data line DL may be electrically connected to the drain area D2 of the second transistor T2 through a contact hole 31 formed through the first insulating layer 111, the second insulating layer 112, and the third insulating layer 113.

The first node electrode 131 may electrically connect the first gate electrode G11 of the first transistor T1 to the second transistor T2 and the third transistor T3 through the opening SOP of the upper electrode C12 of the second electrode of the first capacitor C1. One end of the first node electrode 131 may be electrically connected to the first gate electrode G11 of the first transistor T1 through a contact hole 32 formed through the second insulating layer 112 and the third insulating layer 113. The other end of the first node electrode 131 may be electrically connected to the source area S2 of the second transistor T2 and the drain area D3 of the third transistor T3 through a contact hole 33 formed through the first insulating layer 111, the second insulating layer 112, and the third insulating layer 113.

The second node electrode 132 may electrically connect the source area S1 of the first transistor T1 to the fourth transistor T4 and the sixth transistor T6.

A first portion of one end of the second node electrode 132 may be electrically connected to the source area S1 of the first transistor T1 through a contact hole 36 formed through the first insulating layer 111, the second insulating layer 112, and the third insulating layer 113. A second portion of one end of the second node electrode 132 may be electrically connected to the protrusion portion G12*p* of the second gate electrode G12 of the first transistor T1 through a contact hole 37 formed through the buffer layer 110, the first insulating layer 111, the second insulating layer 112, and the third insulating layer 113. A third portion of one end of the second node electrode 132 may be electrically connected to the upper electrode C12 of the second electrode of the first capacitor C1 through a contact hole 38 formed through the third insulating layer 113. Accordingly, the lower electrode C13 of the second electrode of the first capacitor C1 and the upper electrode C12 of the second electrode of the first capacitor C1 may be electrically connected to each other.

An intermediate portion of the second node electrode 132 may be electrically connected to the drain area D4 of the fourth transistor T4 through a contact hole 43 formed through the first insulating layer 111, the second insulating layer 112, and the third insulating layer 113.

The other end of the second node electrode 132 may be electrically connected to the drain area D6 of the sixth transistor T6 through a contact hole 44 formed through the first insulating layer 111, the second insulating layer 112, and the third insulating layer 113. An overlapping area between the second node electrode 132 and the driving voltage line PL may form the second capacitor C2. The second capacitor C2 may include a first electrode C21 that is a portion of the driving voltage line PL and a second electrode C22 that is a portion of the second node electrode 132.

A portion 132*p* extending from one end of the second node electrode 132 in the second pixel area PCA2 and the third pixel area PCA3 may be electrically connected to the pixel electrode by contacting the pixel electrode.

The conductive pattern 133 may be electrically connected to the source area S3 of the third transistor T3 through a contact hole 34 formed through the first insulating layer 111, the second insulating layer 112, and the third insulating layer 113 and may be electrically connected to the reference voltage line VRL through a contact hole 35 formed through the buffer layer 110, the first insulating layer 111, the second insulating layer 112, and the third insulating layer 113.

The conductive pattern 134 may be electrically connected to the driving voltage line PL through a contact hole 39 formed through the buffer layer 110, the first insulating layer 111, the second insulating layer 112, and the third insulating layer 113 and may be electrically connected to the drain area D5 of the fifth transistor T5 through a contact hole 40 formed through the first insulating layer 111, the second insulating layer 112, and the third insulating layer 113.

The conductive pattern 135 may be electrically connected to the source area S4 of the fourth transistor T4 through a contact hole 41 formed through the first insulating layer 111, the second insulating layer 112, and the third insulating layer 113 and may be electrically connected to the first initialization voltage line VL1 through a contact hole 42 formed through the third insulating layer 113.

In the first pixel area PCA1 and the third pixel area PCA3, the conductive pattern 136*a* may be electrically connected to the (2-1)$^{th}$ initialization voltage line VL21 through a contact hole 45 formed through the second insulating layer 112 and the third insulating layer 113 and may be electrically connected to the source area S6 of the sixth transistor T6 to through a contact hole 46 formed through the first insulating layer 111, the second insulating layer 112, and the third insulating layer 113.

In the second pixel area PCA2, the conductive pattern 136*b* may be electrically connected to the (2-2)$^{th}$ initialization voltage line VL22 through a contact hole 47 formed through the third insulating layer 113 and may be electrically connected to the source area S6 of the sixth transistor T6 through a contact hole 48 formed through the first insulating layer 111, the second insulating layer 112, and the third insulating layer 113.

The conductive pattern 137 may be electrically connected to the upper electrode C12 of the second electrode of the first capacitor C1 through a contact hole 49 formed through the third insulating layer 113. In the first pixel area PCA1, a portion 137*p* of the conductive pattern 137 may be electrically connected to the pixel electrode by contacting the pixel electrode.

The vertical conductive lines VCL may extend in the y direction and may be arranged apart from each other in the x direction. One of the first vertical conductive lines VCL1 and one of the second vertical conductive lines VCL2 may be arranged in the unit pixel area PCAu. One of the first vertical conductive lines VCL1 may be disposed over the boundary line IBL1 between the first pixel area PCA1 and the second pixel area PCA2. One of the second vertical conductive lines VCL2 may be disposed over the boundary line IBL2 between the second pixel area PCA2 and the third pixel area PCA3. The first vertical conductive line VCL1 may be arranged between the first node electrode 131 of the first pixel area PCA1 and the first node electrode 131 of the second pixel area PCA2. The second vertical conductive line VCL2 may be arranged between the data line DL of the second pixel area PCA2 and the data line DL of the third pixel area PCA3.

Figure 15:
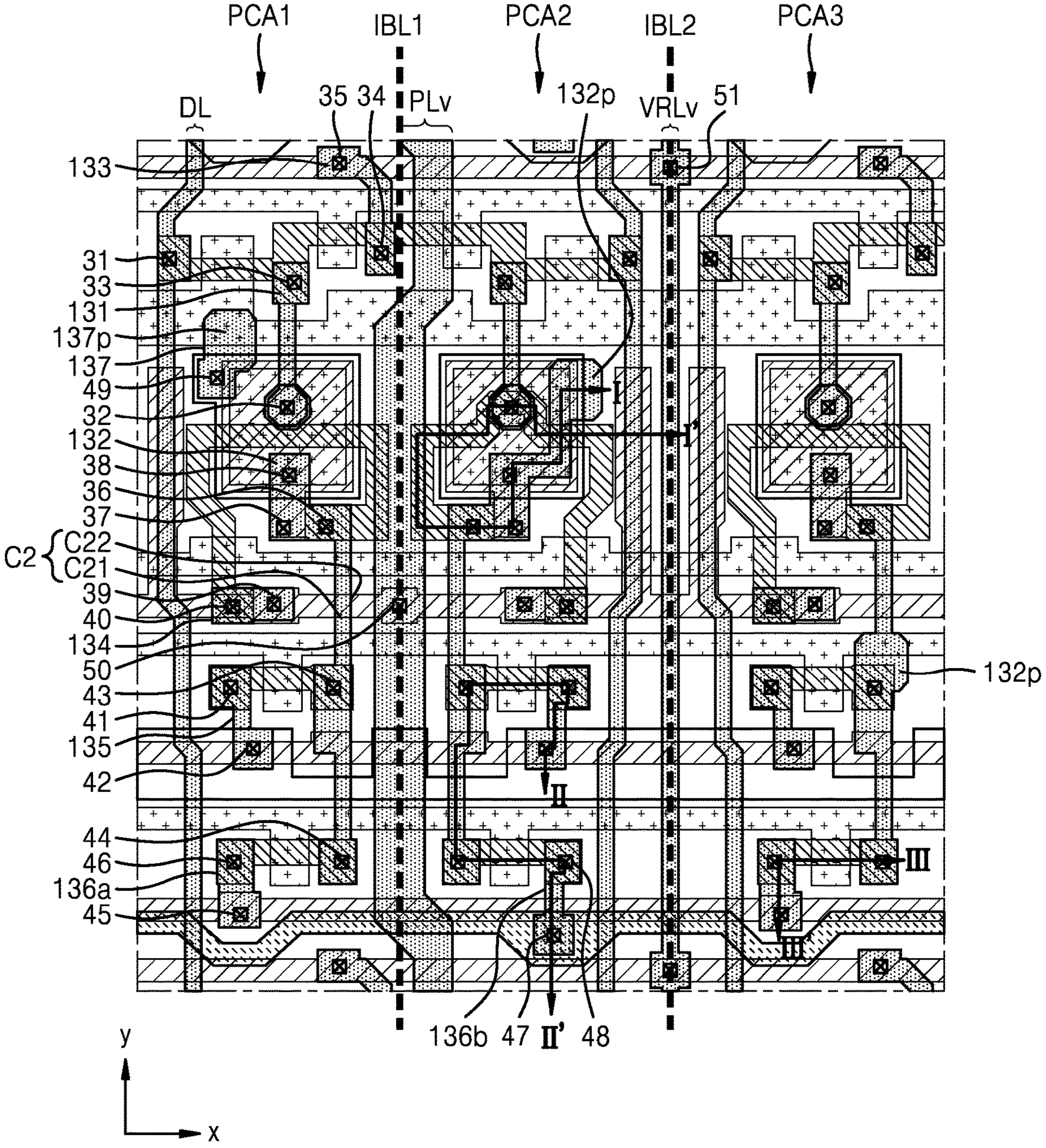

As illustrated in FIGS. 9 and 15, the vertical driving voltage line PLv may be disposed over the boundary line IBL1 between the first pixel area PCA1 and the second pixel area PCA2, and the vertical reference voltage line VRLv may be disposed over the boundary line IBL2 between the second pixel area PCA2 and the third pixel area PCA3.

The vertical driving voltage line PLv may be electrically connected to the driving voltage line PL through a contact hole 50 formed through the buffer layer 110, the first insulating layer 111, the second insulating layer 112, and the third insulating layer 113. Accordingly, the driving voltage line PL may have a mesh structure in the display area DA. The vertical reference voltage line VRLv may be electrically connected to the reference voltage line VRL through a contact hole 51 formed through the buffer layer 110, the first insulating layer 111, the second insulating layer 112, and the third insulating layer 113. Accordingly, the reference voltage line VRL may have a mesh structure in the display area DA.

Figure 16:
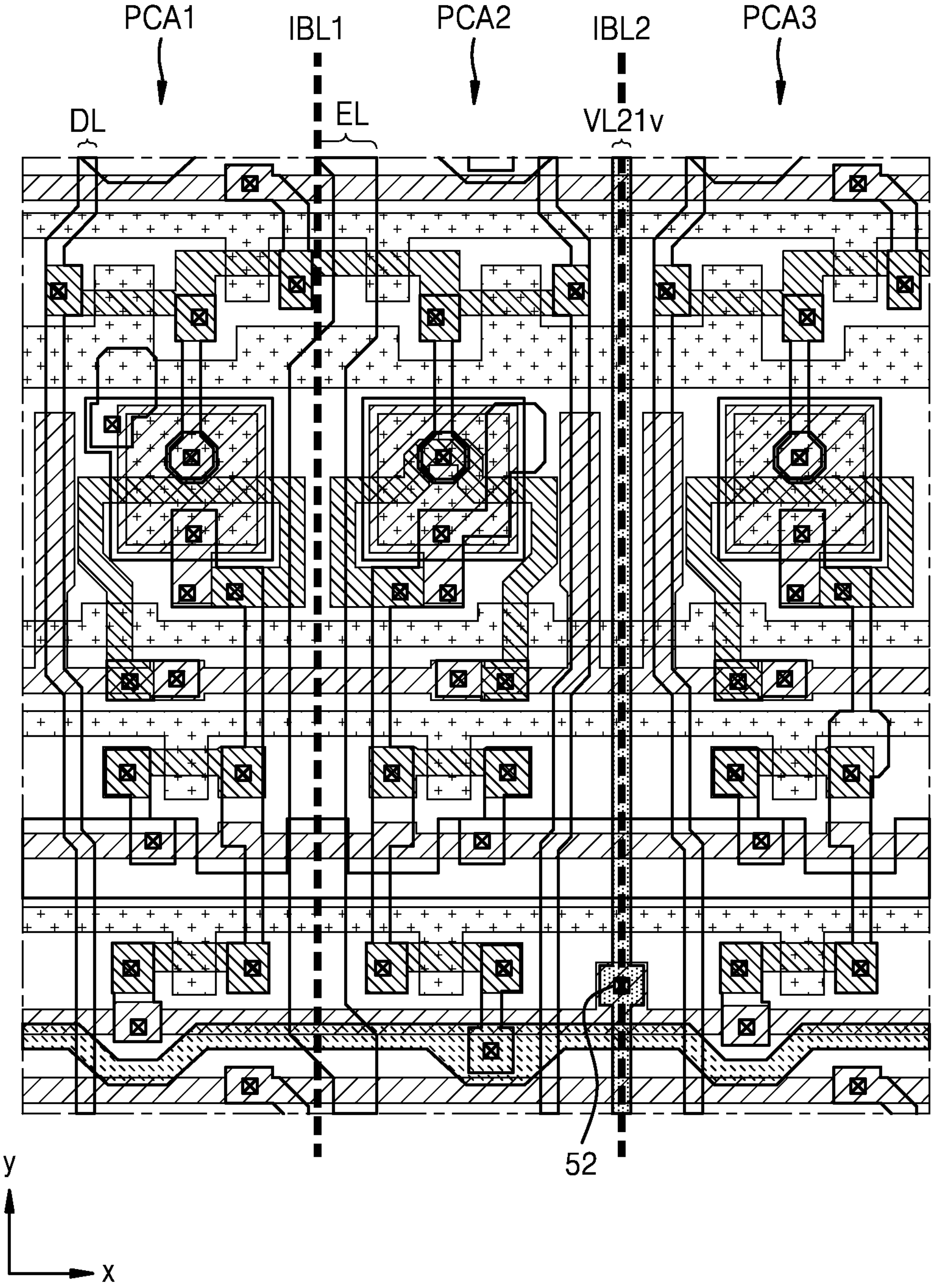

As illustrated in FIGS. 9 and 16, the common voltage line EL may be disposed over the boundary line IBL1 between the first pixel area PCA1 and the second pixel area PCA2, and the (2-1)$^{th}$ vertical initialization voltage line VL21*v* may be disposed over the boundary line IBL2 between the second pixel area PCA2 and the third pixel area PCA3.

The (2-1)$^{th}$ vertical initialization voltage line VL21*v* may be electrically connected to the (2-1)$^{th}$ initialization voltage line VL21 through a contact hole 52 formed through the buffer layer 110, the first insulating layer 111, the second insulating layer 112, and the third insulating layer 113. Accordingly, the (2-1)$^{th}$ initialization voltage line VL21 may have a mesh structure in the display area DA.

Figure 17:
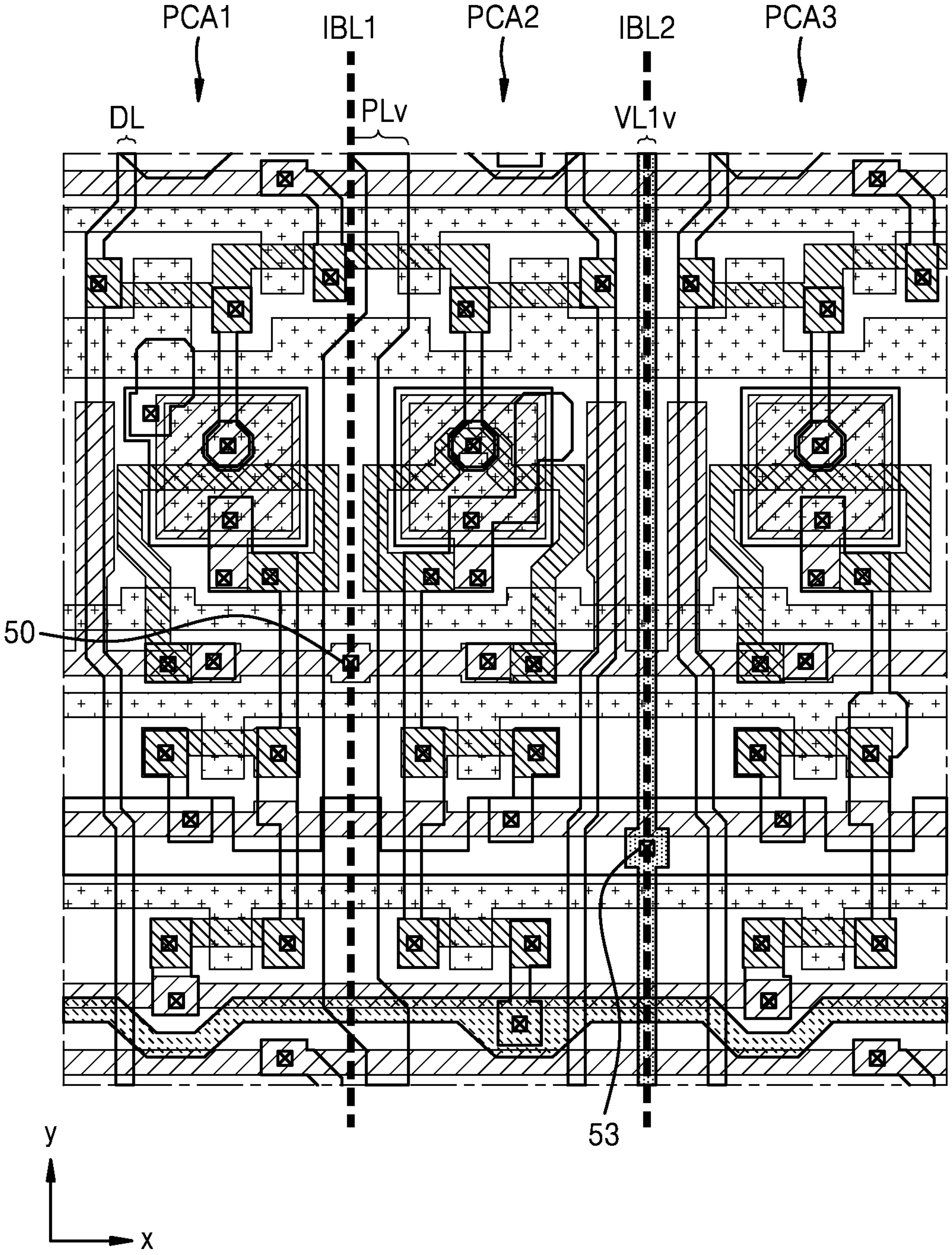

As illustrated in FIGS. 9 and 17, the vertical driving voltage line PLv may be disposed over the boundary line IBL1 between the first pixel area PCA1 and the second pixel area PCA2, and the first vertical initialization voltage line VL1*v* may be disposed over the boundary line IBL2 between the second pixel area PCA2 and the third pixel area PCA3.

The first vertical initialization voltage line VL1*v* may be electrically connected to the first initialization voltage line VL1 through a contact hole 53 formed through the third insulating layer 113. Accordingly, the first initialization voltage line VL1 may have a mesh structure in the display area DA.

As illustrated in FIGS. 9 and 18, the common voltage line EL may be disposed over the boundary line IBL1 between the first pixel area PCA1 and the second pixel area PCA2, and the (2-2)$^{th}$ vertical initialization voltage line VL22*v* may be disposed over the boundary line IBL2 between the second pixel area PCA2 and the third pixel area PCA3.

The (2-2)$^{th}$ vertical initialization voltage line VL22*v* may be electrically connected to the (2-2)$^{th}$ initialization voltage line VL22 through a contact hole 54 formed through the third insulating layer 113. Accordingly, the (2-2)$^{th}$ initialization voltage line VL22 may have a mesh structure in the display area DA.

A fourth insulating layer 114 may be disposed over the third insulating layer 113 to cover the fourth conductive layer, and an organic light emitting diode OLED may be disposed over the fourth insulating layer 114 as a display element. The organic light emitting diode OLED may include a pixel electrode 211, an opposite electrode 215, and an intermediate layer disposed between the pixel electrode 211 and the opposite electrode 215.

In an embodiment, the first insulating layer 111, the second insulating layer 112, and the third insulating layer 113 may be inorganic insulating layers. The fourth insulating layer 114 may be an organic insulating layer.

The pixel electrode 211 may be connected to the first transistor T1 through the second node which is connected to the lower conductive pattern through a contact hole 55 formed through the fourth insulating layer 114. Referring to FIG. 19, the pixel electrode 211 connected to the pixel circuit of the first pixel PX1 may be connected to the first transistor T1 by being electrically connected to the portion 137*p* of the conductive pattern 137 arranged in the first pixel area PCA1. The pixel electrode 211 connected to the pixel circuit of the second pixel PX2 may be connected to the first transistor T1 by being electrically connected to the portion 132*p* of the second node electrode 132 arranged in the second pixel area PCA2. The pixel electrode 211 connected to the pixel circuit of the third pixel PX3 may be connected to the first transistor T1 by being electrically connected to the portion 132*p* of the second node electrode 132 arranged in the third pixel area PCA3.

In an embodiment, the pixel electrode 211 connected to the pixel circuit of the first pixel PX1 and the pixel electrode 211 connected to the pixel circuit of the second pixel PX2 may overlap the first pixel area PCA1 and the second pixel area PCA1 and may be arranged adjacent to each other in the y direction. The pixel electrode 211 connected to the pixel circuit of the third pixel PX3 may overlap the pixel circuit of the third pixel area PCA3. Each of the pixel electrode 211 connected to the pixel circuit of the first pixel PX1 and the pixel electrode 211 connected to the pixel circuit of the second pixel PX2 may have a substantially square shape, and the pixel electrodes 211 connected to the pixel circuit of the third pixel PX3 may have a rectangular shape having a long side in the y direction.

A pixel definition layer 115 may be disposed over the pixel electrode 211 to cover an edge of the pixel electrode 211. An opening 115OP may be defined in the pixel definition layer 115 to expose a portion of the pixel electrode 211 and define an emission area EA. The pixel definition layer 115 may include a single layer or multiple layers including an organic insulating layer and/or an inorganic insulating layer.

The intermediate layer may include an emission layer 213, a first functional layer disposed over the emission layer 213, and/or a second functional layer disposed under the emission layer 213. The first functional layer may include a hole transport layer (HTL). Alternatively, the first functional layer may include a hole injection layer (HIL) and an HTL. The second functional layer may include an electron transport layer (ETL) and/or an electron injection layer (EIL). The first functional layer and the second functional layer may be integrally formed to correspond to a plurality of organic light emitting diodes OLED included in the display area DA. The first functional layer or the second functional layer may be omitted.

The opposite electrode 215 may be integrally formed to correspond to a plurality of organic light emitting diodes OLED included in the display area DA.

Figure 22:
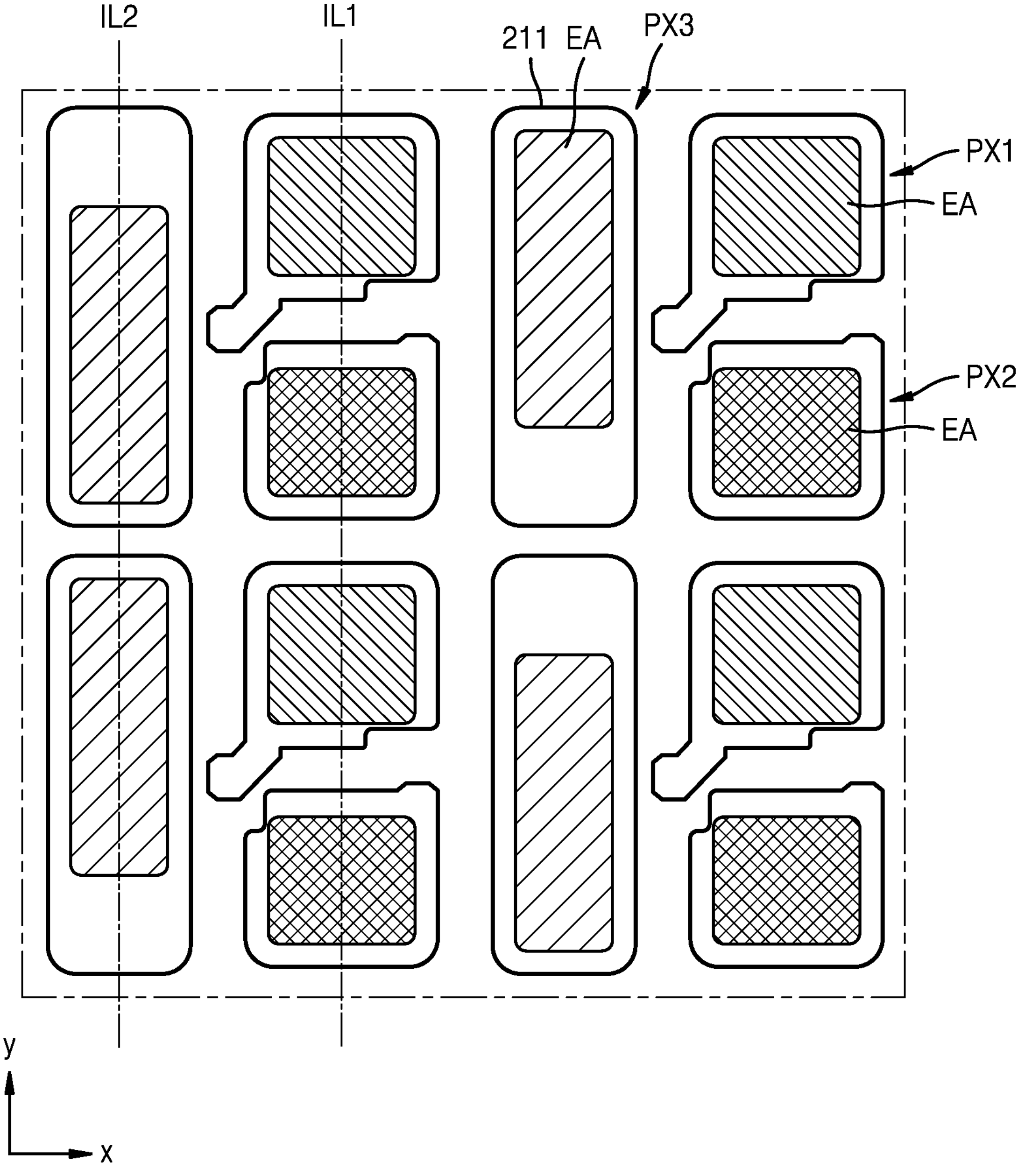
FIG. 22 is a diagram schematically illustrating an arrangement of emission areas of a plurality of pixels according to an embodiment.

FIG. 22 is a diagram schematically illustrating an arrangement of emission areas of a plurality of pixels according to an embodiment.

Referring to FIG. 22, a plurality of pixels arranged in the display area DA may include a first pixel PX1, a second pixel PX2, and a third pixel PX3. The first pixel PX1, the second pixel PX2, and the third pixel PX3 may be repeatedly arranged according to a certain pattern in the x direction and the y direction. Each of the first pixel PX1, the second pixel PX2, and the third pixel PX3 may include a pixel circuit and an organic light emitting diode OLED electrically connected to the pixel circuit. The organic light emitting diode OLED of each pixel may be disposed over the pixel circuit. The organic light emitting diode OLED may be disposed directly over the pixel circuit to overlap the pixel circuit or may be arranged to partially overlap a pixel circuit of another pixel arranged in an adjacent row and/or column by being offset from the pixel circuit.

FIG. 22 illustrates the pixel electrode 211 and the emission area EA of each of the first pixel PX1, the second pixel PX2, and the third pixel PX3. The emission area EA may be an area in which the emission layer 213 of the organic light emitting diode OLED is arranged. The emission area EA may be defined by the opening 115OP of the pixel definition layer 115. Because the emission layer 213 is disposed over the pixel electrode 211, the arrangement of emission areas illustrated in FIG. 22 may represent the arrangement of pixel electrodes or the arrangement of pixels.

The emission area EA may have shapes such as polygonal shapes (such as tetragonal shapes or octagonal shapes), circular shapes, or elliptical shapes, and the polygonal shapes may also include shapes with rounded corners (vertexes).

As illustrated in FIG. 22, the emission area EA of the first pixel PX1 and the emission area EA of the second pixel PX2 may be arranged adjacent to each other in the y direction, and the emission area EA of the third pixel PX3 may be arranged adjacent to the emission area EA of the first pixel PX1 and the emission area EA of the second pixel PX2 in the x direction. Accordingly, the emission area EA of the first pixel PX1 and the emission area EA of the second pixel PX2 may be alternately arranged in the y direction along an imaginary line IL1, and the emission area EA of the third pixel PX3 may be repeatedly arranged in the y direction along an imaginary line IL2.

The x-direction lengths and the y-direction lengths of the emission area EA of the first pixel PX1, the emission area EA of the second pixel PX2, and the emission area EA of the third pixel PX3 may be equal to or different from each other. For example, the emission area EA of the first pixel PX1 and the emission area EA of the second pixel PX2 may have a square shape, and the emission area EA of the third pixel PX3 may have a rectangular shape having a long side in the y direction. The y-direction length of the emission area EA of the third pixel PX3 may be greater than or equal to the sum of the y-direction length of the emission area EA of the first pixel PX1 and the y-direction length of the emission area EA of the second pixel PX2.

The emission area EA of the first pixel PX1, the emission area EA of the second pixel PX2, and the emission area EA of the third pixel PX3 may have different areas (sizes). In an embodiment, the emission area EA of the third pixel PX3 may have a greater area than the emission area EA of the first pixel PX1. The emission area EA of the third pixel PX3 may have a greater area than the emission area EA of the second pixel PX2. The emission area EA of the first pixel PX1 may have the same area as the emission area EA of the second pixel PX2.

Figure 23:
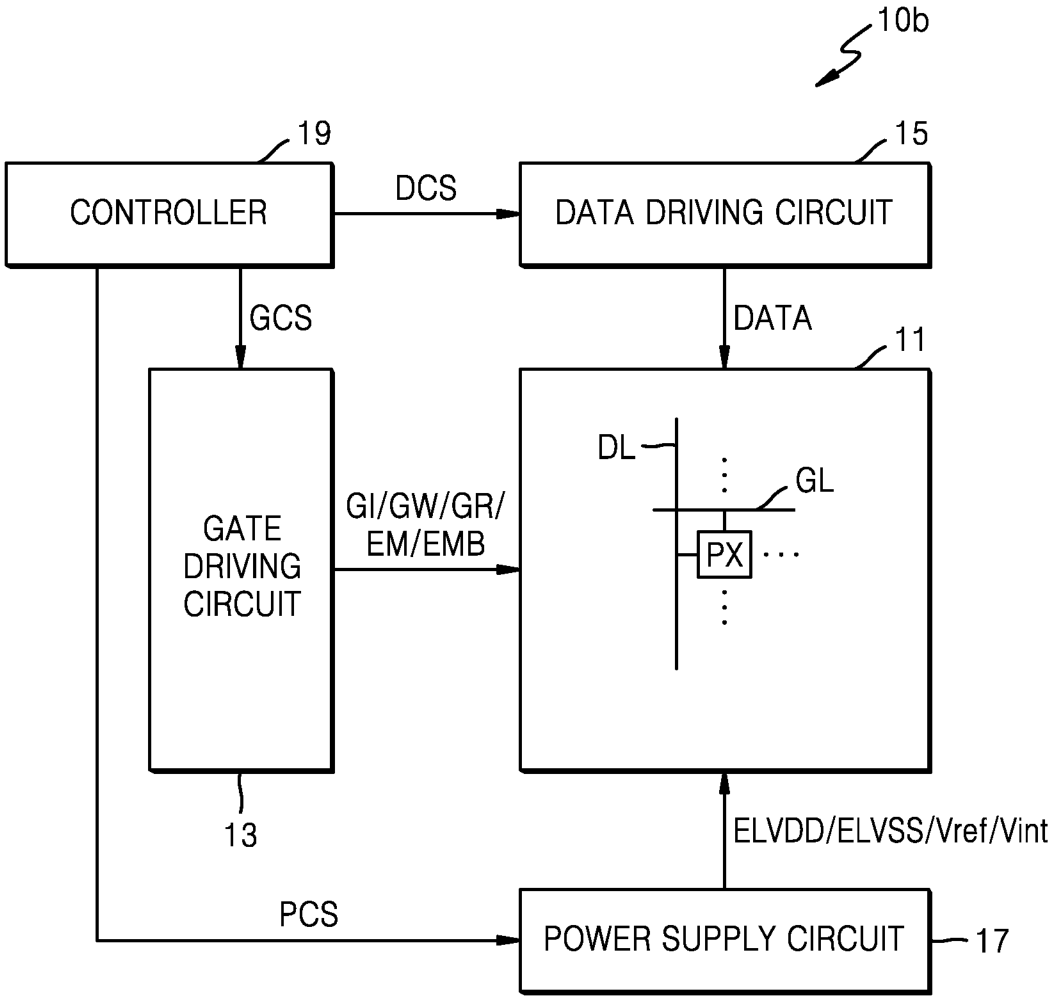
FIG. 23 is a diagram schematically illustrating a display apparatus according to an embodiment.
Figure 24:
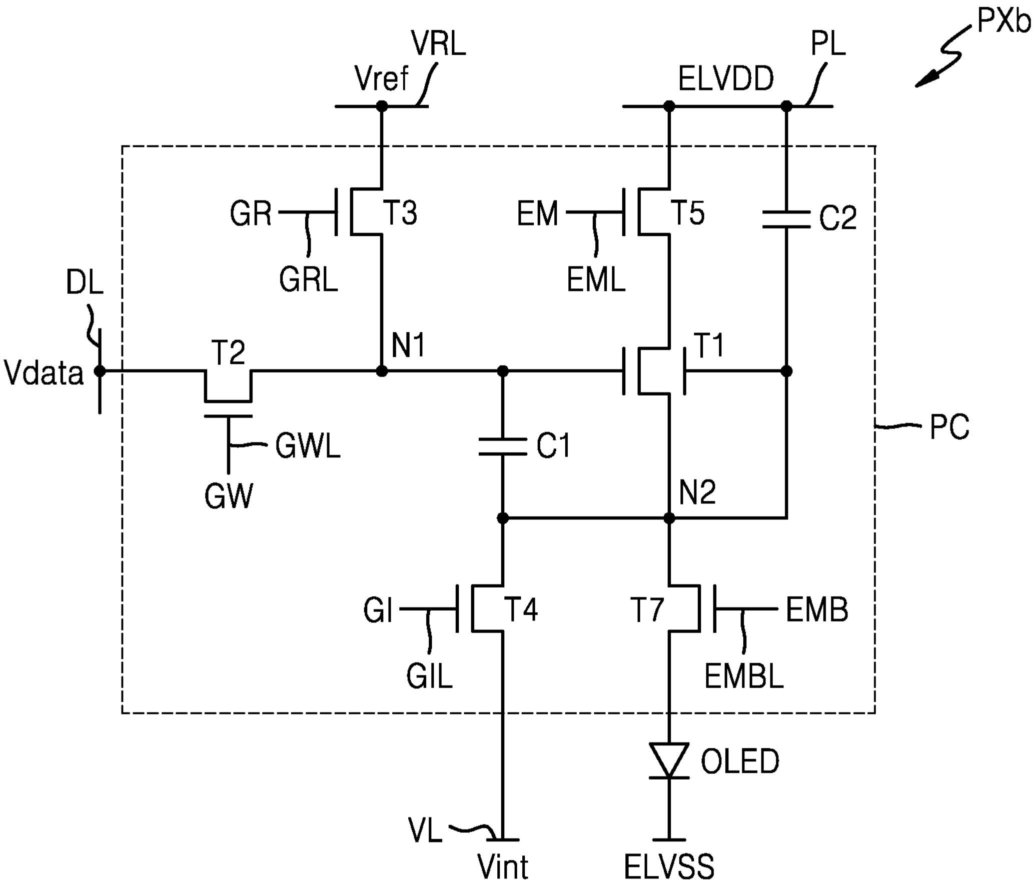
FIG. 24 is an equivalent circuit diagram of a pixel according to an embodiment.
Figure 25:
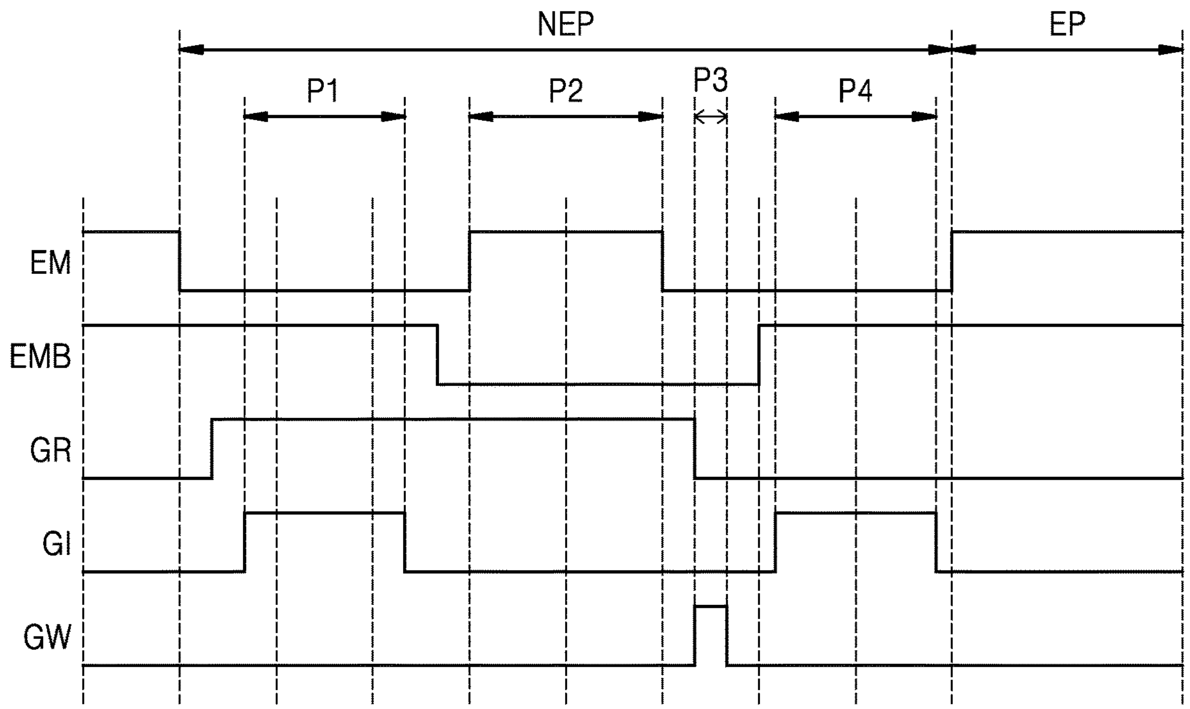
FIG. 25 is a waveform diagram illustrating signals for describing an operation of the pixel illustrated in FIG. 24.
Figure 28:
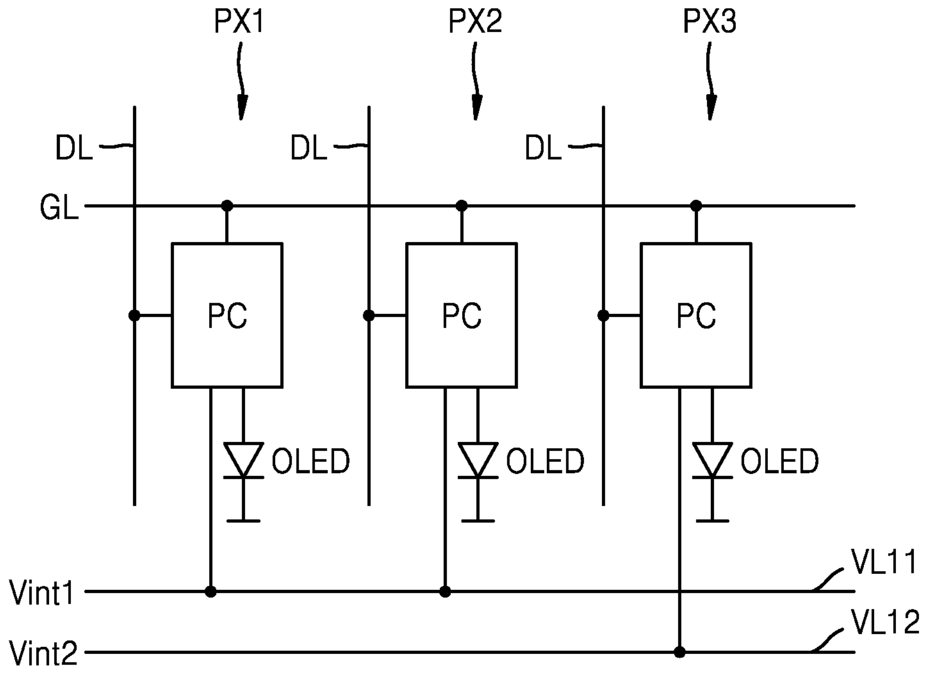
Figure 29:
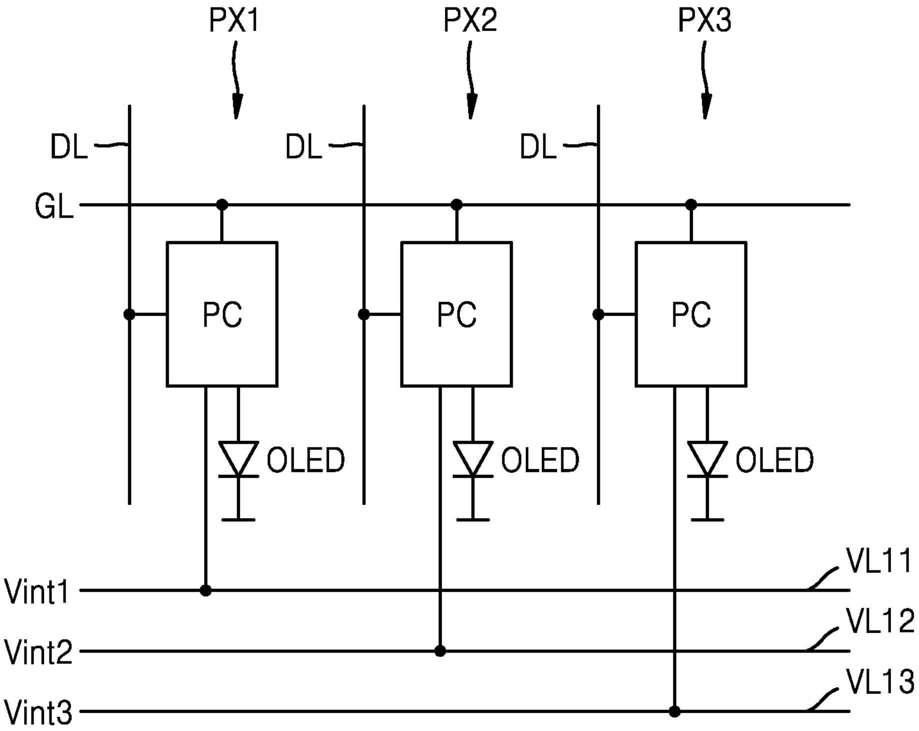
Figure 30:
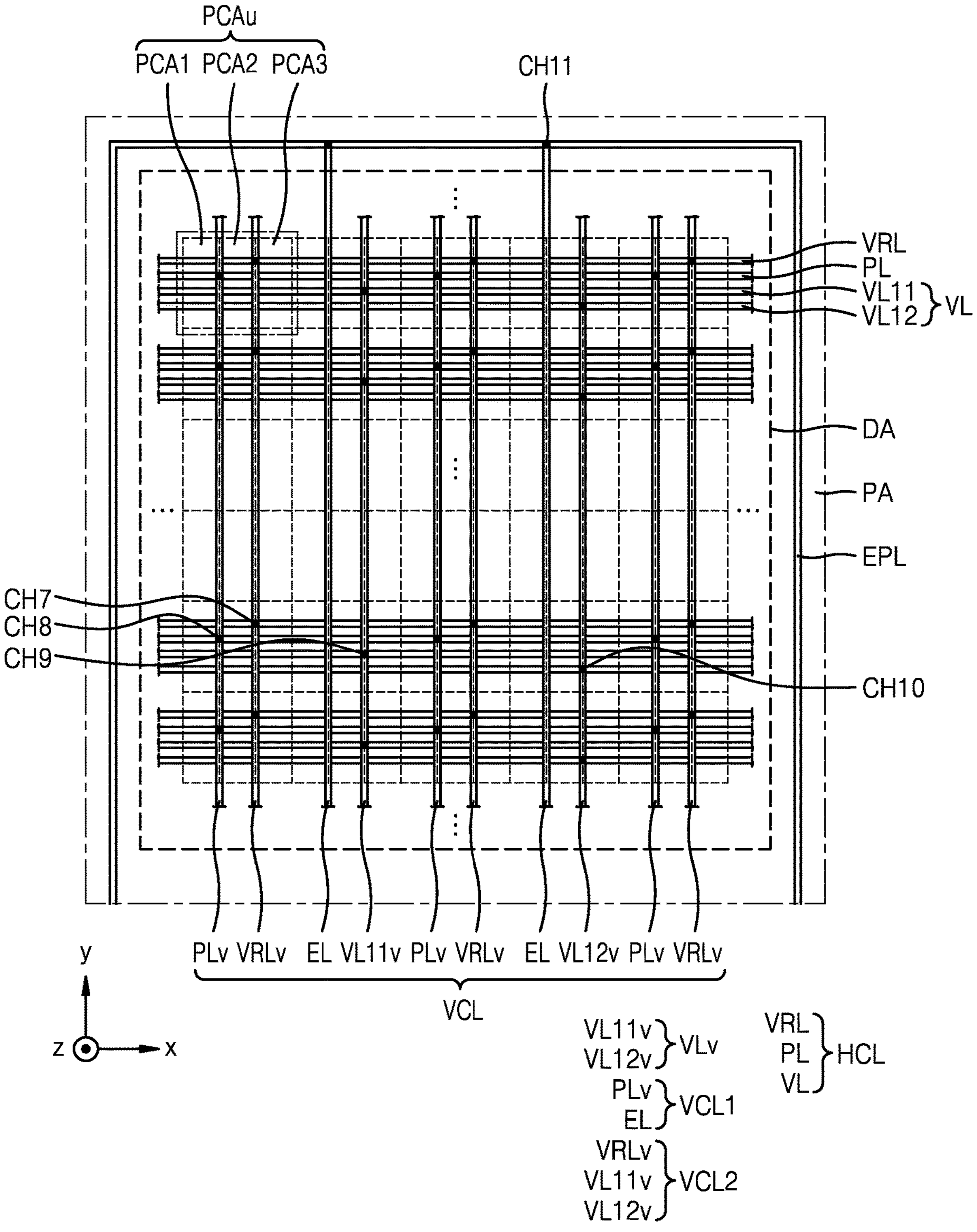
FIG. 30 is a diagram schematically illustrating a connection relationship between signal lines arranged in a display area according to an embodiment.

FIG. 23 is a diagram schematically illustrating a display apparatus according to an embodiment. FIG. 24 is an equivalent circuit diagram of a pixel according to an embodiment. FIG. 25 is a waveform diagram illustrating signals for describing an operation of the pixel illustrated in FIG. 24. FIGS. 26 to 29 are diagrams schematically illustrating a connection relationship between a pixel and a second initialization voltage line according to an embodiment. FIG. 30 is a diagram schematically illustrating a connection relationship between signal lines arranged in a display area according to an embodiment. Hereinafter, differences from the embodiments described with reference to FIGS. 2 to 22 will be mainly described, and redundant descriptions thereof will be omitted for conciseness.

Referring to FIG. 23, a display apparatus 10*b* according to an embodiment may include a pixel unit 11, a gate driving circuit 13, a data driving circuit 15, a power supply circuit 17, and a controller 19.

The display apparatus 10*b* of FIG. 23 may be different from the display apparatus 10*a* of FIG. 2 in terms of the signals output by the gate driving circuit 13 and the power supply circuit 17. For example, a pixel PX may be connected to a plurality of gate lines and an emission control line, and the gate driving circuit 13 may apply a first gate signal GW, a second gate signal GI, a third gate signal GR, a fifth gate signal EMB, and an emission control signal EM to the corresponding gate lines and emission control lines respectively. The power supply circuit 17 may generate a first driving voltage ELVDD, a second driving voltage ELVSS, a reference voltage Vref, and an initialization voltage Vint and supply the same to the pixels PX.

A pixel PXb illustrated in FIG. 24 may be an embodiment of the pixel PX illustrated in FIG. 23. Referring to FIG. 24, the pixel PXb may include an organic light emitting diode OLED and a pixel circuit PC connected to the organic light emitting diode OLED. The pixel circuit PC may include first to fifth transistors T1 to T5, a seventh transistor T7, and first and second capacitors C1 and C2.

The pixel PXb may be connected to a first gate line GWL configured to transmit a first gate signal GW, a second gate line GIL configured to transmit a second gate signal GI, a third gate line GRL configured to transmit a third gate signal GR, a fifth gate line EMBL configured to transmit a fifth gate signal EMB, an emission control line EML configured to transmit an emission control signal EM, and a data line DL configured to transmit a data signal Vdata. Also, the pixel PXb may be connected to a driving voltage line PL configured to transmit a first driving voltage ELVDD, an initialization voltage line VL configured to transmit an initialization voltage Vint, and a reference voltage line VRL configured to transmit a reference voltage Vref.

The first transistor T1 may be connected between the driving voltage line PL and the second node N2. The first transistor T1 may include a first gate connected to the first node N1 and a second gate connected to the second node N2.

The second transistor T2 may be connected between the first gate of the first transistor T1 and the data line DL. The second transistor T2 may include a gate connected to the first gate line GWL, a first terminal connected to the data line DL, and a second terminal connected to the first node N1.

The third transistor T3 may be connected between the first gate of the first transistor T1 and the reference voltage line VRL. The third transistor T3 may include a gate connected to the third gate line GRL, a first terminal connected to the first node N1, and a second terminal connected to the reference voltage line VRL configured to supply the reference voltage Vref.

The fourth transistor T4 may be connected between the first transistor T1 and the initialization voltage line VL. The fourth transistor T4 may be connected between the seventh transistor T7 and the initialization voltage line VL. The fourth transistor T4 may include a gate connected to the second gate line GIL, a first terminal connected to the second node N2, and a second terminal connected to the initialization voltage line VL configured to supply the initialization voltage Vint.

The fifth transistor T5 may be connected between the driving voltage line PL and the first transistor T1. The fifth transistor T5 may include a gate connected to the emission control line EML, a first terminal connected to the driving voltage line PL configured to supply the first driving voltage ELVDD, and a second terminal connected to the first terminal of the first transistor T1.

The seventh transistor T7 may be connected between the first transistor T1 and the organic light emitting diode OLED. The seventh transistor T7 may include a gate connected to the fifth gate line EMBL, a first terminal connected to the second node N2, and a second terminal connected to the pixel electrode of the organic light emitting diode OLED.

The first capacitor C1 may be connected between the first gate of the first transistor T1 and the organic light emitting diode OLED. The first capacitor C1 may include a first electrode connected to the first node N1 and a second electrode connected to the second node N2. The first capacitor C1 may be a storage capacitor and may store a threshold voltage of the first transistor T1 and a voltage corresponding to the data signal.

The second capacitor C2 may be connected between the driving voltage line PL and the organic light emitting diode OLED. The second capacitor C2 may include a first electrode connected to the driving voltage line PL and a second electrode connected to the second node N2. The capacitance of the first capacitor C1 may be greater than the capacitance of the second capacitor C2.

The organic light emitting diode OLED may be connected to the seventh transistor T7. The organic light emitting diode OLED may be connected to the first transistor T1 through the seventh transistor T7. The organic light emitting diode OLED may include a pixel electrode (anode) connected to the second terminal of the seventh transistor T7 and an opposite electrode (cathode) facing the pixel electrode.

Referring to FIG. 25, the pixel PXb may operate in a non-emission period NEP and an emission period EP in each frame period. The non-emission period NEP may include a first initialization period P1, a compensation period P2, a write period P3, and a second initialization period P4.

Each of the first gate signal GW, the second gate signal GI, the third gate signal GR, the fifth gate signal GMB, and the emission control signal EM may have a high-level voltage during some period and may have a low-level voltage during some period. Here, the high-level voltage may be an on voltage for turning on the transistor, and the low-level voltage may be an off voltage for turning off the transistor.

In the first initialization period P1, the second gate signal GI of the on voltage may be supplied to the second gate line GIL, the third gate signal GR of the on voltage may be supplied to the third gate line GRL, and the fifth gate signal EMB of the on voltage may be supplied to the fifth gate line EMBL. The first gate signal GW and the emission control signal EM may be supplied with an off voltage. The fourth transistor T4 may be turned on by the second gate signal GI, the third transistor T3 may be turned on by the third gate signal GR, and the seventh transistor T7 may be turned on by the fifth gate signal EMB. The first gate of the first transistor T1 may be initialized to the reference voltage Vref by the turned-on third transistor T3. The pixel electrode of the organic light emitting diode OLED may be initialized to the initialization voltage Vint by the turned on fourth transistor T4 and seventh transistor T7.

In the compensation period P2, the third gate signal GR of the on voltage may be supplied to the third gate line GRL, and the emission control signal EM of the on voltage may be supplied to the emission control line EML. The first gate signal GW, the second gate signal GI, and the fifth gate signal EMB may be supplied with an off voltage. The second transistor T2, the fourth transistor T4, and the seventh transistor T7 may be turned off by the first gate signal GW, the second gate signal GI, and the fifth gate signal EMB having an off voltage. The third transistor T3 may be turned on by the third gate signal GR, and the fifth transistor T5 may be turned on by the emission control signal EM. The reference voltage Vref may be supplied to the first gate of the first transistor T1 by the turned-on third transistor T3 and the first driving voltage ELVDD may be supplied to the first terminal of the first transistor T1, and thus the first transistor T1 may be turned on.

When the voltage of the second terminal of the first transistor T1 changes to the difference (Vref−Vth) between the reference voltage Vref and the threshold voltage (Vth) of the first transistor T1, the first transistor T1 may be turned off. Also, a voltage corresponding to the threshold voltage (Vth) of the first transistor T1 may be charged in the first capacitor C1 to compensate for the threshold voltage (Vth) of the first transistor T1.

As a comparative example, in the case of a display apparatus having a pixel circuit PC in which the seventh transistor T7 is omitted in the pixel circuit illustrated in FIG. 24, the parasitic capacitor of the organic light emitting diode OLED may be charged as the current output by the first transistor T1 flows through the organic light emitting diode OLED in the compensation period P2. Accordingly, in the compensation period P2, a capacitor charge deviation of the organic light emitting diode OLED and/or a charge deviation due to the impedance change of the organic light emitting diode OLED due to the degradation of the organic light emitting diode OLED may occur. As a result, an image luminance deviation may occur and thus an image stain may occur.

An embodiment may block the electrical connection between the first transistor T1 and the organic light emitting diode OLED by providing the seventh transistor T7 in the pixel PXb and turning off the seventh transistor T7 in the compensation period P2. Thus, in the compensation period P2, a compensation deviation may not occur, and thus the luminance deviation may be reduced.

In the write period P3, the first gate signal GW of the on voltage may be supplied to the first gate line GWL to turn on the second transistor T2. In this case, the third to fifth transistors T3, T4, and T5 and the seventh transistor T7 may be turned off by the second gate signal GI, the third gate signal GR, the fifth gate signal EMB, and the emission control signal EM of the off voltage. The second transistor T2 may be configured to transmit the data signal Vdata from the data line DL to the first node N1, that is, the first gate of the first transistor T1. Accordingly, the gate-source voltage (Vgs) of the first transistor T1 may be expressed as Equation (1) above.

In the second initialization period P4, the second gate signal GI of the on voltage may be supplied to the second gate line GIL, and the fifth gate signal EMB of the on voltage may be supplied to the fifth gate line EMBL. The first gate signal GW, the third gate signal GR, and the emission control signal EM may be supplied with an off voltage. The seventh transistor T7 may be turned on by the fifth gate signal EMB to connect the pixel electrode of the organic light emitting diode OLED with the second terminal of the first transistor T1, and the fourth transistor T4 may be turned on by the second gate signal GI to initialize the pixel electrode of the organic light emitting diode OLED to the initialization voltage Vint.

In the emission period EP, the emission control signal EM and the fifth gate signal EMB may be supplied with an on voltage, and the first gate signal GW, the second gate signal GI, and the third gate signal GR may be supplied with an off voltage. The second to fourth transistors T2, T3, and T4 may be turned off by the first gate signal GW, the second gate signal GI, and the third gate signal GR, and the fifth transistor T5 and the seventh transistor T7 may be turned on by the emission control signal EM and the fifth gate signal EMB.

The first transistor T1 may output a driving current ($Id \propto (Vgs-Vth)^2$) having a magnitude corresponding to the voltage stored in the first capacitor C1, and the organic light emitting diode OLED may emit light with a luminance corresponding to the magnitude of the driving current irrelevant to the threshold voltage (Vth) of the first transistor T1.

An embodiment may minimize the luminance deviation between the pixels by preventing the compensation deviation between the pixels by disconnecting the organic light emitting diode OLED from the pixel circuit PC in the compensation period P2. Also, the luminance deviation between the pixels may be minimized by initializing the gate of the first transistor T1 before the compensation period P2 and initializing the organic light emitting diode OLED after the compensation period.

Figure 26:
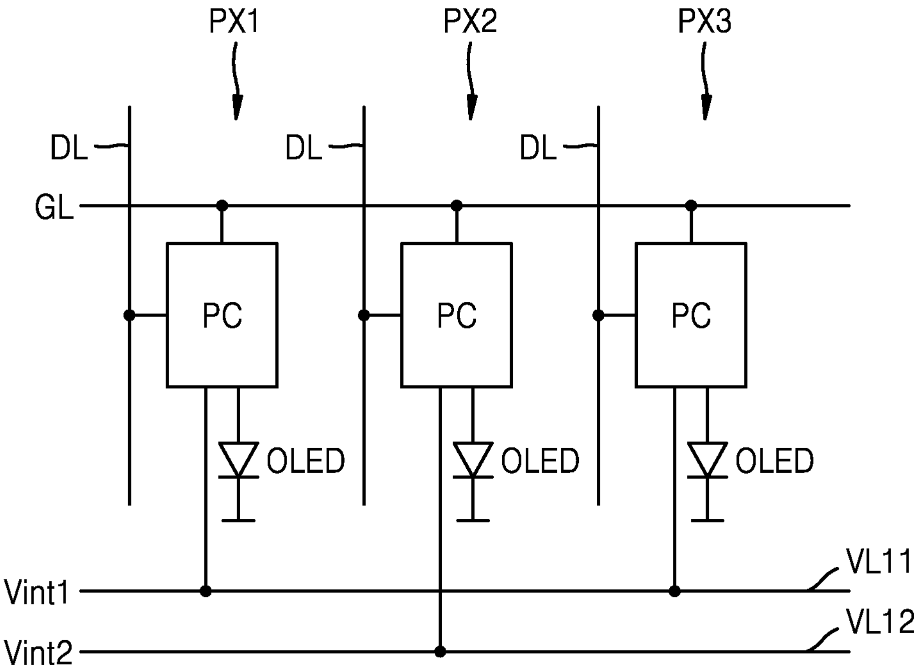
FIGS. 26, 27, 28 and 29 are diagrams schematically illustrating a connection relationship between a pixel and a second initialization voltage line according to an embodiment.
Figure 27:
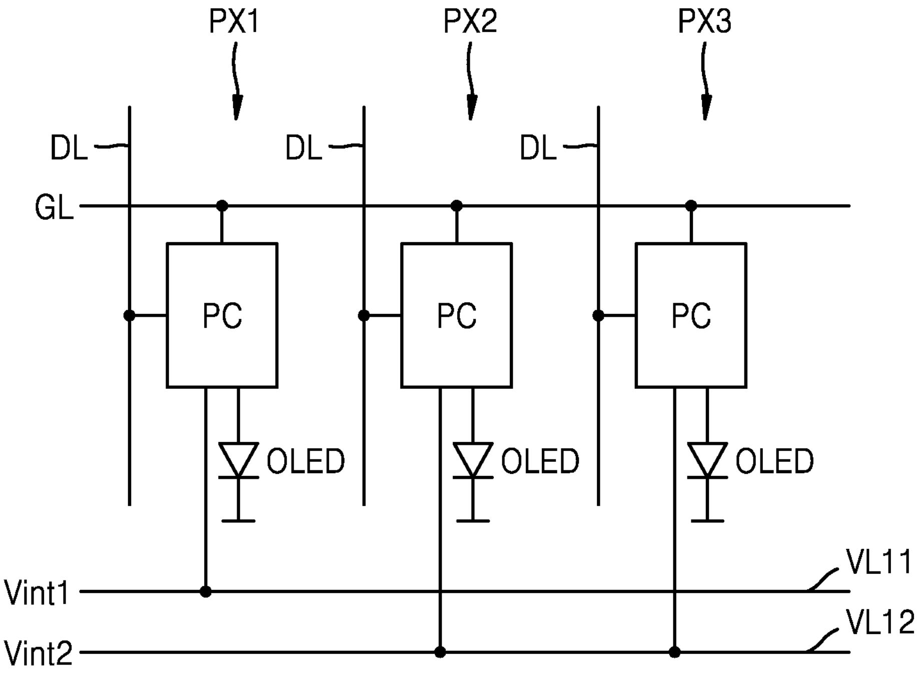

In an embodiment, different initialization voltages Vint may be supplied to the first pixel PX1, the second pixel PX2, and the third pixel PX3. For example, as illustrated in FIG. 26, the first pixel PX1 and the third pixel PX3 may be connected to a first initialization voltage line VL11 configured to supply a first initialization voltage Vint1, and the second pixel PX2 may be connected to a second initialization voltage line VL12 configured to supply a second initialization voltage Vint2. Alternatively, as illustrated in FIG. 27, the first pixel PX1 may be connected to a first initialization voltage line VL11 configured to supply a first initialization voltage Vint1, and the second pixel PX2 and the third pixel PX3 may be connected to a second initialization voltage line VL12 configured to supply a second initialization voltage Vint2. Alternatively, as illustrated in FIG. 28, the first pixel PX1 and the second pixel PX2 may be connected to a first initialization voltage line VL11 configured to supply a first initialization voltage Vint1, and the third pixel PX3 may be connected to a second initialization voltage line VL12 configured to supply a second initialization voltage Vint2. Alternatively, as illustrated in FIG. 29, the first pixel PX1 may be connected to a first initialization voltage line VL11 configured to supply a first initialization voltage Vint1, the second pixel PX2 may be connected to a second initialization voltage line VL12 configured to supply a second initialization voltage Vint2, and the third pixel PX3 may be connected to a third initialization voltage line VL13 configured to supply a third initialization voltage Vint3.

Hereinafter, descriptions will be given based on an embodiment in which the first pixel PX1 and the third pixel PX3 are connected to the first initialization voltage line VL11 and the second pixel PX2 is connected to the second initialization voltage line VL12 as illustrated in FIG. 26.

Referring to FIG. 30, horizontal conductive lines HCL extending in the x direction and vertical conductive lines VCL extending in the y direction may be arranged in the display area DA.

The horizontal conductive lines HCL may include a reference voltage line VRL, a driving voltage line PL, and an initialization voltage line VL. The initialization voltage line VL may include a first initialization voltage line VL11 and a second initialization voltage line VL12. A reference voltage line VRL, a driving voltage line PL, a first initialization voltage line VL11, and a second initialization voltage line VL12 may be arranged in each row.

The vertical conductive lines VCL may include first vertical conductive lines VCL1 and second vertical conductive lines VCL2. The first vertical conductive lines VCL1 may include a vertical driving voltage line PLv and a common voltage line EL. The second vertical conductive lines VCL2 may include a vertical reference voltage line VRLv and a vertical initialization voltage line VLv. The vertical initialization voltage line VLv may include a first vertical initialization voltage line VL11*v* and a second vertical initialization voltage line VL12*v*.

The reference voltage lines VRL may be electrically connected to the vertical reference voltage lines VRLv through a contact hole CH7 to form a mesh structure in the display area DA. The driving voltage lines PL may be electrically connected to the vertical driving voltage lines PLv through a contact hole CH8 to form a mesh structure in the display area DA. The first initialization voltage lines VL11 may be electrically connected to the first vertical initialization voltage lines VL11*v* through a contact hole CH9 to form a mesh structure in the display area DA. The second initialization voltage lines VL12 may be electrically connected to the second vertical initialization voltage lines VL12*v* through a contact hole CH10 to form a mesh structure in the display area DA. The common voltage lines EL may be electrically connected through a contact hole CH11 to a common voltage supply line EPL arranged in the peripheral area PA.

One of the first vertical conductive lines VCL1 and one of the second vertical conductive lines VCL2 may be arranged in the unit pixel area PCAu. The vertical driving voltage line PLv may be arranged at intervals of two unit pixel areas PCAu, that is, at intervals of six pixel areas or six columns, in the x direction. The common voltage line EL may be arranged at intervals of two unit pixel area PCAu, that is, at intervals of six pixel areas or six columns, in the x direction. The vertical reference voltage line VRLv may be arranged at intervals of two unit pixel areas PCAu, that is, at intervals of 6 pixel areas or 6 columns, in the x direction. Each of the first vertical initialization voltage line VL11*v* and the second vertical initialization voltage line VL12*v* may be alternately arranged at intervals of four unit pixel areas PCAu, that is, at intervals of 12 pixel areas or 12 columns, in the x direction.

Figure 33:
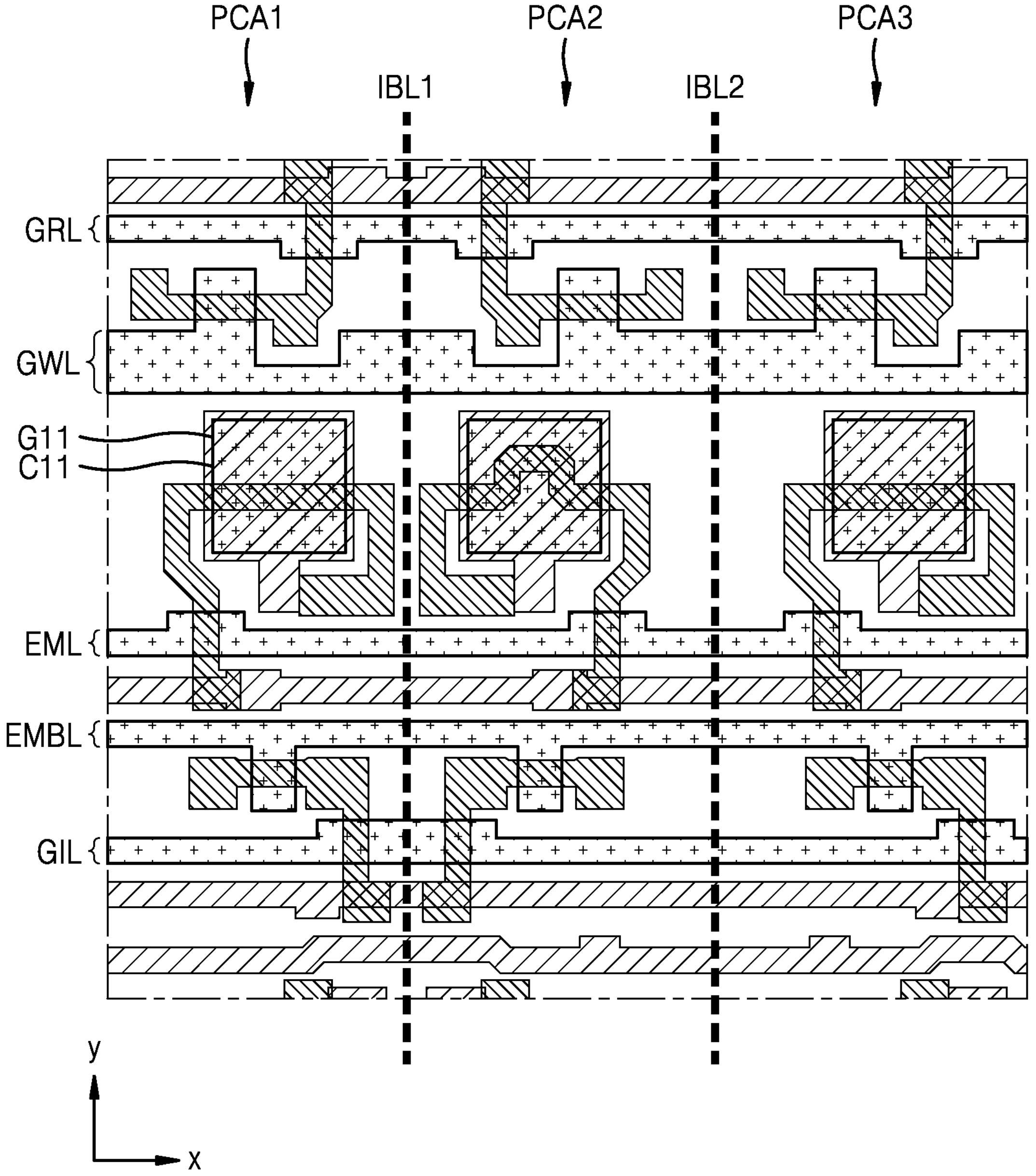
Figure 34:
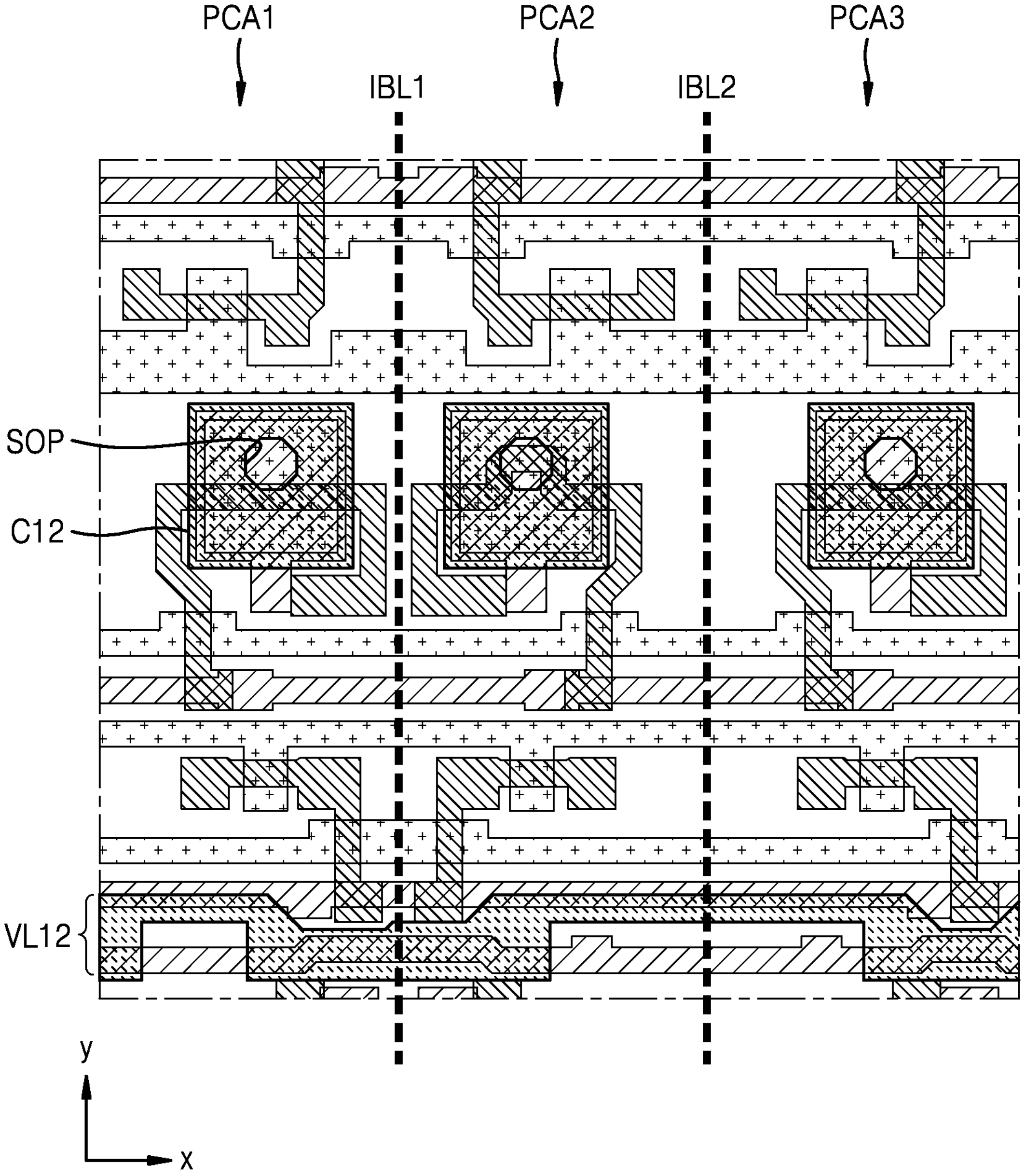
Figure 35:
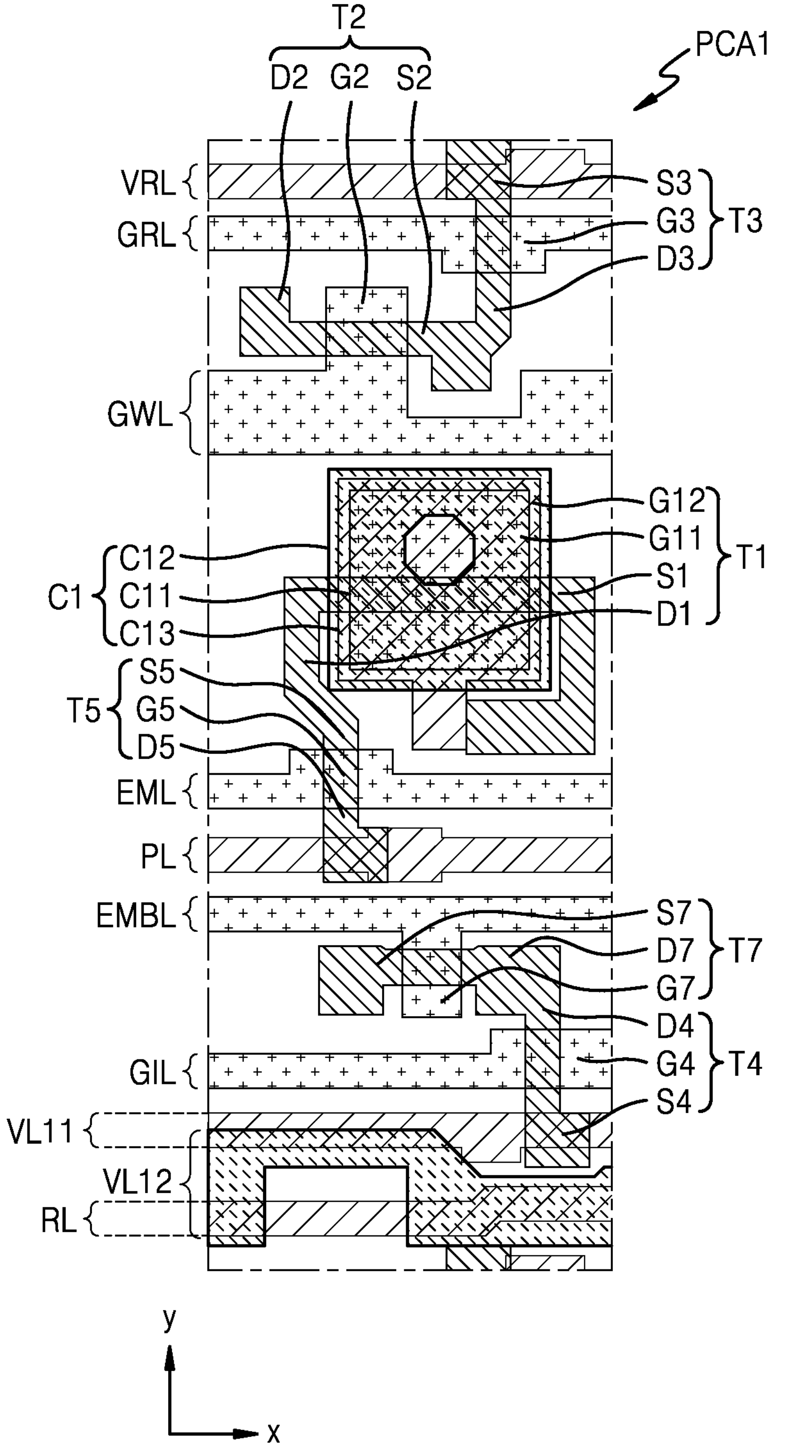
Figure 40:
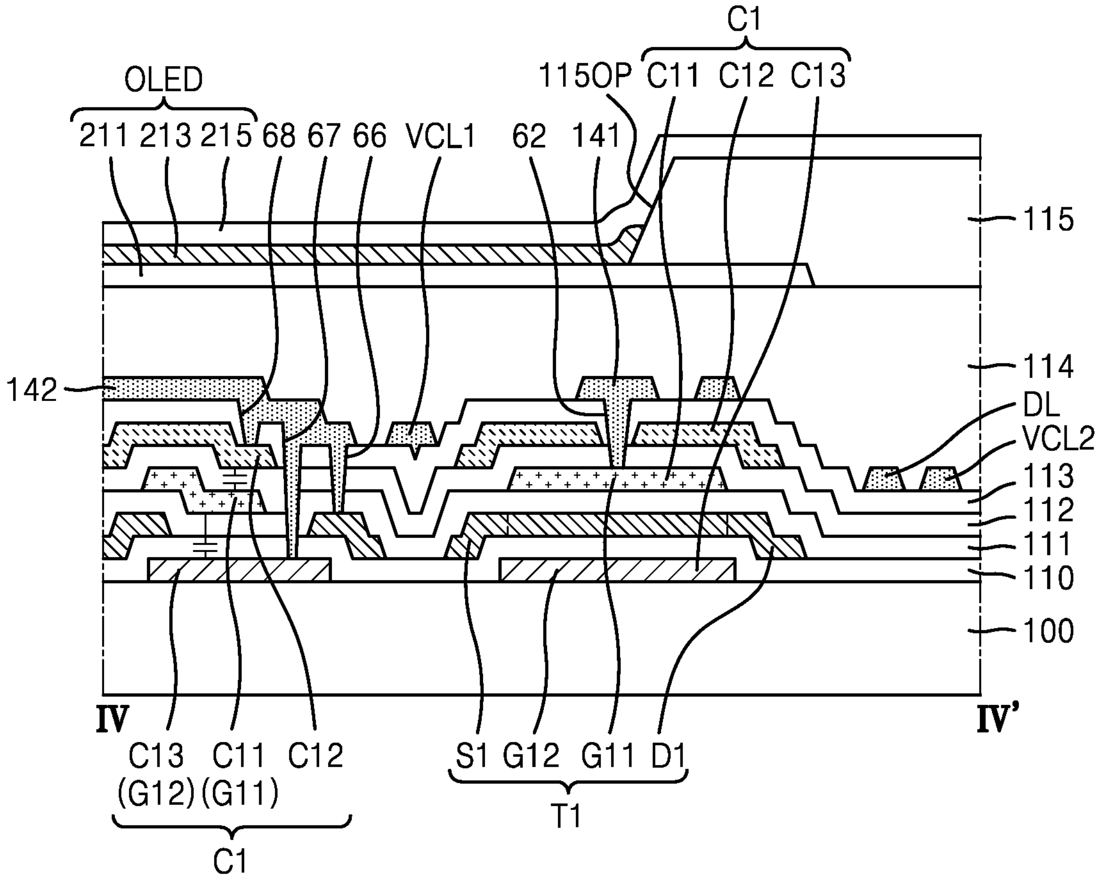
FIG. 40 is a cross-sectional view of the pixel taken along a line IV-IV' of FIG. 36.
Figure 41:
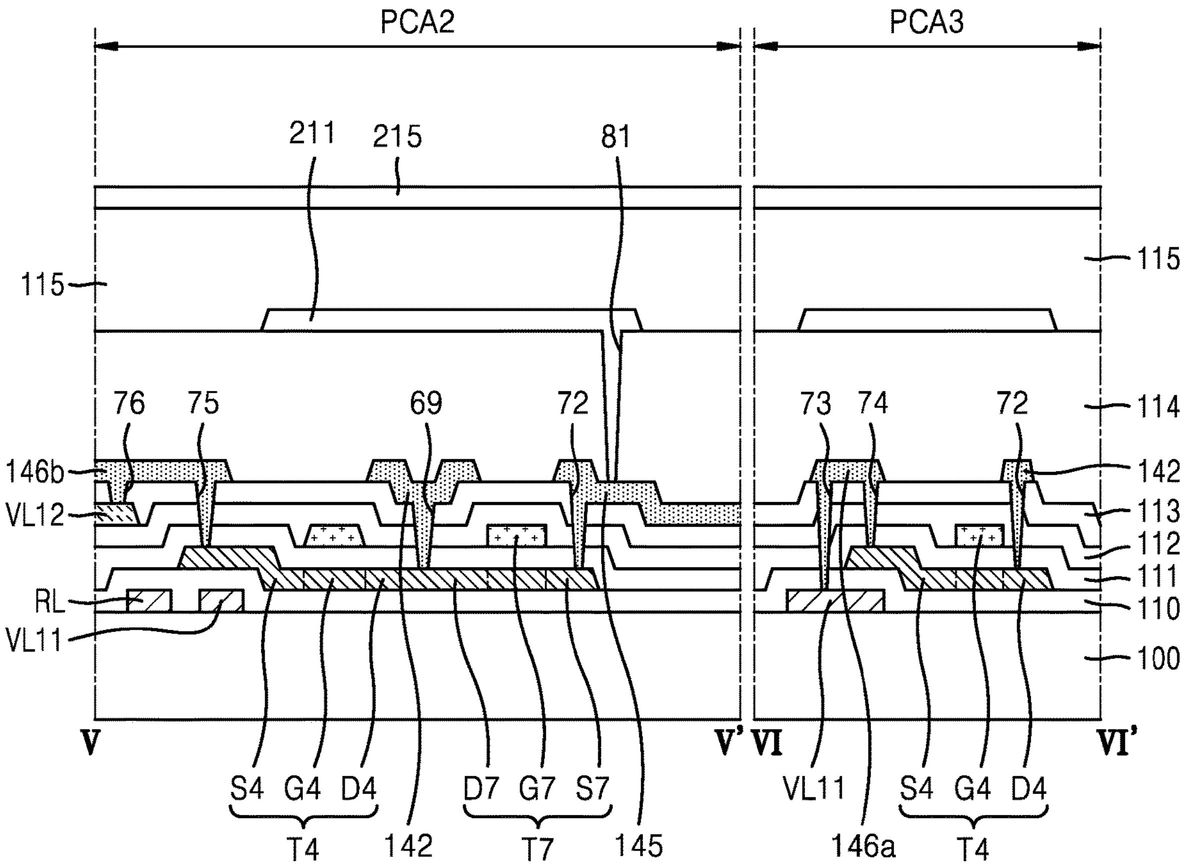
FIG. 41 is a cross-sectional view of the pixel taken along lines V-V' and VI-VI' of FIG. 36.

FIGS. 31 to 39 are arrangement diagrams schematically illustrating elements of the pixel of FIG. 24 layer by layer. FIG. 35 is a plan view illustrating elements of the first pixel area PCA1 as a portion of FIG. 34. FIG. 40 is a cross-sectional view of the pixel taken along line IV-IV' of FIG. 36, in which a display element is reflected. FIG. 41 is a cross-sectional view of the pixel taken along lines V-V' and VI-VI' of FIG. 36, in which a display element is reflected. FIGS. 40 and 41 may be similarly applied to the corresponding areas of FIGS. 37 and 38. Hereinafter, differences from the elements illustrated in FIGS. 10 to 21 will be mainly described, and redundant descriptions thereof will be omitted for conciseness.

Figure 31:
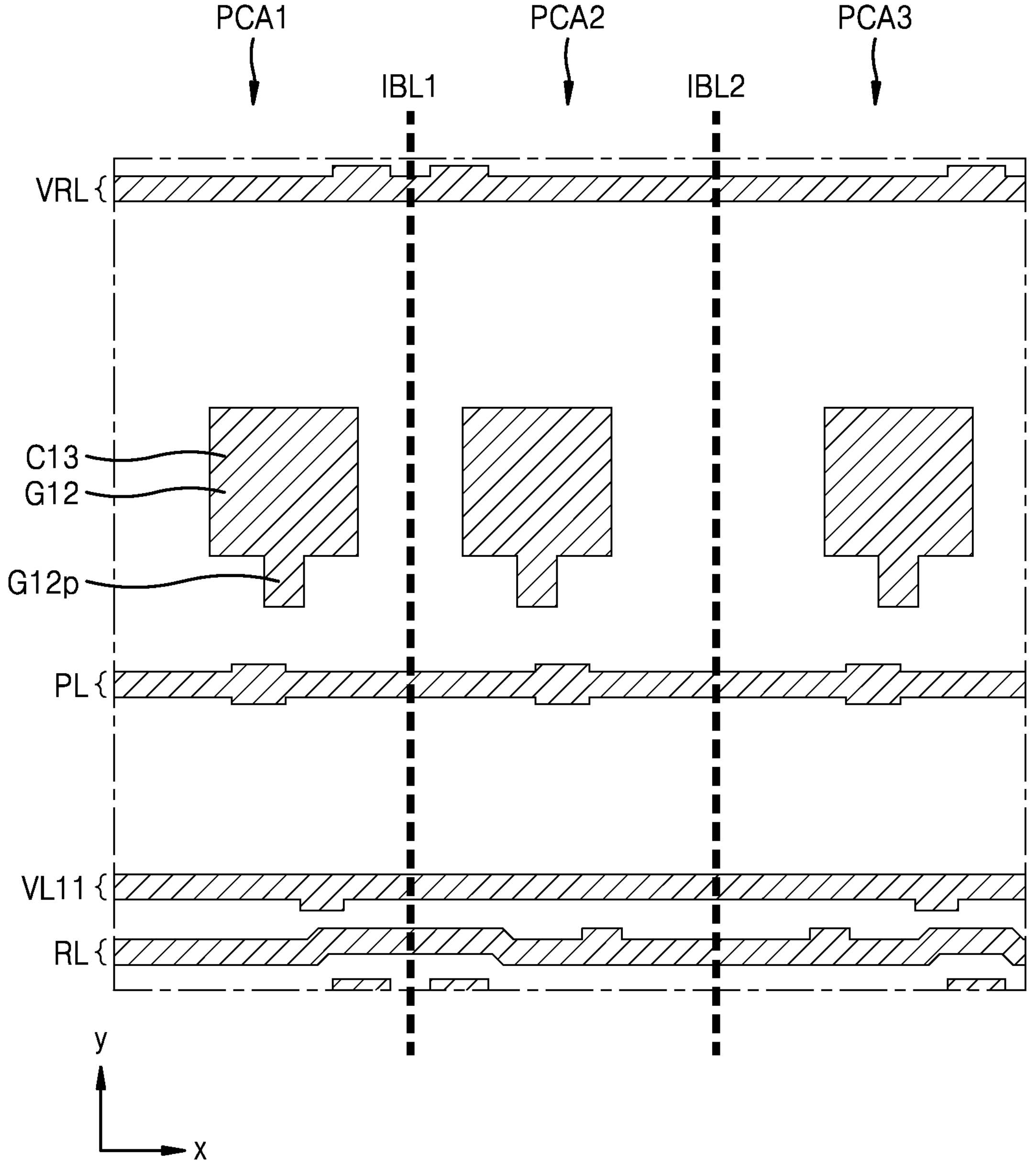
FIGS. 31, 32, 33, 34, 35, 36, 37, 38 and 39 are arrangement diagrams schematically illustrating elements of the pixel of FIG. 24 layer by layer.

Referring to FIG. 31, a first conductive layer may be disposed over the substrate 100. The first conductive layer may include a reference voltage line VRL, a second gate electrode G12 of the first transistor T1, a driving voltage line PL, and a first initialization voltage line VL11. The first conductive layer may further include a repair line RL. The reference voltage line VRL, the driving voltage line PL, the first initialization voltage line VL11, and the repair line RL may extend in the x direction and may be arranged in the first pixel area PCA1, the second pixel area PCA2, and the third pixel area PCA3. The second gate electrode G12 of the first transistor T1 may be provided in an island type. The second gate electrode G12 of the first transistor T1 may be a lower electrode C13 of the second electrode of the first capacitor C1.

Figure 32:
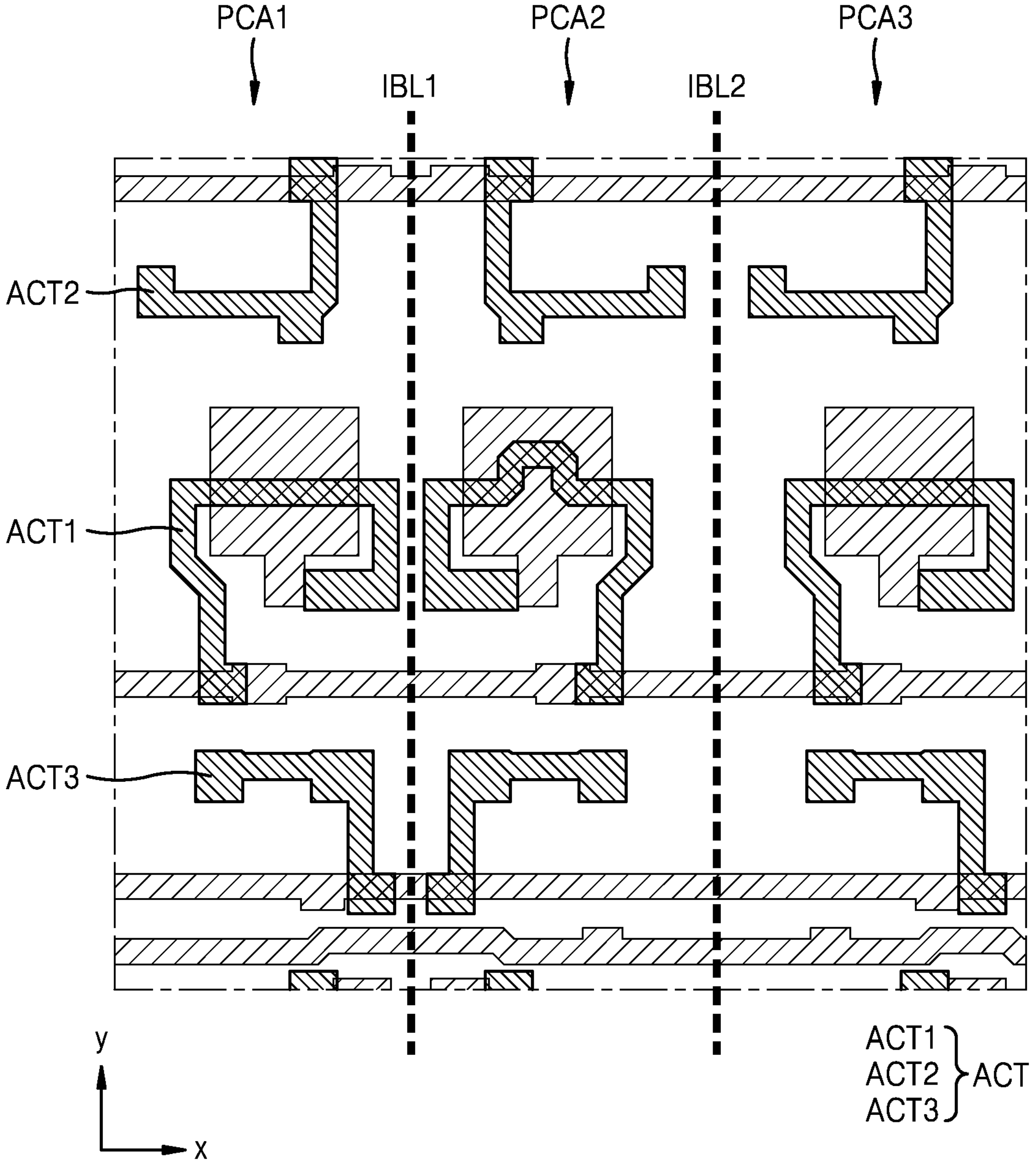

A buffer layer 110 may be disposed over the first conductive layer, and a semiconductor layer ACT may be disposed over the buffer layer 110. Referring to FIG. 32, the semiconductor layer ACT may include a first semiconductor layer ACT1, a second semiconductor layer ACT2, and a third semiconductor layer ACT3. As illustrated in FIG. 35, the first semiconductor layer ACT1 may include a source area S1 and a drain area D1 of the first transistor T1 and a source area S5 and a drain area D5 of the fifth transistor T5. The second semiconductor layer ACT2 may include a source area S2 and a drain area D2 of the second transistor T2 and a source area S3 and a drain area D3 of the third transistor T3. The third semiconductor layer ACT3 may include a source area S4 and a drain area D4 of the fourth transistor T4 and a source area S7 and a drain area D7 of the seventh transistor T7.

A first insulating layer 111 may be disposed over the semiconductor layer ACT, and a second conductive layer may be disposed over the first insulating layer 111. Referring to FIG. 33, the second conductive layer may include gate electrodes G1 to G5 and G7 of the first to fifth transistors T1 to T5 and the seventh transistor T7. Also, the second conductive layer may include a first gate line GWL, a second gate line GIL, a third gate line GRL, a fifth gate line EMBL, and an emission control line EML.

The first gate line GWL, the second gate line GIL, the third gate line GRL, the fifth gate line EMBL, and the emission control line EML may extend in the x direction and may be arranged in the first pixel area PCA1, the second pixel area PCA2, and the third pixel area PCA3.

As illustrated in FIG. 35, a first gate electrode G11 of the first transistor T1 may be provided in an island type and may overlap the second gate electrode G12 and the first semiconductor layer ACT1. The first gate electrode G11 of the first transistor T1 may be a first electrode C11 of the first capacitor C1. A gate electrode G2 of the second transistor T2 may be a portion of the first gate line GWL that intersects (overlaps) the second semiconductor layer ACT2. A gate electrode G3 of the third transistor T3 may be a portion of the third gate line GRL that intersects (overlaps) the second semiconductor layer ACT2. A gate electrode G4 of the fourth transistor T4 may be a portion of the second gate line GIL that intersects (overlaps) the third semiconductor layer ACT3. A gate electrode G5 of the fifth transistor T5 may be a portion of the emission control line EML that intersects (overlaps) the first semiconductor layer ACT1. A gate electrode G7 of the seventh transistor T7 may be a portion of the fifth gate line EMBL that intersects (overlaps) the third semiconductor layer ACT3.

A second insulating layer 112 may be disposed over the first insulating layer 111 to cover the second conductive layer, and a third conductive layer may be disposed over the second insulating layer 112. Referring to FIG. 34, the third conductive layer may include an upper electrode C12 of the second electrode of the first capacitor C1 and a second initialization voltage line VL12.

The upper electrode C12 of the second electrode of the first capacitor C1 may be provided in an island type and may overlap the lower electrode C13 of the second electrode and the first electrode C11 of the first capacitor C1. An opening SOP may be formed in the upper electrode C12 of the second electrode of the first capacitor C1. The first capacitor C1 may include a lower electrode C13 of the second electrode, a first electrode C11, and an upper electrode C12 of the second electrode and may overlap the first transistor T1.

The second initialization voltage line VL12 may extend in the x direction and may be arranged in the first pixel area PCA1, the second pixel area PCA2, and the third pixel area PCA3.

Figure 36:
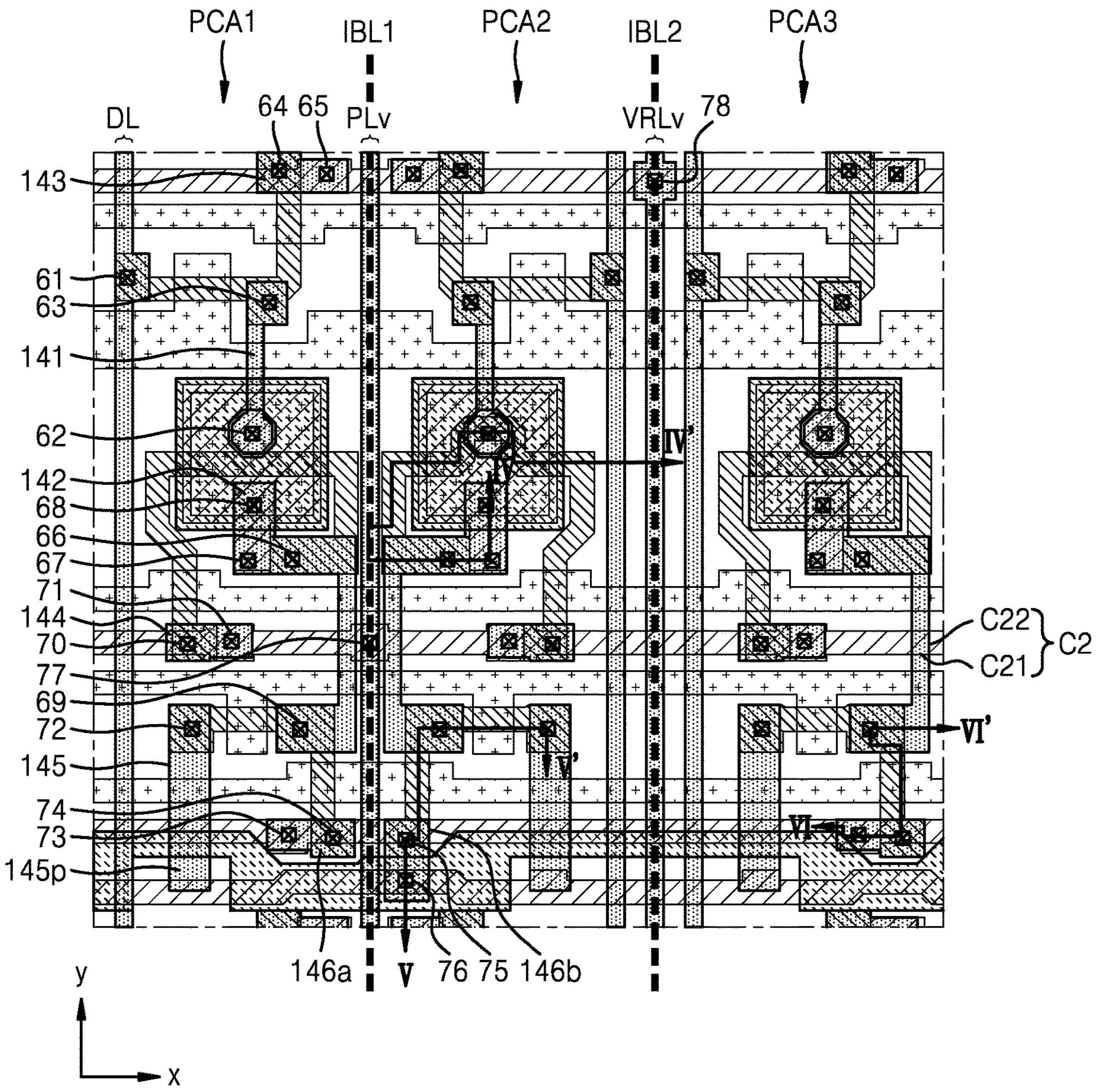
Figure 37:
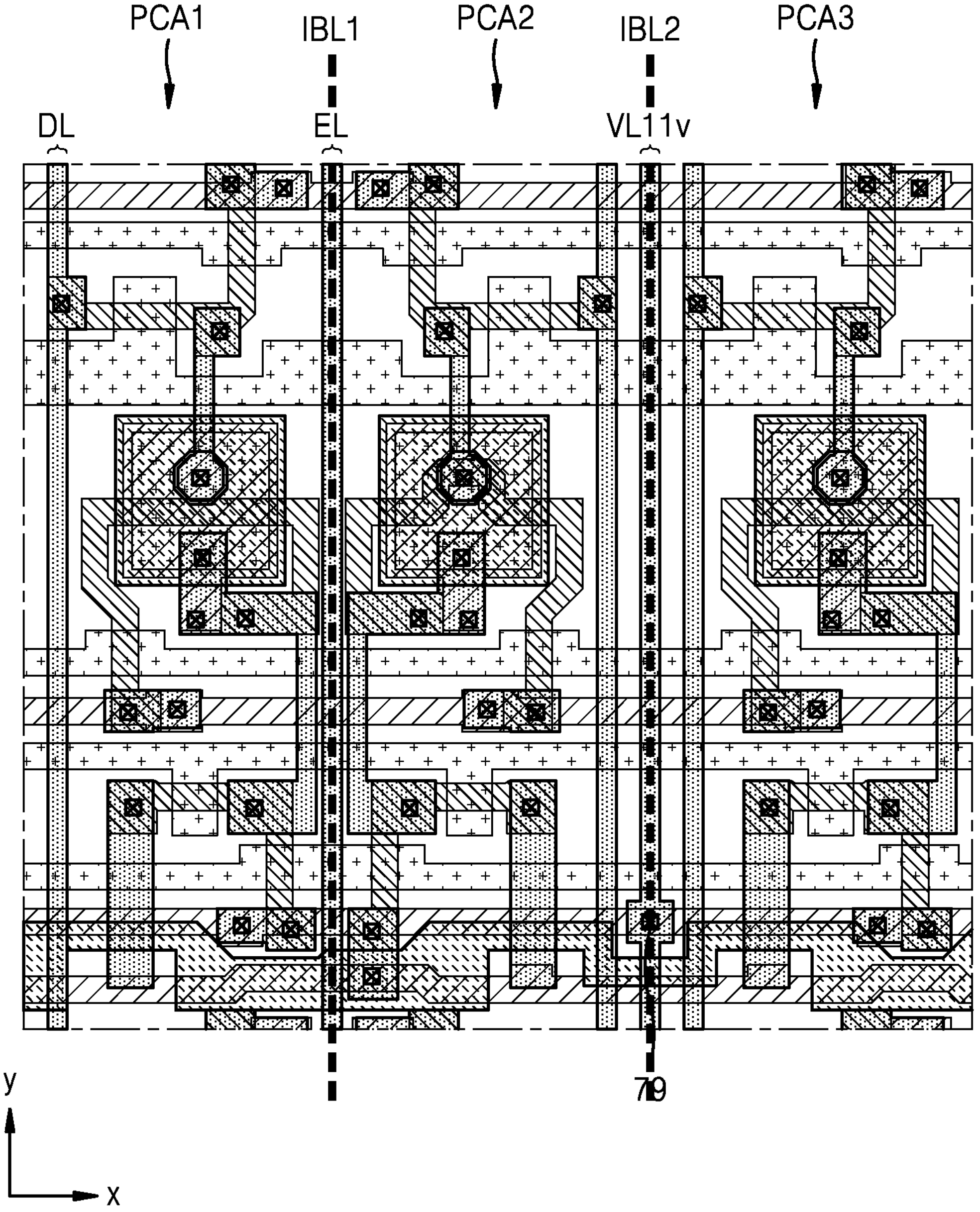
Figure 38:
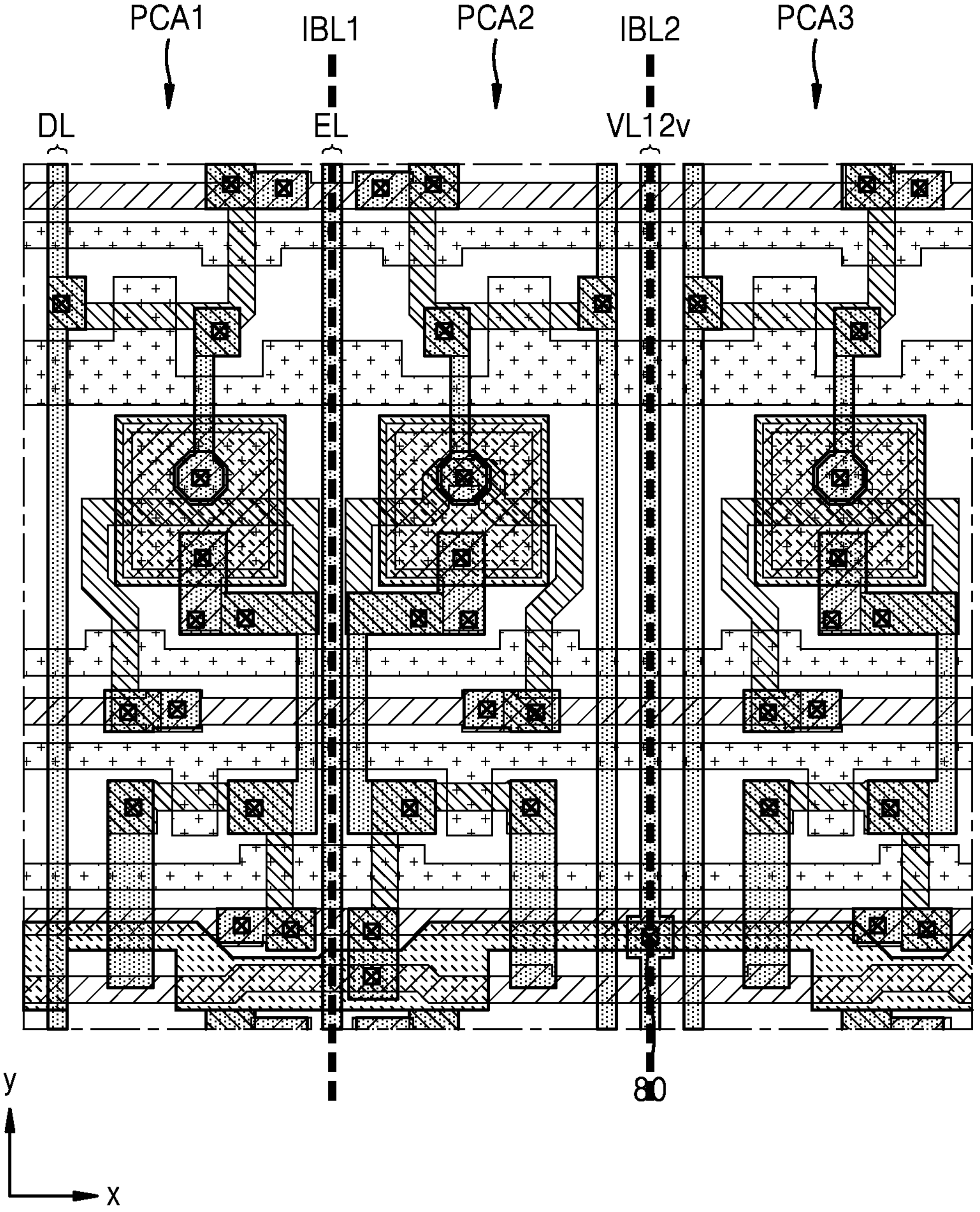

A third insulating layer 113 may be disposed over the second insulating layer 112 to cover the third conductive layer, and a fourth conductive layer may be disposed over the third insulating layer 113. As illustrated in FIGS. 36 to 38, the fourth conductive layer may include a data line DL, a first node electrode 141, a second node electrode 142, conductive patterns 143, 144, 145, 146*a*, and 146*b*, and vertical conductive lines VCL.

The data line DL may be arranged in each pixel area to extend in the y direction. The data line DL may be electrically connected to the drain area D2 of the second transistor T2 through a contact hole 61 formed through the first insulating layer 111, the second insulating layer 112, and the third insulating layer 113.

One end of the first node electrode 141 may be electrically connected to the first gate electrode G11 of the first transistor T1 through a contact hole 62 formed through the second insulating layer 112 and the third insulating layer 113. The other end of the first node electrode 141 may be electrically connected to the source area S2 of the second transistor T2 and the drain area D3 of the third transistor T3 through a contact hole 63 formed through the first insulating layer 111, the second insulating layer 112, and the third insulating layer 113.

A first portion of one end of the second node electrode 142 may be electrically connected to the source area S1 of the first transistor T1 through a contact hole 66 formed through the first insulating layer 111, the second insulating layer 112, and the third insulating layer 113. A second portion of one end of the second node electrode 142 may be electrically connected to the protrusion portion G12*p* of the second gate electrode G12 of the first transistor T1 through a contact hole 67 formed through the buffer layer 110, the first insulating layer 111, the second insulating layer 112, and the third insulating layer 113. A third portion of one end of the second node electrode 142 may be electrically connected to the upper electrode C12 of the second electrode of the first capacitor C1 through a contact hole 68 formed through the third insulating layer 113. The other end of the second node electrode 142 may be electrically connected to the drain area D4 of the fourth transistor T4 and the drain area D7 of the seventh transistor T7 through a contact hole 69 formed through the first insulating layer 111, the second insulating layer 112, and the third insulating layer 113.

The conductive pattern 143 may be electrically connected to the source area S3 of the third transistor T3 through a contact hole 64 formed through the first insulating layer 111, the second insulating layer 112, and the third insulating layer 113 and may be electrically connected to the reference voltage line VRL through a contact hole 65 formed through the buffer layer 110, the first insulating layer 111, the second insulating layer 112, and the third insulating layer 113.

The conductive pattern 144 may be electrically connected to the driving voltage line PL through a contact hole 71 formed through the buffer layer 110, the first insulating layer 111, the second insulating layer 112, and the third insulating layer 113 and may be electrically connected to the drain area D5 of the fifth transistor T5 through a contact hole 70 formed through the first insulating layer 111, the second insulating layer 112, and the third insulating layer 113.

The conductive pattern 145 may be electrically connected to the source area S7 of the seventh transistor T7 through a contact hole 72 formed through the first insulating layer 111, the second insulating layer 112, and the third insulating layer 113. A portion 145*p* of the conductive pattern 145 may be electrically connected to the pixel electrode by contacting the pixel electrode.

In the first pixel area PCA1 and the third pixel area PCA3, the conductive pattern 146*a* may be electrically connected to the first initialization voltage line VL11 through a contact hole 73 formed through the buffer layer 110, the first insulating layer 111, the second insulating layer 112, and the third insulating layer 113 and may be electrically connected to the source area S4 of the fourth transistor T4 through a contact hole 74 formed through the first insulating layer 111, the second insulating layer 112, and the third insulating layer 113.

In the second pixel area PCA2, the conductive pattern 146*b* may be electrically connected to the second initialization voltage line VL12 through a contact hole 76 formed through the third insulating layer 113 and may be electrically connected to the source area S4 of the fourth transistor T4 through a contact hole 75 formed through the first insulating layer 111, the second insulating layer 112, and the third insulating layer 113.

As illustrated in FIGS. 30 and 36, the vertical driving voltage line PLv may be disposed over the boundary line IBL1 between the first pixel area PCA1 and the second pixel area PCA2, and the vertical reference voltage line VRLv may be disposed over the boundary line IBL2 between the second pixel area PCA2 and the third pixel area PCA3. The vertical driving voltage line PLv may be electrically connected to the driving voltage line PL through a contact hole 77 formed through the buffer layer 110, the first insulating layer 111, the second insulating layer 112, and the third insulating layer 113. The vertical reference voltage line VRLv may be electrically connected to the reference voltage line VRL through a contact hole 78 formed through the buffer layer 110, the first insulating layer 111, the second insulating layer 112, and the third insulating layer 113.

As illustrated in FIGS. 30 and 37, the common voltage line EL may be disposed over the boundary line IBL1 between the first pixel area PCA1 and the second pixel area PCA2, and the first vertical initialization voltage line VL11*v* may be disposed over the boundary line IBL2 between the second pixel area PCA2 and the third pixel area PCA3. The first vertical initialization voltage line VL11*v* may be electrically connected to the first initialization voltage line VL11 through a contact hole 79 formed through the buffer layer 110, the first insulating layer 111, the second insulating layer 112, and the third insulating layer 113.

As illustrated in FIGS. 30, 36 and 38, the vertical driving voltage line PLv may be disposed over the boundary line IBL1 between the first pixel area PCA1 and the second pixel area PCA2, and the second vertical initialization voltage line VL12*v* may be disposed over the boundary line IBL2 between the second pixel area PCA2 and the third pixel area PCA3. The second vertical initialization voltage line VL12*v* may be electrically connected to the second initialization voltage line VL12 through a contact hole 80 formed through the third insulating layer 113.

A fourth insulating layer 114 may be disposed over the third insulating layer 113 to cover the fourth conductive layer, and an organic light emitting diode OLED may be disposed over the fourth insulating layer 114 as a display element. The organic light emitting diode OLED may include a pixel electrode 211, an opposite electrode 215, and an intermediate layer disposed between the pixel electrode 211 and the opposite electrode 215.

Figure 39:
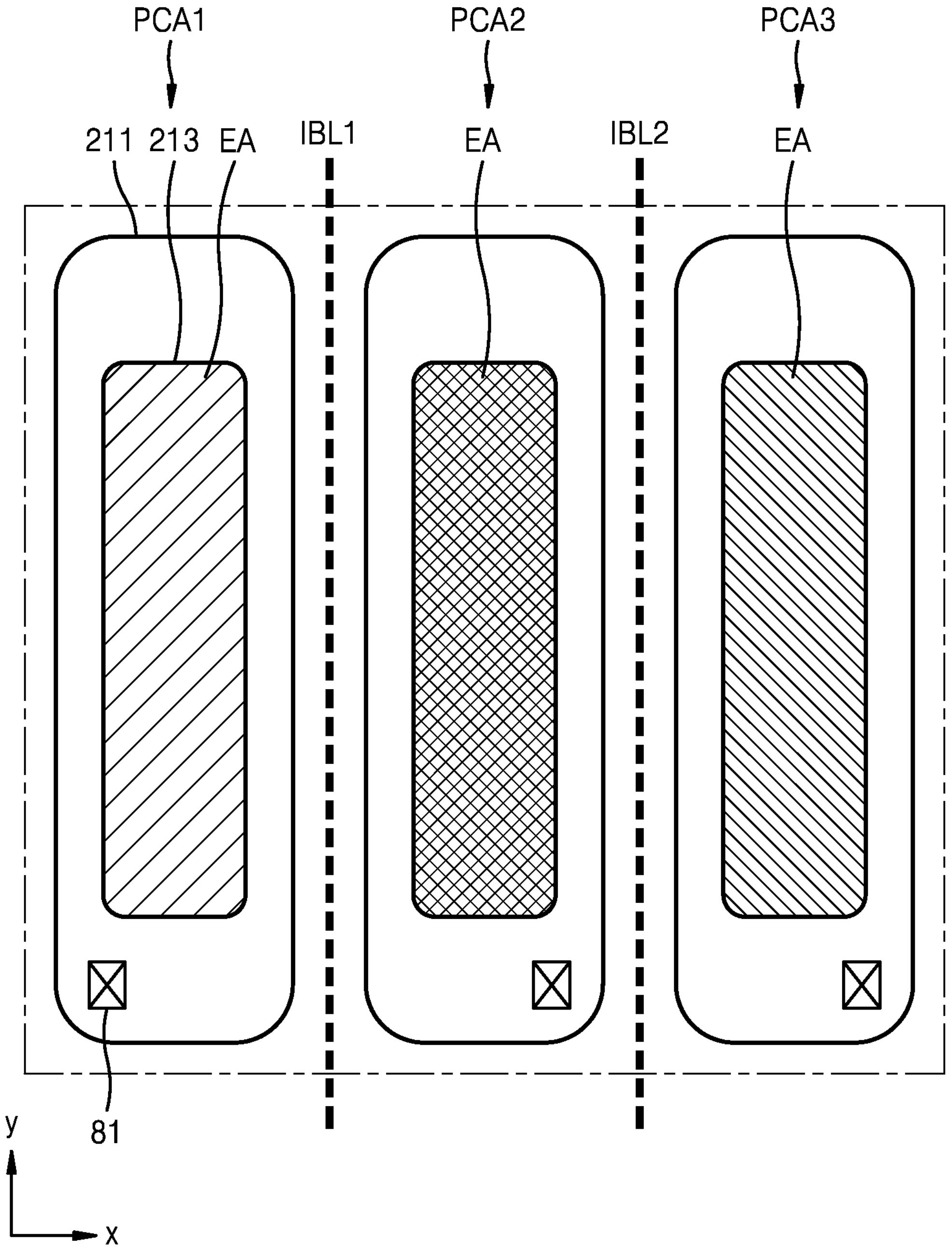

Referring to FIG. 39, the pixel electrode 211 may be connected to the first transistor T1 by being electrically connected to the portion 145*p* of the conductive pattern 145 formed through a contact hole 81 of the fourth insulating layer 114. The pixel electrode 211 may be connected to the first transistor T1 connected to the second node via the seventh transistor T7 by being electrically connected to the portion 145*p* of the conductive pattern 145 formed through a contact hole 81 of the fourth insulating layer 114. In an embodiment, the pixel electrode 211 connected to the pixel circuit of the first pixel PX1 may overlap the first pixel area PCA1, the pixel electrode 211 connected to the pixel circuit of the second pixel PX2 may overlap the second pixel area PCA2, and the pixel electrode 211 connected to the pixel circuit of the third pixel PX3 may overlap the pixel circuit of the third pixel area PCA3. Each of the pixel electrodes 211 may have a rectangular shape having a long side in the y direction.

The pixel electrode 211 and the emission area EA of each of the first pixel PX1, the second pixel PX2, and the third pixel PX3 may be arranged adjacent to each other in the x direction. In an embodiment, the emission area EA of the first pixel PX1, the emission area EA of the second pixel PX2, and the emission area EA of the third pixel PX3 may have the same area (size).

Figure 42:
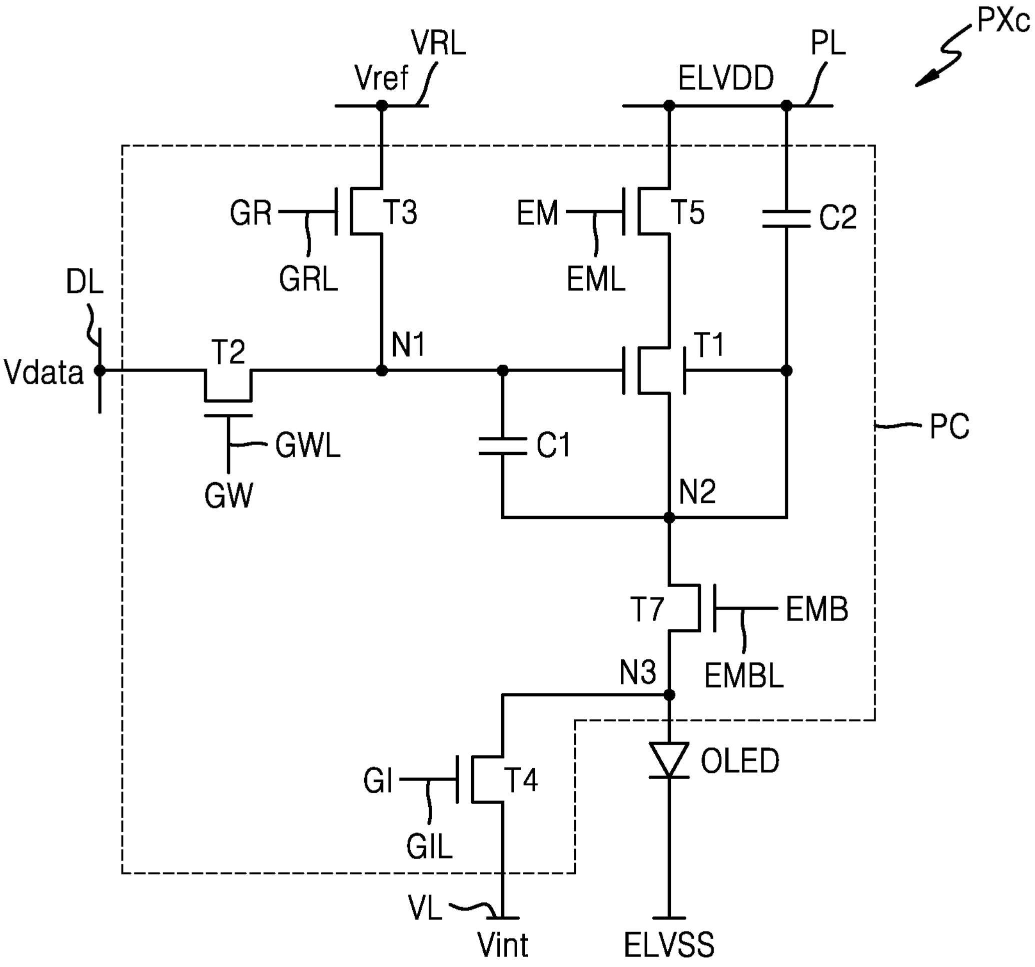
FIG. 42 is an equivalent circuit diagram of a pixel according to an embodiment.

FIG. 42 is an equivalent circuit diagram of a pixel according to an embodiment.

A pixel circuit PC of a pixel PXc of FIG. 42 may be different from the pixel circuit PC of the pixel PXa of FIG. 3 in that it further includes a seventh transistor T7 and the fourth transistor T4 is connected between the initialization voltage line VL and a third node N3 to which the seventh transistor T7 and the organic light emitting diode OLED are connected. The pixel circuit PC of the pixel PXc of FIG. 42 may be different from the pixel circuit PC of the pixel PXb of FIG. 24 in that the fourth transistor T4 is connected between the third node N3 and the initialization voltage line VL.

The fourth transistor T4 may be connected between the first transistor T1 and the initialization voltage line VL. The fourth transistor T4 may be connected between the seventh transistor T7 and the initialization voltage line VL. The fourth transistor T4 may include a gate connected to the second gate line GIL, a first terminal connected to the third node N3, and a second terminal connected to the initialization voltage line VL configured to supply the initialization voltage Vint.

Other configurations and operations thereof may be the same as those of the pixel PXb illustrated in FIGS. 24 and 25.

The pixel PXc may include a first pixel PX1, a second pixel PX2, and a third pixel PX3 as disclosed in FIGS. 26 to 29. The pixel PXc may be connected to a plurality of initialization voltage lines VL which supplies different initialization voltages. Each of plurality of initialization voltage lines VL may be connected to at least one of the first pixel PX1, the second pixel PX2, or the third pixel PX3. The plurality of the initialization voltage lines VL may supply different initialization voltages to the organic light emitting diodes OLED considering the light emitting characteristics of the first pixel PX1, the second pixel PX2, and the third pixel PX3.

Figure 43:
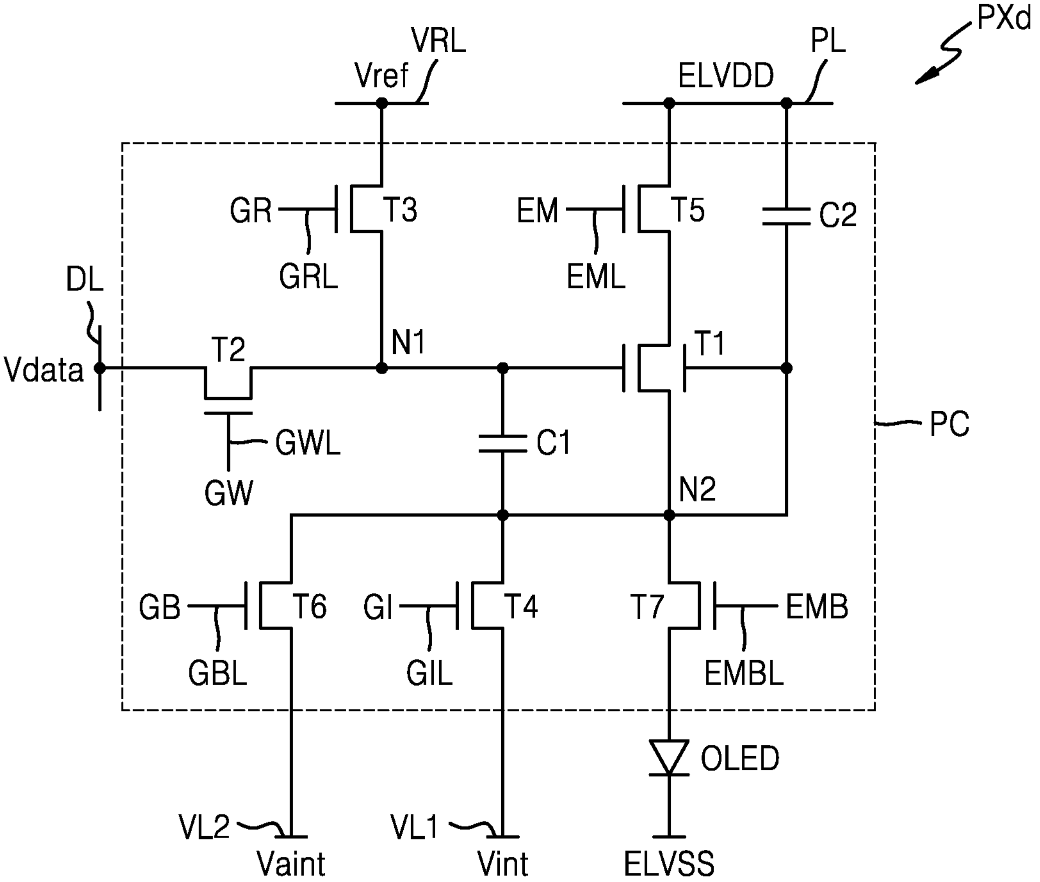
FIG. 43 is an equivalent circuit diagram of a pixel according to an embodiment.
Figure 44:
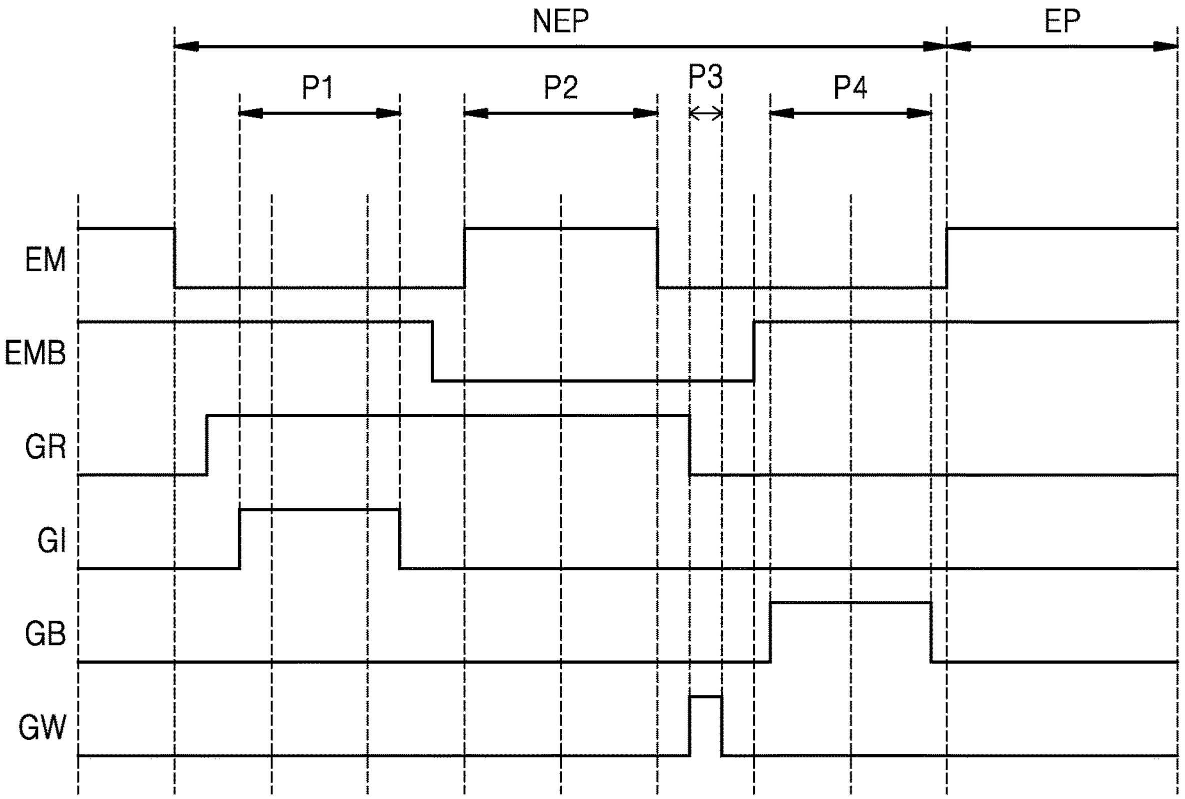
FIG. 44 is a waveform diagram illustrating signals for describing an operation of the pixel illustrated in FIG. 43.

FIG. 43 is an equivalent circuit diagram of a pixel according to an embodiment. FIG. 44 is a waveform diagram illustrating signals for describing an operation of the pixel illustrated in FIG. 43.

A pixel circuit PC of a pixel PXd of FIG. 43 may be different from the pixel circuit PC of the pixel PXa of FIG. 3 in that it further includes a seventh transistor T7. The pixel circuit PC of the pixel PXd of FIG. 43 may be different from the pixel circuit PC of the pixel PXb of FIG. 24 in that it further includes a sixth transistor T6.

The fourth transistor T4 may be connected between the first transistor T1 and the first initialization voltage line VL1. The fourth transistor T4 may be connected between the seventh transistor T7 and the first initialization voltage line VL1. The fourth transistor T4 may be connected between the second node N2 and the first initialization voltage line VL1. The fourth transistor T4 may include a gate connected to the second gate line GIL, a first terminal connected to the second node N2, and a second terminal connected to the first initialization voltage line VL1 configured to supply the first initialization voltage Vint.

The sixth transistor T6 may be connected between the first transistor T1 and the second initialization voltage line VL2. The sixth transistor T6 may be connected between the seventh transistor T7 and the second initialization voltage line VL2. The sixth transistor T6 may be connected between the second node N2 and the second initialization voltage line VL2. The sixth transistor T6 may include a gate connected to the fourth gate line GBL, a first terminal connected to the second node N2, and a second terminal connected to the second initialization voltage line VL2 configured to supply the second initialization voltage Vaint.

The seventh transistor T7 may be connected between the first transistor T1 and the organic light emitting diode OLED. The seventh transistor T7 may be connected to the fourth transistor T4 and the organic light emitting diode OLED. The seventh transistor T7 may be connected between the sixth transistor T6 and the organic light emitting diode OLED. The seventh transistor T7 may be connected between the second node N2 and the organic light emitting diode OLED. The seventh transistor T7 may include a gate connected to the fifth gate line EMBL, a first terminal connected to the second node N2, and a second terminal connected to the pixel electrode of the organic light emitting diode OLED.

Referring to FIG. 44, one frame period may include a non-emission period NEP in which the pixel PXd does not emit light and an emission period EP in which the pixel PXd emits light. The non-emission period NEP may include a first initialization period P1, a compensation period P2, a write period P3, and a second initialization period P4.

In the first initialization period P1, the second gate signal GI of the on voltage may be supplied to the second gate line GIL, the third gate signal GR of the on voltage may be supplied to the third gate line GRL, and the fifth gate signal EMB of the on voltage may be supplied to the fifth gate line EMBL. The first gate signal GW, the fourth gate signal GB, and the emission control signal EM may be supplied with an off voltage. The fourth transistor T4 may be turned on by the second gate signal GI, the third transistor T3 may be turned on by the third gate signal GR, and the seventh transistor T7 may be turned on by the fifth gate signal EMB. The gate of the first transistor T1 may be initialized to the reference voltage Vref by the turned-on third transistor T3. The pixel electrode of the organic light emitting diode OLED may be initialized to the first initialization voltage Vint by the turned on fourth transistor T4 and seventh transistor T7.

In the compensation period P2, the third gate signal GR of the on voltage may be supplied to the third gate line GRL, and the emission control signal EM of the on voltage may be supplied to the emission control line EML. The first gate signal GW, the second gate signal GI, the fourth gate signal GB, and the fifth gate signal EMB may be supplied with an off voltage. The third transistor T3 may be turned on by the third gate signal GR, and the fifth transistor T5 may be turned on by the emission control signal EM. The second transistor T2, the fourth transistor T4, the sixth transistor T6, and the seventh transistor T7 may be turned off by the first gate signal GW, the second gate signal GI, the fourth gate signal GB, and the fifth gate signal EMB. The threshold voltage (Vth) of the first transistor T1 may be compensated by the turned on third transistor T3 and fifth transistor T5.

In the write period P3, the first gate signal GW of the on voltage may be supplied to the first gate line GWL to turn on the second transistor T2. In this case, the third to seventh transistors T3, T4, T5, T6, and T7 may be turned off by the second gate signal GI, the third gate signal GR, the fourth gate signal GB, the fifth gate signal EMB, and the emission control signal EM of the off voltage. The second transistor T2 may be configured to transmit the data signal Vdata from the data line DL to the first node N1, that is, the first gate of the first transistor T1. Accordingly, the gate-source voltage (Vgs) of the first transistor T1 may be expressed as Equation (1) above.

In the second initialization period P4, the fourth gate signal GB of the on voltage may be supplied to the fourth gate line GBL, and the fifth gate signal EMB of the on voltage may be supplied to the fifth gate line EMBL. The first gate signal GW, the second gate signal GI, the third gate signal GR, and the emission control signal EM may be supplied with an off voltage. The seventh transistor T7 may be turned on by the fifth gate signal EMB to connect the pixel electrode of the organic light emitting diode OLED with the second terminal of the first transistor T1, and the sixth transistor T6 may be turned on by the fourth gate signal GB to initialize the pixel electrode of the organic light emitting diode OLED to the second initialization voltage Vaint.

In the emission period EP, the emission control signal EM and the fifth gate signal EMB may be supplied with an on voltage, and the first gate signal GW, the second gate signal GI, and the third gate signal GR may be supplied with an off voltage. The second to fourth transistors T2, T3, and T4 may be turned off by the first gate signal GW, the second gate signal GI, and the third gate signal GR, and the fifth transistor T5 and the seventh transistor T7 may be turned on by the emission control signal EM and the fifth gate signal EMB.

The first transistor T1 may output a driving current ($Id \propto (Vgs-Vth)^2$) having a magnitude corresponding to the voltage stored in the first capacitor C1, and the organic light emitting diode OLED may emit light with a luminance corresponding to the magnitude of the driving current irrelevant to the threshold voltage (Vth) of the first transistor T1.

In an embodiment, by considering the light emitting characteristics of the first pixel PX1, the second pixel PX2, and the third pixel PX3, different first initialization voltages Vint and/or second initialization voltages Vaint may be supplied to the first pixel PX1, the second pixel PX2, and the third pixel PX1.

Figure 45:
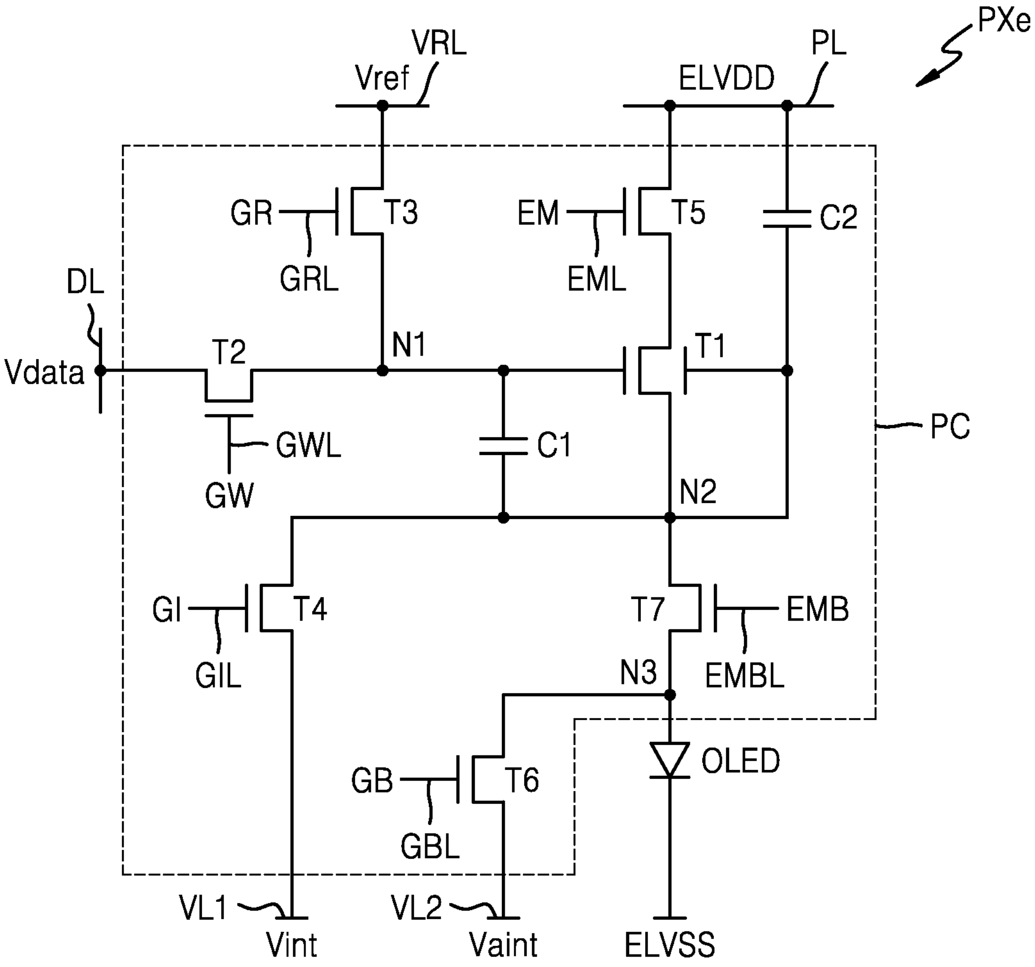
FIG. 45 is an equivalent circuit diagram of a pixel according to an embodiment.
Figure 46:
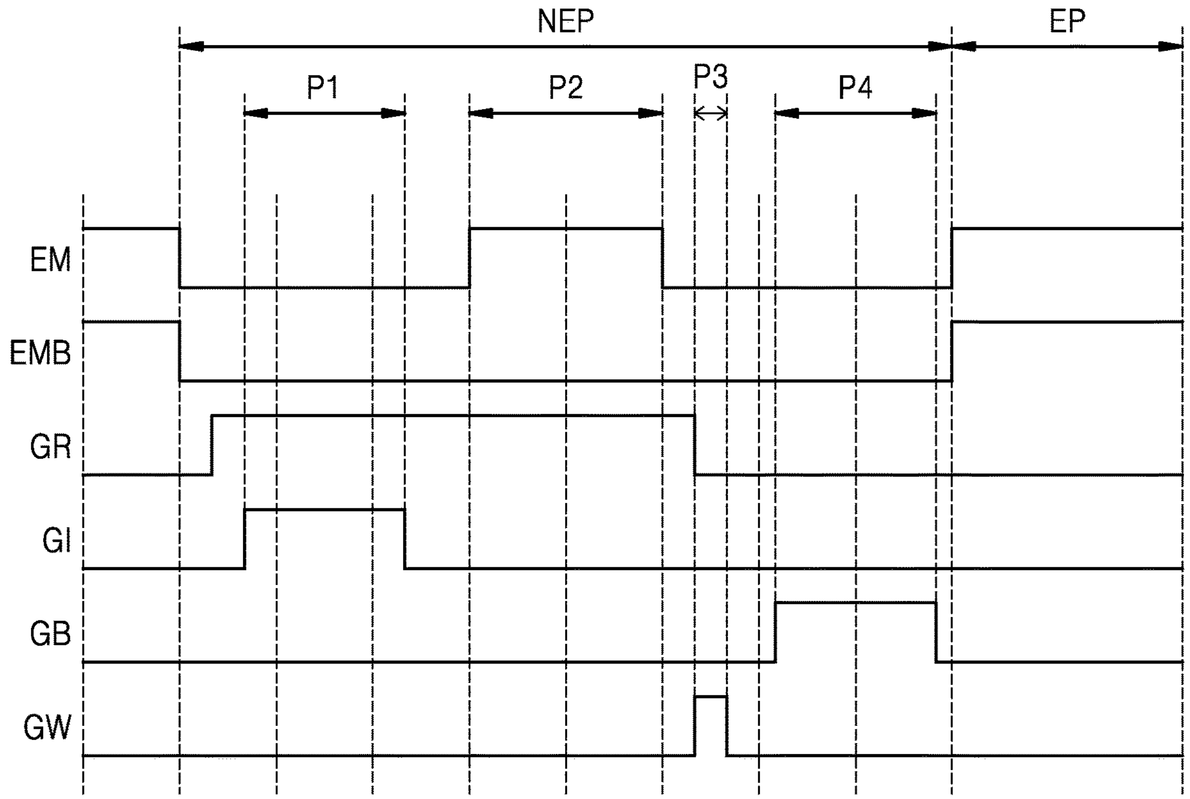
FIG. 46 is a waveform diagram illustrating signals for describing an operation of the pixel illustrated in FIG. 45.

FIG. 45 is an equivalent circuit diagram of a pixel according to an embodiment. FIG. 46 is a waveform diagram illustrating signals for describing an operation of the pixel illustrated in FIG. 45.

A pixel circuit PC of a pixel PXe of FIG. 45 may be different from the pixel circuit PC of the pixel PXa of FIG. 3 in that it further includes a seventh transistor T7 and the sixth transistor T6 is connected between the second initialization voltage line VL2 and a third node N3 to which the seventh transistor T7 and the organic light emitting diode OLED are connected. The pixel circuit PC of the pixel PXe of FIG. 45 may be different from the pixel circuit PC of the pixel PXd of FIG. 43 in that the sixth transistor T6 is connected between the third node N3 and the second initialization voltage line VL2.

The sixth transistor T6 may be connected between the seventh transistor T7 and the second initialization voltage line VL2. The sixth transistor T6 may be connected between the organic light emitting diode OLED and the second initialization voltage line VL2. The sixth transistor T6 may be connected between the third node N3 and the second initialization voltage line VL2. The sixth transistor T6 may include a gate connected to the fourth gate line GBL, a first terminal connected to the third node N3, and a second terminal connected to the second initialization voltage line VL2 configured to supply the second initialization voltage Vaint.

The fifth gate signal EMB may be supplied with an on voltage in the emission period EP and may be supplied with an off voltage in the non-emission period NEP. For example, as illustrated in FIG. 46, the fifth gate signal EMB may be supplied with an off voltage in the first initialization period P1, the compensation period P2, the write period P3, and the second initialization period P4 and may be supplied with an on voltage in the emission period EP. Accordingly, the seventh transistor T7 may be turned on in the emission period EP and turned off in the non-emission period NEP.

Other configurations and operations thereof may be the same as those of the pixel PXd illustrated in FIGS. 43 and 44.

Figure 47:
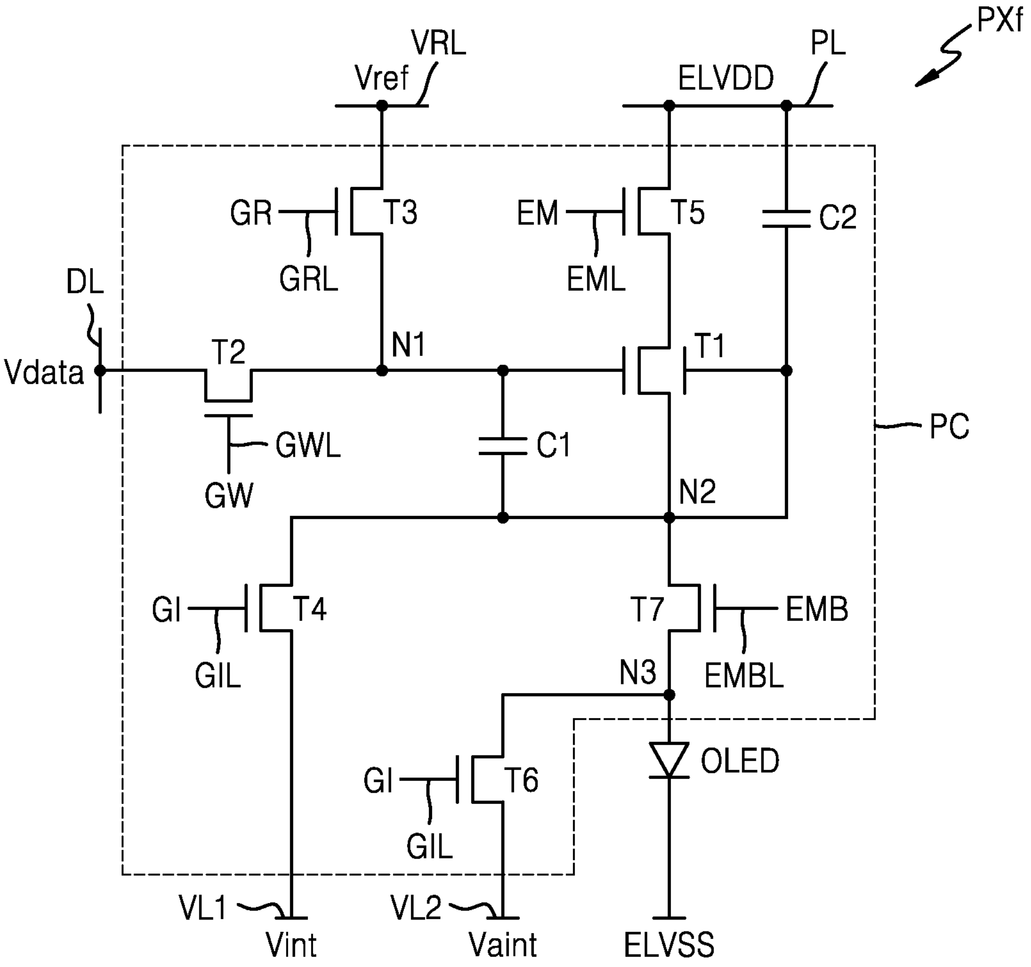
FIG. 47 is an equivalent circuit diagram of a pixel according to an embodiment.
Figure 48:
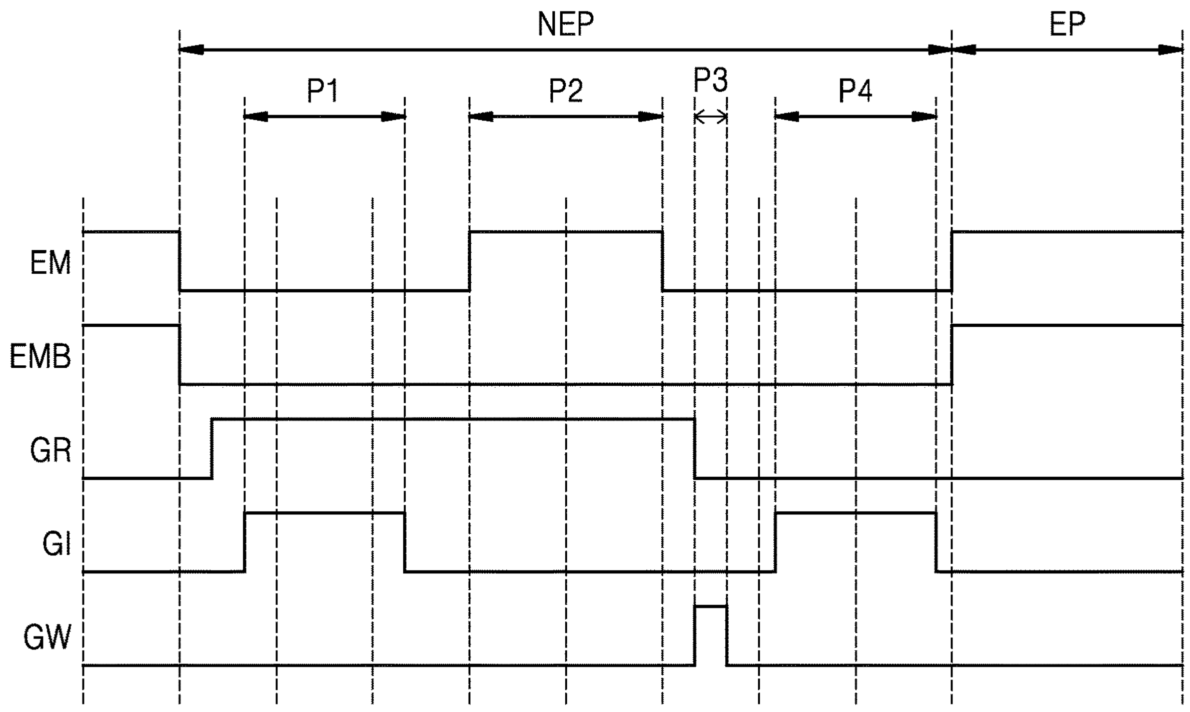
FIG. 48 is a waveform diagram illustrating signals for describing an operation of the pixel illustrated in FIG. 47.

FIG. 47 is an equivalent circuit diagram of a pixel according to an embodiment. FIG. 48 is a waveform diagram illustrating signals for describing an operation of the pixel illustrated in FIG. 47.

A pixel circuit PC of a pixel PXf of FIG. 47 may be different from the pixel circuit PC of the pixel PXe of FIG. 45 in that the gate of the fourth transistor T4 and the gate of the sixth transistor T6 are connected to the second gate line GIL.

The fourth transistor T4 may be connected between the first transistor T1 and the first initialization voltage line VL1. The fourth transistor T4 may be connected between the seventh transistor T7 and the first initialization voltage line VL1. The fourth transistor T4 may be connected between the second node N2 and the first initialization voltage line VL1. The fourth transistor T4 may include a gate connected to the second gate line GIL, a first terminal connected to the second node N2, and a second terminal connected to the first initialization voltage line VL1 configured to supply the first initialization voltage Vint.

The sixth transistor T6 may be connected between the seventh transistor T7 and the second initialization voltage line VL2. The sixth transistor T6 may be connected between the organic light emitting diode OLED and the second initialization voltage line VL2. The sixth transistor T6 may be connected between the third node N3 and the second initialization voltage line VL2. The sixth transistor T6 may include a gate connected to the second gate line GIL, a first terminal connected to the third node N3, and a second terminal connected to the second initialization voltage line VL2 configured to supply the second initialization voltage Vaint.

The second gate signal GI may be supplied with an off voltage in the emission period EP and may be supplied with an on voltage or off voltage in the non-emission period NEP. For example, as illustrated in FIG. 48, the second gate signal GI may be supplied with an on voltage in the first initialization period P1 and the second initialization period P4 and may be supplied with an off voltage in the compensation period P2, the write period P3, and the emission period EP. Accordingly, the fourth transistor T4 and the sixth transistor T6 may be turned on in the first initialization period P1 and the second initialization period P4 and may be turned off in the compensation period P2, the write period P3, and the emission period EP.

Other configurations and operations thereof may be the same as those of the pixel PXe illustrated in FIGS. 45 and 46.

Each of the pixel PXd of FIG. 43, the pixel PXe of FIG. 45, and the pixel PXf of FIG. 47 may include a first pixel PX1, a second pixel PX2, and a third pixel PX3 as disclosed in FIGS. 5 to 8. The pixels may be connected to a plurality of second initialization voltage lines VL2 which supplies different initialization voltages. Each of the plurality of second initialization voltage lines VL2 may be connected to at least one of the first pixel PX1, the second pixel PX2, and the third pixel PX3. The plurality of the second initialization voltage lines VL2 may supply different second initialization voltages Vaint to each second initialization voltage line VL2 considering the light emitting characteristics of the first pixel PX1, the second pixel PX2, and the third pixel PX3. And/or, it may separately include different first initialization voltage lines VL1 connected to at least one of the first pixel PX1, the second pixel PX2, and the third pixel PX3 and may supply different first initialization voltages Vint to each first initialization voltage line VL1.

According to embodiments, it may be possible to provide a display apparatus with an improved display quality by minimizing a luminance deviation of each pixel. However, the scope of the disclosure is not limited to these effects.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display apparatus comprising a plurality of pixels, wherein each of the plurality of pixels comprises:
- a first transistor comprising a first gate and a second gate;
- a second transistor connected between the first gate of the first transistor and a data line;
- a third transistor connected between the first gate of the first transistor and a first voltage line;
- a fourth transistor connected between the first transistor and a second voltage line;
- a fifth transistor connected between the first transistor and a third voltage line;
- a sixth transistor connected between the first transistor and a fourth voltage line;
- a light emitting diode connected to the first transistor;
- a first capacitor connected between the first gate of the first transistor and the light emitting diode; and
- a second capacitor connected between the third voltage line and the light emitting diode.

2. The display apparatus of claim 1, wherein the second gate of the first transistor is connected to a node to which the first transistor and the light emitting diode are connected.

3. The display apparatus of claim 1, wherein the pixel operates in a non-emission period and an emission period during one frame period, and
- wherein the non-emission period comprises:
- a first period in which the third transistor and the fourth transistor are turned on;
- a write period in which the second transistor is turned on, the write period following the first period; and
- a second period in which the sixth transistor is turned on, the second period following the write period.

4. The display apparatus of claim 3, wherein the non-emission period further comprises a third period in which the third transistor and the fifth transistor are turned on and a first voltage is supplied from the first voltage line to the first gate of the first transistor through the turned-on third transistor, the third period being disposed between the first period and the write period.

5. The display apparatus of claim 4, wherein the pixel further comprises a seventh transistor connected between the first transistor and the light emitting diode.

6. The display apparatus of claim 5, wherein the seventh transistor is turned on in the first period and the second period, and turned off in the third period and the write period.

7. The display apparatus of claim 3, wherein the second transistor is turned on in the write period and a data signal is supplied to the first gate of the first transistor through the turned-on second transistor.

8. The display apparatus of claim 1, wherein the fourth voltage line comprises a (4-1)th voltage line and a (4-2)th voltage line,
- wherein the sixth transistor of a first pixel emitting light in a first color among the plurality of pixels is connected to the (4-1)th voltage line,
- wherein the sixth transistor of a second pixel emitting light in a second color among the plurality of pixels is connected to the (4-2)th voltage line, and
- wherein a voltage supplied to the (4-1)th voltage line and a voltage supplied to the (4-2)th voltage line are different from each other.

9. The display apparatus of claim 1, wherein each of the first to fourth voltage lines extends in a first direction, and
- wherein the display apparatus further comprises first to fourth vertical voltage lines extending in a second direction perpendicular to the first direction and respectively connected to the first to fourth voltage lines.

10. The display apparatus of claim 9, wherein each of the first to fourth voltage lines is arranged in each row, and
- wherein each of the first to fourth vertical voltage lines is arranged between two columns at certain intervals.

11. The display apparatus of claim 1, wherein the first to sixth transistors are N-type thin film transistors.

12. The display apparatus of claim 11, wherein each of the N-type thin film transistors comprise an oxide semiconductor layer.

13. The display apparatus of claim 1, wherein at least one of the first to sixth transistors is P-type thin film transistor.

14. The display apparatus of claim 13, wherein the P-type thin film transistor comprises a silicon semiconductor layer.

15. A display apparatus comprising a plurality of pixels, wherein each of the plurality of pixels comprises:

a light emitting diode;

a first transistor comprising a first gate and a second gate;

a second transistor connected to the first gate of the first transistor and a data line;

a third transistor connected to the first gate of the first transistor and a first voltage line;

a fourth transistor connected to the first transistor and a second voltage line;

a fifth transistor connected to the first transistor and the light emitting diode;

a sixth transistor connected to the fifth transistor and a third voltage line;

a first capacitor connected between the first gate of the first transistor and the fifth transistor; and a second capacitor connected between the second voltage line and the fifth transistor.

16. The display apparatus of claim 15, wherein the second gate of the first transistor is connected to a node to which the first transistor and the fifth transistor are connected.

17. The display apparatus of claim 15, wherein the sixth transistor is connected between the third voltage line and a node to which the first transistor and the fifth transistor are connected.

18. The display apparatus of claim 17, wherein the pixel further comprises a seventh transistor connected between a second terminal of the first transistor and a fourth voltage line.

19. The display apparatus of claim 18, wherein the pixel operates in a non-emission period and an emission period during one frame period, and wherein the non-emission period comprises:

a first period in which the third transistor, the fifth transistor, and the sixth transistor are turned on;

a write period in which the second transistor is turned on and the fifth transistor is turned off, the write period following the first period;

a second period in which the fifth transistor and the seventh transistor are turned on, the second period following the write period; and a third period in which the third transistor and the fourth transistor are turned on and the fifth transistor is turned off, the third period being disposed between the first period and the writing period.

20. The display apparatus of claim 18, wherein the fourth voltage line comprises a (4-1)th voltage line and a (4-2)th voltage line, wherein the seventh transistor of a first pixel emitting light in a first color among the plurality of pixels is connected to the (4-1)th voltage line, wherein the seventh transistor of a second pixel emitting light in a second color among the plurality of pixels is connected to the (4-2)th voltage line, and wherein a voltage supplied to the (4-1)th voltage line and a voltage supplied to the (4-2)th voltage line are different from each other.

21. The display apparatus of claim 17, wherein the pixel further comprises a seventh transistor connected between a fourth voltage line and a node to which the fifth transistor and the light emitting diode are connected.

22. The display apparatus of claim 21, wherein the pixel operates in a non-emission period and an emission period during one frame period, wherein the non-emission period comprises:

a first period in which the third transistor and the sixth transistor are turned on;

a writing period in which the second transistor is turned on, the writing period following the first period;

a second period in which the seventh transistor is turned on, the second period following the write period; and a third period in which the third transistor and the fourth transistor are turned on, the third period being disposed between the first period and the write period, and wherein the fifth transistor is turned off in the non-emission period and turned on in the emission period.

23. The display apparatus of claim 21, wherein the fourth voltage line comprises a (4-1)th voltage line and a (4-2)th voltage line, wherein the seventh transistor of a first pixel emitting light in a first color among the plurality of pixels is connected to the (4-1)th voltage line, wherein the seventh transistor of a second pixel emitting light in a second color among the plurality of pixels is connected to the (4-2)th voltage line, and wherein a voltage supplied to the (4-1)th voltage line and a voltage supplied to the (4-2)th voltage line are different from each other.

24. The display apparatus of claim 15, wherein the sixth transistor is connected between the third voltage line and a node to which the fifth transistor and the light emitting diode are connected.

25. The display apparatus of claim 15, wherein the pixel operates in a non-emission period and an emission period during one frame period, and wherein the non-emission period comprises:

a first period in which the third transistor, the fifth transistor, and the sixth transistor are turned on;

a write period in which the second transistor is turned on, the writing period following the first period; and a second period in which the fifth transistor and the sixth transistor are turned on and the third transistor is turned off, the second period following the write period.

26. The display apparatus of claim 25, wherein the non-emission period further comprises a third period in which the third transistor and the fourth transistor are turned on and the fifth transistor and the sixth transistor are turned off, the third period being disposed between the first period and the write period.

27. The display apparatus of claim 25, wherein the second transistor is turned on and the data signal is supplied to the first gate of the first transistor through the turned-on second transistor in the write period.

28. The display apparatus of claim 15, wherein the third voltage line comprises a (3-1)th voltage line and a (3-2)th voltage line, wherein the sixth transistor of a first pixel emitting light in a first color among the plurality of pixels is connected to the (3-1)th voltage line, wherein the sixth transistor of a second pixel emitting light in a second color among the plurality of pixels is connected to the (3-2)th voltage line, and wherein a voltage supplied to the (3-1)th voltage line and a voltage supplied to the (3-2)th voltage line are different from each other.

29. The display apparatus of claim 15, wherein each of the first to third voltage lines extends in a first direction, and wherein the display apparatus further comprises first to third vertical voltage lines extending in a second direction perpendicular to the first direction and respectively connected to the first to third voltage lines.

30. The display apparatus of claim 29, wherein each of the first to third voltage lines is arranged in each row, and wherein each of the first to third vertical voltage lines is arranged between two columns at certain intervals.

31. The display apparatus of claim 15, wherein the first to sixth transistors are N-type thin film transistors.

32. The display apparatus of claim 31, wherein each of the N-type thin film transistors comprise an oxide semiconductor layer.

33. The display apparatus of claim 15, wherein at least one of the first to sixth transistors is P-type thin film transistor.

34. The display apparatus of claim 33, wherein the P-type thin film transistor comprises a silicon semiconductor layer.

* * * * *